(12) United States Patent
Tran et al.

(10) Patent No.: US 12,311,335 B2
(45) Date of Patent: May 27, 2025

(54) COMPOSITE MATERIALS AND METHODS OF MAKING AND USE THEREOF

(71) Applicants: GEORGIA STATE UNIVERSITY RESEARCH FOUNDATION, INC., Atlanta, GA (US); XOMIX, LTD., Chicago, IL (US)

(72) Inventors: Thien Tran, Atlanta, GA (US); Daniel Deocampo, Atlanta, GA (US); Gary Keller, Chicago, IL (US)

(73) Assignees: GEORGIA STATE UNIVERSITY RESEARCH FOUNDATION, INC., Atlanta, GA (US); XOMIX, LTD., Chicago, IL (US)

( * ) Notice: Subject to any disclaimer, the term of this patent is extended or adjusted under 35 U.S.C. 154(b) by 183 days.

(21) Appl. No.: 17/576,076

(22) Filed: Jan. 14, 2022

(65) Prior Publication Data

US 2022/0219135 A1 Jul. 14, 2022

Related U.S. Application Data

(60) Provisional application No. 63/137,309, filed on Jan. 14, 2021.

(51) Int. Cl.
*B01J 20/06* (2006.01)
*B01J 20/20* (2006.01)
(Continued)

(52) U.S. Cl.
CPC ............. *B01J 20/06* (2013.01); *B01J 20/205* (2013.01); *B01J 20/28007* (2013.01);
(Continued)

(58) Field of Classification Search
CPC .... B01J 20/06; B01J 20/205; B01J 20/28007; B01J 20/28011; B01J 20/28059;
(Continued)

(56) References Cited

U.S. PATENT DOCUMENTS 9,050,605 B2   6/2015 Guo
10,272,391 B2   4/2019 Atieh et al.
(Continued)

FOREIGN PATENT DOCUMENTS

WO   2017/205732   11/2017

OTHER PUBLICATIONS

Zhu et al. "CNTs/ferrihydrite as a highly efficient heterogeneous Fenton catalyst for the degradation of bisphenol A: The important role of CNTs in accelerating Fe(III)/Fe(II) cycling", Applied Catalysis B: Environmental, vol. 270, Aug. 5, 2020, 118891 (Year: 2020).*

(Continued)

*Primary Examiner* — Andrew J. Oyer
(74) *Attorney, Agent, or Firm* — Meunier Carlin & Curfman LLC

(57) ABSTRACT

Disclosed herein are composite materials and methods of making and use thereof. The composite materials comprise: a carbon nanotube and a plurality of ferrihydrite particles disposed on the carbon nanotube, the composite material comprising the plurality of ferrihydrite particles and the carbon nanotube in a weight ratio of from 5:95 to 95:5. The weight ratio can be selected such that the composite material has a desired balance between specific surface area and specific capacitance. Also disclosed herein are methods comprising: making a plurality of the composite materials, the weight ratio of the plurality of ferrihydrite particles and the carbon nanotube being different for each composite material; and determining and comparing the specific surface area and specific surface capacitance for the plurality of composite materials to determine the weight ratio at which the composite material has a desired balance between the specific surface area and the specific capacitance.

17 Claims, 9 Drawing Sheets

(51) Int. Cl.

| | |
|---|---|
| *B01J 20/28* | (2006.01) |
| *C02F 1/28* | (2023.01) |
| *C02F 1/469* | (2023.01) |
| *C02F 5/00* | (2023.01) |
| *C02F 101/10* | (2006.01) |
| *C02F 101/20* | (2006.01) |
| *C02F 101/30* | (2006.01) |
| *C02F 101/36* | (2006.01) |
| *C02F 103/08* | (2006.01) |

(52) U.S. Cl.
CPC ... *B01J 20/28011* (2013.01); *B01J 20/28059* (2013.01); *B01J 20/28061* (2013.01); *B01J 20/28064* (2013.01); *C02F 1/288* (2013.01); *C02F 5/00* (2013.01); *C02F 1/281* (2013.01); *C02F 1/283* (2013.01); *C02F 1/4691* (2013.01); *C02F 2101/103* (2013.01); *C02F 2101/20* (2013.01); *C02F 2101/306* (2013.01); *C02F 2101/36* (2013.01); *C02F 2103/08* (2013.01); *C02F 2305/08* (2013.01)

(58) Field of Classification Search
CPC ............ B01J 20/28061; B01J 20/28064; B01J 20/28057; B01J 20/3204; B01J 20/3236; C02F 1/288; C02F 5/00; C02F 1/281; C02F 1/283; C02F 1/4691; C02F 2101/103; C02F 2101/20; C02F 2101/306; C02F 2101/36; C02F 2103/08; C02F 2305/08; C02F 2303/22
See application file for complete search history.

(56) References Cited

U.S. PATENT DOCUMENTS

| | | |
|---|---|---|
| 10,369,526 B2 | 8/2019 | Atieh et al. |
| 2007/0281854 A1 | 12/2007 | Harbour et al. |
| 2012/0186980 A1 | 7/2012 | Ramaprabhu et al. |

OTHER PUBLICATIONS

Alsawat et al. Carbon Nanotubes—Nanoporous Anodic Alumina Composite Membranes: In fl uence of Template on Structural, Chemical, and Transport Properties, J. Phys. Chem. C. 121 (2017) 13634-13644.
Arvaniti OS et al. 2015. Reductive degradation of perfluorinated compounds in water using Mg-aminoclay coated nanoscale zero valent iron. Chem. Eng. J. 262, 133-139.
Atchudan et al. Effects of Nanofillers on the Thermo-Mechanical Properties and Chemical Resistivity of Epoxy Nanocomposites, J. Nanosci. Nanotechnol. 15 (2015) 4255-4267.
Bai X et al. 2021. Perfluoroalkyl substances (PFAS) in surface water and sediments from two urban watersheds in Nevada, USA. Sci. Total Environ. 751, 141622.
Bayram E et al. 2010. Electrochemically enhanced removal of polycyclic aromatic basic dyes from dilute aqueous solutions by activated carbon cloth electrodes. Environ. Sci. Technol. 44, 6331-6336.
Becker AM et al. 2008. Perfluorooctane surfactants in waste waters, the major source of river pollution. Chemosphere 72, 115-121.
Bergna D et al. 2018. Comparison of the Properties of Activated Carbons Produced in One-Stage and Two-Stage Processes. J. Carbon Res. 4, 1-10.
Bethune et al. Cobalt-catalysed growth of carbon nanotubes with single-atomic-layer walls, Nature. 363 (1993) 605-607.
Calafat AM et al. 2007. Polyfluoroalkyl chemicals in the U.S. population: Data from the national health and nutrition examination survey (NHANES) 2003-2004 and comparisons with NHANES 1999-2000. Environ. Health Perspect. 115, 1596-1602.
Carter KE et al. 2008. Oxidative destruction of perfluorooctane sulfonate using boron-doped diamond film electrodes. Environ. Sci. Technol. 42, 6111-6115.
Chen R et al. 2020. Capacitive deionization and electrosorption for heavy metal removal. Environ. Sci. Water Res. Technol. 6, 258-282.
Chen R et al. 2021. Structure and Potential-Dependent Selectivity in Redox-Metallopolymers: Electrochemically Mediated Multicomponent Metal Separations. Adv. Funct. Mater. 31(15), 2009307.
Cheng J et al. 2010. Sonochemical degradation of perfluorooctane sulfonate (PFOS) and perfluorooctanoate (PFOA) in groundwater: Kinetic effects of matrix inorganics. Environ. Sci. Technol. 44, 445-450.
Das et al. Carbon nanotube membranes for water purification: A bright future in water desalination, Desalination. 336 (2014) 97-109.
Du Z et al. 2014. Adsorption behavior and mechanism of perfluorinated compounds on various adsorbents—A review. J. Hazard. Mater. 274, 443-454.
Figoli A et al. Application of nanotechnology in drinking water purification. Water Purification, 2017, pp. 119-167.
Foo KY et al. 2009. A short review of activated carbon assisted electrosorption process: An overview, current stage and future prospects. J. Hazard. Mater. 170, 552-559.
Fornasiero et al. Ion exclusion by sub-2nm carbon nanotube pores, Mater. Res. Soc. Symp. Proc. 105 (2008) 17250-17255.
Fortier et al. Evaluation of nafion as media for glucose oxidase immobilization for the development of an amperometric glucose biosensor, Electroanalysis. 4 (1992) 275-283.
Frackowiak. Carbon materials for supercapacitor application, Phys. Chem. Chem. Phys. 9 (2007) 1774-1785.
Geng J et al. Stochastic transport through carbon nanotubes in lipid bilayers and live cell membranes. Nature, 2014, 514, 612-615.
Giesy JP et al. 2001. Global distribution of perfluorooctane sulfonate in wildlife. Environ. Sci. Technol. 35, 1339-1342.
Glover CM et al. 2018. Removal of perfluoroalkyl and polyfluoroalkyl substances in potable reuse systems. Water Res. 144, 454-461.
Griffiths A. Graphene-based water filter produces drinkable water in just one step. 2018. Available online at: https://www.dezeen.com/2018/03/04/graphene-water-filter-produces-drinkable-water-in-just-one-step/, Accessed Jan. 21, 2022.
Gudavalli et al. Chemical Vapor-Deposited Carbon Nanotubes as Electrode Material for Supercapacitor Applications, MRS Adv. 2 (2017) 3263-3269.
Gupta et al. Chemical treatment technologies for waste-water recycling—An overview, RSC Adv. 2 (2012) 6380-6388.
Harrison et al. Capillary Electrophoresis and Sample Injection Systems Integrated on a Planar Glass Chip, Anal. Chem. 64 (1992) 1926-1932.
Hepburn E et al. 2019. Contamination of groundwater with per- and polyfluoroalkyl substances (PFAS) from legacy landfills in an urban re-development precinct. Environ. Pollut. 248, 101-113.
Hiemstra T et al. 2009. A surface structural model for ferrihydrite I: Sites related to primary charge, molar mass, and mass density. Geochim. Cosmochim. Acta 73, 4423-4436.
Hölzer J et al. 2009. One-year follow-up of perfluorinated compounds in plasma of German residents from Arnsberg formerly exposed to PFOA-contaminated drinking water. Int. J. Hyg. Environ. Health 212, 499-504.
Hori H et al. 2004. Decomposition of environmentally persistent perfluorooctanoic acid in water by photochemical approaches. Environ. Sci. Technol. 38, 6118-6124.
Hori H et al. 2006. Efficient Decomposition of Environmentally Persistent Perfluorooctanesulfonate and Related Fluorochemicals Using Zerovalent Iron in Subcritical Water. Environ. Sci. Technol. 40, 1049-1054.
Horst J et al. 2020. Understanding and Managing the Potential By-Products of PFAS Destruction. Groundw. Monit. Remediat. 40, 17-27.
Hu J et al. Removal of Pb(II) and Cu(II) from aqueous solution using multiwalled carbon nanotubes/iron oxide magnetic composites. Water Science & Technology, 2011, 63.5, 917-923.
Ihsanullah. Carbon nanotube membranes for water purification: Developments, challenges, and prospects for the future. Separation and Purification Technology, 2019, 209, 307-337.

(56) References Cited

OTHER PUBLICATIONS

Iijima S. 1991. Helical microtubules of graphitic carbon. Nature 354, 56-58.
Jeevanandam et al. Review on nanoparticles and nanostructured materials: History, sources, toxicity and regulations, Beilstein J. Nanotechnol. 9 (2018) 1050-1074.
Jia et al. Adsorption of Arsenate onto Ferrihydrite from Aqueous Solution: Influence of Media (Sulfate vs Nitrate), Added Gypsum, and pH Alteration, Environ. Sci. Technol. 39 (2005) 9523-9527.
Jin YH et al. 2009. PFOS and PFOA in environmental and tap water in China. Chemosphere 77, 605-611.
Kamat et al. Self-Assembled Linear Bundles of Single Wall Carbon Nanotubes and Their Alignment and Deposition as a Film in a dc Field, J. Am. Chem. Soc. 126 (2004) 10757-10762.
Kang et al. Antibacterial Effects of Carbon Nanotubes: Size Does Matter! Langmuir 2008, 24(13), 6409-6413.
Kang et al. Single-Walled Carbon Nanotubes Exhibit Strong Antimicrobial Activity. Langmuir, 2007, 23(17), 8670-8673.
Karakaya et al. Roll-to-roll production of spray coated N-doped carbon nanotube electrodes for supercapacitors, Appl. Phys. Lett. 105 (2014) 263103.
Khan et al. Nanoparticles: Properties, applications and toxicities, Arab. J. Chem. 12 (2019) 908-931.
Kim, K., Cotty, S., Elbert, J., Chen, R., Hou, C.H., Su, X., 2020. Asymmetric Redox-Polymer Interfaces for Electrochemical Reactive Separations: Synergistic Capture and Conversion of Arsenic. Adv. Mater. 32, 1-8.
Kinloch A et al. Composites with carbon nanotubes and graphene: An outlook. Science, 2018, 362, 547-553.
Kucharzyk KH et al. 2017. Novel treatment technologies for PFAS compounds: A critical review. J. Environ. Manage. 204, 757-764.
Le et al. Surface modification and functionalization of carbon nanotube with some organic compounds, Adv. Nat. Sci. Nanosci. Nanotechnol. 3 (2013) 035017.
Li et al. Rational design of nanomaterials for water treatment, Nanoscale. 7 (2015) 17167-17194.
Li H et al. 2011. A comparative study on electrosorptive behavior of carbon nanotubes and graphene for capacitive deionization. J. Electroanal. Chem. 653, 40-44.
Li X et al. 2011. Enhanced adsorption of PFOA and PFOS on multiwalled carbon nanotubes under electrochemical assistance. Environ. Sci. Technol. 45, 8498-8505.
Liao et al. Adsorption of chlorophenols by multi-walled carbon nanotubes treated with HNO3 and NH3, Carbon N. Y. 46 (2008) 553-555.
Liu et al. Characterization and Surface Reactivity of Ferrihydrite Nanoparticles Assembled in Ferritin, Langmuir. 22 (2006) 9313-9321.
Liu et al. Synthesis and characterization of a magnetic adsorbent from negatively-valued iron mud for methylene blue adsorption, PLoS One. 13 (2018) e0191229.
Liu Y X et al. 2011. Electrochemical removal of chromium from aqueous solutions using electrodes of stainless steel nets coated with single wall carbon nanotubes. J. Hazard. Mater. 186, 473-480.
Mikutta et al. Synthetic coprecipitates of exopolysaccharides and ferrihydrite. Part I: Characterization, Geochim. Cosmochim. Acta. 72 (2008) 1111-1127.
National Aeronautics and Space Administration. Filtering Water with Acoustics Nanotube Technology. 2010. Available online at: https://www.nasa.gov/centers/johnson/techtransfer/technology/MSC-24180-1_Water-Filtering-Device.html, Accessed Jan. 21, 2022.
NTP (National Toxicology Program). 2016. NTP Monograph on Immunotoxicity Associated with Exposure to Perfluorooctanoic acid (PFOA) and perfluorooctane sulfonate (PFOS). Research Triangle Park, NC: National Toxicology Program. https://ntp.niehs.nih.gov/ntp/ohat/pfoa_pfos/pfoa_pfosmonograph_508.pdf.
Pan et al. Carbon nanotubes for supercapacitor, Nanoscale Res. Lett. 5 (2010) 654-668.

Parks. The Isoelectric Points of Solid Oxides, Solid Hydroxides, and Aqueous Hydroxo Complex Systems, Chem. Rev. 65 (1965) 177-198.
Paul AG et al. 2009. A first global production, emission, and environmental inventory for perfluorooctane sulfonate. Environ. Sci. Technol. 43, 386-392.
Peigney A et al. 2001. Specific surface area of carbon nanotubes and bundles of carbon nanotubes. Carbon N. Y. 39, 507-514.
Peng et al. Carbon nanotubes—iron oxides magnetic composites as adsorbent for removal of Pb (II ) and Cu (II) from water, Carbon N. Y. 43 (2005) 855-894.
Peng et al. High performance ordered mesoporous carbon / carbon nanotube composite electrodes for capacitive deionization, J. Mater. Chem. 22 (2012) 6603-6612.
Peng X et al. Carbon nanotubes-iron oxides magnetic composites as adsorbent for removal of Pb(II) and Cu(II) from water. Carbon, 2005, 43, 855-894.
Pereira et al. The effect of pH and ionic strength on the adsorption of glyphosate onto ferrihydrite, Geochem. Trans. 20 (2019) 1-14.
Pitter G et al. 2020. Serum levels of perfluoroalkyl substances (PFAS) in adolescents and young adults exposed to contaminated drinking water in the Veneto region, Italy: A cross-sectional study based on a health surveillance program. Environ. Health Perspect. 128, 1-12.
Poinern GEJ et al. Preparation, characterization and As(V) adsorption behaviour of CNT-ferrihydrite composites. International Journal of Engineering, Science and Technology, 2010, 2(8), 13-24.
Poothong S et al. 2017. Distribution of Novel and Well-Known Poly- and Perfluoroalkyl Substances (PFASs) in Human Serum, Plasma, and Whole Blood. Environ. Sci. Technol. 51, 13388-13396.
Prevedouros K et al. 2006. Sources, fate and transport of perfluorocarboxylates. Environ. Sci. Technol. 40, 32-44.
Radjenovic J et al. 2020. Facing the Challenge of Poly- And Perfluoroalkyl Substances in Water: Is Electrochemical Oxidation the Answer? Environ. Sci. Technol. 54, 14815-14829.
Rahman MF et al. 2014. Behaviour and fate of perfluoroalkyl and polyfluoroalkyl substances (PFASs) in drinking water treatment: A review. Water Res. 50, 318-340.
Raven et al. Arsenite and Arsenate Adsorption on Ferrihydrite: Kinetics, Equilibrium, and Adsorption Envelopes, Environ. Sci. Technol. 32 (1998) 344-349.
Rocha JDR et al. Emerging investigators series: highly effective adsorption of organic aromatic molecules from aqueous environments by electronically sorted single-walled carbon nanotubes. Encironmental Science: Water Research & Technology. 2017, 3, 203-212.
Santiago R A et al. 2022. Electrochemical remediation of perfluoroalkyl substances from water. Electrochim. Acta 403, 139635.
Rout et al. 2-Line ferrihydrite: synthesis, characterization and its adsorption behaviour for removal of Pb(II), Cd(II), Cu(II) and Zn(II) from aqueous solutions, Dalt. Trans. 41 (2012) 3302.
Sarkar et al. Electrophoretic Deposition of Carbon Nanotubes on 3-Amino-Propyl-Triethoxysilane (APTES) Surface Functionalized Silicon Substrates, Nanomaterials. 3 (2013) 272-288.
Socas-Rodrigues B et al. Recent applications of carbon nanotube sorbents in analytical chemistry. Joural of Chromatography A, 2014, 1357, 110-146.
Su X et al. 2016. Anion-Selective Redox Electrodes: Electrochemically Mediated Separation with Heterogeneous Organometallic Interfaces. Adv. Funct. Mater. 26, 3394-3404.
Su X et al. 2018. Electrochemically-mediated selective capture of heavy metal chromium and arsenic oxyanions from water. Nat. Commun. 9, 4701.
Tang CY et al. 2006. Use of reverse osmosis membranes to remove perfluorooctane sulfonate (PFOS) from semiconductor wastewater. Environ. Sci. Technol. 40, 7343-7349.
Thomas et al. Multi-Walled Carbon Nanotube Coatings Using Electrophoretic Deposition (EPD), J. Am. Ceram. Soc. 88 (2005) 980-982.
Thostenson ET et al. 2001. Advances in the science and technology of carbon nanotubes and their composites: a review. Compos. Sci. Technol. 61, 1899-1912.

(56) References Cited

OTHER PUBLICATIONS

Tunuguntla RH et al. Enhanced water permeability and tunable ion selectivity in subnanometer carbon nanotube porins. Science, 2017, 357(6353), 792-796.
U.S.E.P.A. EPA, Standard Operating Procedure for Determination of Lead in TSP by Inductively Coupled Plasma Mass Spectrometry (ICP-MS) with Hot Block Dilute Acid and Hydrogen Peroxide Filter Extraction, 2010, 31 pages.
Wang et al. Carbon Nanotube-Based Thin Films: Synthesis and Properties, InTech, 2011. doi:10.5772/22021.
Wang et al. Electrosorption of ions from aqueous solutions with carbon nanotubes and nanofibers composite film electrodes Electrosorption of ions from aqueous solutions with carbon nanotubes and nanofibers composite film electrodes, Appl. Phys. Lett. 89 (2006) E23-E26.
Wang et al. Solubilization of Carbon Nanotubes by Nafion toward the Preparation of Amperometric Biosensors, J. Am. Chem. Soc. 125 (2003) 2408-2409.
Yang Y et al. Large-area graphene-nanomesh/carbon-nanotube hybrid membranes for ionic and molecular nanofiltration. Science, 2019, 364(6445), 1057-1062.
Zhang DQ et al. 2019. Adsorption of perfluoroalkyl and polyfluoroalkyl substances (PFASs) from aqueous solution—A review. Sci. Total Environ. 694, 133606.
Zhang et al. Preparation and modification of carbon nanotubes, Mater. Lett. 59 (2005) 4044-4047.
Zhang et al. Removal of NaCl from saltwater solution using carbon nanotubes / activated carbon composite electrode, Mater. Lett. 60 (2006) 360-363.
Zhou et al. Dissolved Silica Effects on Adsorption and Co-Precipitation of Sb(III) and Sb(V) with Ferrihydrite, Minerals. 8 (2018) 1-101.
Zhu et al. Temperature-Dependent Conversion of Magnesium Citrate into Nanoporous Carbon Materials for Superior Supercapacitor Application by a Multitemplate Carbonization Method, Ind. Eng. Chem. Res. 54 (2015) 4956-4964.
Tran, T., Deocampo, D.M., Kabengi, N., 2020. Synthesis and Optimization of Multiwalled Carbon Nanotubes—Ferrihydrite Hybrid Composite. J. Compos. Sci. 5, 5. https://doi.org/10.3390/jcs5010005.
Tran, T., Abrell, L., Brusseau, M.L., Chorover, J., 2021. Iron-activated persulfate oxidation degrades aqueous Perfluorooctanoic acid (PFOA) at ambient temperature. Chemosphere 281, 130824. https://doi.org/10.1016/j.chemosphere.2021.130824.
Salam Abdel, M., Burk, R.C., 2008. Thermodynamics of pentachlorophenol adsorption from aqueous solutions by oxidized multi-walled carbon nanotubes. Appl. Surf. Sci. 255, 1975-1981. https://doi.org/10.1016/j.apsusc.2008.06.168.
Ayranci, E., Conway, B.E., 2001. Adsorption and electrosorption at high-area carbon-felt electrodes for waste-water purification: Systems evaluation with inorganic, S-containing anions. J. Appl. Electrochem. 31, 257-266. https://doi.org/10.1023/A:1017528002713.
Bard, A.J., Faulkner, L.R., 2000. Electrochemical Methods: Fundamentals and Applications, 2nd ed. John Wiley & Sons, Inc., New York City, US.
Brillas, E., Calpe, J.C., Casado, J., 2000. Mineralization of 2,4-D by advanced electrochemical oxidation processes. Water Res. 34, 2253-2262.
Cao, D., Hu, M., Han, C., Yu, J., Cui, L., Liu, Y., Wang, H., Cai, Y., Kang, Y., Zhou, Y., 2012. Proton sponge-functionalized silica as high-performance adsorbents for solid-phase extraction of trace perfluoroalkyl sulfonates in the environmental water samples and their direct analysis by MALDI-TOF-MS. Analyst 137, 2218-2225. https://doi.org/10.1039/c2an16190g.
Chen, X., Xia, X., Wang, X., Qiao, J., Chen, H., 2011. A comparative study on sorption of perfluorooctane sulfonate (PFOS) by chars, ash and carbon nanotubes. Chemosphere 83, 1313-1319. https://doi.org/10.1016/j.chemosphere.2011.04.018 .

Deng, S., Zhang, Q., Nie, Y., Wei, H., Wang, B., Huang, J., Yu, G., Xing, B., 2012. Sorption mechanisms of perfluorinated compounds on carbon nanotubes. Environ. Pollut. 168, 138-144. https://doi.org/10.1016/j.envpol.2012.03.048.
Elgrishi, N., Rountree, K.J., McCarthy, B.D., Rountree, E.S., Eisenhart, T.T., Dempsey, J.L., 2018. A Practical Beginner's Guide to Cyclic Voltammetry. J. Chem. Educ. 95, 197-206. https://doi.org/10.1021/acs.jchemed.7b00361.
Goss, Kai-Uwe. The p K a values of PFOA and other highly fluorinated carboxylic acids. Environmental science & technology 42.2 (2008): 456-458.
Gabelich, C.J., Tran, T.D., Suffet, I.H., 2002. Electrosorption of inorganic salts from aqueous solution using carbon aerogels. Environ. Sci. Technol. 36, 3010-3019. https://doi.org/10.1021/es0112745.
Gao, X., Chorover, J., 2012. Adsorption of perfluorooctanoic acid and perfluorooctanesulfonic acid to iron oxide surfaces as studied by flow-through ATR-FTIR spectroscopy. Environ. Chem. 9, 148-157. https://doi.org/10.1071/EN11119.
Jayachandran, M., Rose, A., Maiyalagan, T., Poongodi, N., Vijayakumar, T., 2021. Effect of various aqueous electrolytes on the electrochemical performance of $\alpha$-$MnO_2$ nanorods as electrode materials for supercapacitor application. Electrochim. Acta 366, 137412. https://doi.org/10.1016/j.electacta.2020.137412.
Ji, L., Chen, W., Duan, L., Zhu, D., 2009. Mechanisms for strong adsorption of tetracycline to carbon nanotubes: A comparative study using activated carbon and graphite as adsorbents. Environ. Sci. Technol. 43, 2322-2327. https://doi.org/10.1021/es803268b.
Leung, S.C.E., Shukla, P., Chen, D., Eftekhari, E., An, H., Zare, F., Ghasemi, N., Zhang, D., Nguyen, N.-T., Li, Q., 2022. Emerging technologies for PFOS/PFOA degradation: A review. Sci. Total Environ. 827, 153669. https://doi.org/10.1016/j.scitotenv.2022.153669.
Li, H., Lu, T., Pan, L., Zhang, Y., Sun, Z., 2009. Electrosorption behavior of graphene in NaCl solutions. J. Mater. Chem. 19, 6773-6779. https://doi.org/10.1039/b907703k.
Li, H., Pan, L., Zhang, Y., Zou, L., Sun, C., Zhan, Y., Sun, Z., 2010. Kinetics and thermodynamics study for electrosorption of NaCl onto carbon nanotubes and carbon nanofibers electrodes. Chem. Phys. Lett. 485, 161-166. https://doi.org/10.1016/j.cplett.2009.12.031.
Mramba, A.S., Ndibewu, P.P., Sibali, L.L., Makgopa, K., 2020. A Review on Electrochemical Degradation and Biopolymer Adsorption Treatments for Toxic Compounds in Pharmaceutical Effluents. Electroanalysis 32, 2615-2634. https://doi.org/10.1002/elan.202060454.
Niu, J., Conway, B.E., 2002. Adsorptive and electrosorptive removal of aniline and bipyridyls from waste-waters. J. Electroanal. Chem. 536, 83-92. https://doi.org/10.1016/S0022-0728(02)01206-8.
Radhakrishnan, R., Gubbins, K.E., Sliwinska-Bartkowiak, M., 2002. Global phase diagrams for freezing in porous media. J. Chem. Phys. 116, 1147-1155. https://doi.org/10.1063/1.1426412.
Shoemaker, J.A., Grimmett, P.E., 2009. Method 537. Determination Of Selected Perfluorinated Alkyl Acids In Drinking Water By Solid Phase Extraction And Liquid Chromatography/Tandem Mass Spectrometry (LC/MS/MS), US EPA.
Takayose, M., Nishimoto, K., Matsui, J., 2012. A fluorous synthetic receptor that recognizes perfluorooctanoic acid (PFOA) via fluorous interaction obtained by molecular imprinting. Analyst 137, 2762-2765. https://doi.org/10.1039/c2an15936h.
Tsai, Y.T., Yu-Chen Lin, A., Weng, Y.H., Li, K.C., 2010. Treatment of perfluorinated chemicals by electro-microfiltration. Environ. Sci. Technol. 44, 7914-7920. https://doi.org/10.1021/es101964y.
U.S. Environmental Protection Agency, 2003. Preliminary Risk Assessment Of The Developmental Toxicity Associated With Exposure To Perfluorooctanoic Acid And Its Salts.
Xiao, F., Davidsavor, K.J., Park, S., Nakayama, M., Phillips, B.R., 2012. Batch and column study: Sorption of perfluorinated surfactants from water and cosolvent systems by Amberlite XAD resins. J. Colloid Interface Sci. 368, 505-511. https://doi.org/10.1016/j.jcis.2011.11.011.
Xiong, X., Yang, Z., Huang, Y., Jiang, L., Chen, Y., Shen, Y., Chen, B., 2013. Organic-inorganic hybrid fluorous monolithic capillary

(56) References Cited

OTHER PUBLICATIONS column for selective solid-phase microextraction of perfluorinated persistent organic pollutants. J. Sep. Sci. 36, 923-931. https://doi.org/10.1002/jssc.201200913.

Xu, L., Pang, Y., Huang, D., Zhuang, H., Liu, W., Luo, T., Lee, P.H., Feng, L., Lu, J., 2019. The role of sodium sulfate supporting electrolyte in ammonium transport and reduction at interface between platinum cathode and solution. ChemRxiv. https://doi.org/10.26434/chemrxiv.10006712.v1.

Ying, T.Y., Yang, K.L., Yiacoumi, S., Tsouris, C., 2002. Electrosorption of ions from aqueous solutions by nanostructured carbon aerogel. J. Colloid Interface Sci. 250, 18-27. https://doi.org/10.1006/jcis.2002.8314.

You, C., Jia, C., Pan, G., 2010. Effect of salinity and sediment characteristics on the sorption and desorption of perfluorooctane sulfonate at sediment-water interface. Environ. Pollut. 158, 1343-1347. https://doi.org/10.1016/j.envpol.2010.01.009.

Yu, Q., Zhang, R., Deng, S., Huang, J., Yu, G., 2009. Sorption of perfluorooctane sulfonate and perfluorooctanoate on activated carbons and resin: Kinetic and isotherm study. Water Res. 43, 1150-1158. https://doi.org/10.1016/j.watres.2008.12.001.

Zhang, Q., Deng, S., Yu, G., Huang, J., 2011. Removal of perfluorooctane sulfonate from aqueous solution by crosslinked chitosan beads: Sorption kinetics and uptake mechanism. Bioresour. Technol. 102, 2265-2271. https://doi.org/10.1016/j.biortech.2010.10.040.

Zhao, X., Li, J., Shi, Y., Cai, Y., Mou, S., Jiang, G., 2007. Determination of perfluorinated compounds in wastewater and river water samples by mixed hemimicelle-based solid-phase extraction before liquid chromatography-electrospray tandem mass spectrometry detection. J. Chromatogr. A 1154, 52-59. https://doi.org/10.1016/j.chroma.2007.03.093.

Zhou, Q., Deng, S., Zhang, Q., Fan, Q., Huang, J., Yu, G., 2010. Sorption of perfluorooctane sulfonate and perfluorooctanoate on activated sludge. Chemosphere 81, 453-458. https://doi.org/10.1016/j.chemosphere.2010.08.009.

\* cited by examiner

COMPOSITE MATERIALS AND METHODS OF MAKING AND USE THEREOF

CROSS-REFERENCE TO RELATED APPLICATIONS

This application claims the benefit of priority to U.S. Provisional Application No. 63/137,309 filed Jan. 14, 2021, which is hereby incorporated herein by reference in its entirety.

BACKGROUND

Both lead and arsenic have been known hazards/contaminants to water for many years, yet are still present in drinking water. Per- and polyfluoroalkyl substances (PFASs) are synthetic organic compounds that are used for certain industrial purposes (stain/water repellants, paints and coatings, fire foams), the same factors that make them suitable for these industrial purposes also leads to them being difficult to breakdown and remove from contaminated water, soil, etc.

Current filter technologies suffer from poor throughput, poor sorption, as well as biofouling. For example, current carbon-based water nanofilters suffer from biofouling challenges, limited sorption, and alone are unable to suitably remove certain common contaminants of interest (e.g., arsenic).

Therefore, there continues to be a need for effective removal of both elemental contaminants and PFAS compounds from water. The compositions and methods discussed herein addresses these and other needs.

SUMMARY

In accordance with the purposes of the disclosed compositions and methods, as embodied and broadly described herein, the disclosed subject matter relates to composite materials and methods of making and use thereof.

Described herein are composite materials comprising: a carbon nanotube and a plurality of ferrihydrite particles, the carbon nanotube having an outer surface and the plurality of ferrihydrite particles being disposed on the outer surface of the carbon nanotube; wherein the composite material has a specific surface area and a specific capacitance; wherein the composite material comprises the plurality of ferrihydrite particles and the carbon nanotube in a weight ratio of from 5:95 to 95:5; and wherein the weight ratio is selected such that the composite material has a desired balance between the specific surface area and the specific capacitance.

In some examples, the carbon nanotube has an average outer diameter of from 1 nanometer (nm) to 100 nm. In some examples, the carbon nanotube has an average outer diameter of from 40 to 60 nm or from 30 nm to 50 nm.

In some examples, the carbon nanotube has an average length of from 0.1 micrometers ($\mu$m) to 10 mm. In some examples, the carbon nanotube has an average length of from 0.1 $\mu$m to 100 $\mu$m, from 0.1 $\mu$m to 50 $\mu$m, or from 5 $\mu$m to 15 $\mu$m. In some examples, the carbon nanotube has an average outer diameter of from 30 nm to 50 nm and an average length of from 5 $\mu$m to 15 $\mu$m.

In some examples, the carbon nanotube comprises a multi-walled carbon nanotube. In some examples, the carbon nanotube has an average outer diameter of from 30 nm to 50 nm and an average length of from 5 $\mu$m to 15 $\mu$m and wherein the carbon nanotube comprises a multi-walled carbon nanotube.

In some examples, the carbon nanotube has an average aspect ratio of from 20 to 5000. In some examples, the carbon nanotube has an average aspect ratio of from 20 to 1000 or from 80 to 500. In some examples, the carbon nanotube has an average outer diameter of from 30 nm to 50 nm, an average length of from 5 $\mu$m to 15 $\mu$m, and an average aspect ratio of from 80 to 500. In some examples, the carbon nanotube has an average outer diameter of from 30 nm to 50 nm, an average length of from 5 $\mu$m to 15 $\mu$m, and an average aspect ratio of from 80 to 500, and wherein the carbon nanotube comprises a multi-walled carbon nanotube.

In some examples, the carbon nanotube has an average purity of 95% or more, 97% or more, 98% or more, or 99% or more.

In some examples, the carbon nanotube comprises an acid-treated carbon nanotube.

In some examples, the carbon nanotube comprises a plurality of carboxylic groups on the outer surface. In some examples, each of the plurality of ferrihydrite particles has a surface and wherein each of the plurality of ferrihydrite particles comprises a plurality of hydroxyl groups on its surface.

In some examples, the plurality of ferrihydrite particles are each substantially spherical in shape.

In some examples, the plurality of ferrihydrite particles have an average particle size of from 1 nm to 20 nm. In some examples, the plurality of ferrihydrite particles have an average particle size of from 1 nm to 5 nm or from 2 nm to 4 nm. In some examples, the plurality of ferrihydrite particles are each substantially spherical in shape and have an average particle size of from 2 nm to 4 nm.

In some examples, the carbon nanotube has an average outer diameter of from 30 nm to 50 nm and an average length of from 5 $\mu$m to 15 $\mu$m, and wherein the plurality of ferrihydrite particles are substantially spherical in shape and have an average particle size of from 2 nm to 4 nm. In some examples, the carbon nanotube has an average outer diameter of from 30 nm to 50 nm and an average length of from 5 $\mu$m to 15 $\mu$m, wherein the carbon nanotube comprises a multi-walled carbon nanotube, and wherein the plurality of ferrihydrite particles are substantially spherical in shape and have an average particle size of from 2 nm to 4 nm.

In some examples, the weight ratio of the plurality of ferrihydrite particles to the carbon nanotube in the composite material is from 25:75 to 75:25. In some examples, the weight ratio of the plurality of ferrihydrite particles to the carbon nanotube in the composite material is from 30:70 to 40:60. In some examples, the weight ratio of the plurality of ferrihydrite particles to the carbon nanotube in the composite material is 36:64.

In some examples, the carbon nanotube has an average outer diameter of from 30 nm to 50 nm and an average length of from 5 $\mu$m to 15 $\mu$m, and wherein the weight ratio of the plurality of ferrihydrite particles to the carbon nanotube in the composite material is from 30:70 to 40:60. In some examples, the carbon nanotube has an average outer diameter of from 30 nm to 50 nm and an average length of from 5 $\mu$m to 15 $\mu$m, wherein the carbon nanotube comprises a multi-walled carbon nanotube, and wherein the weight ratio of the plurality of ferrihydrite particles to the carbon nanotube in the composite material is from 30:70 to 40:60. In some examples, the plurality of ferrihydrite particles are each substantially spherical in shape and have an average particle size of from 2 nm to 4 nm, and wherein the weight ratio of the plurality of ferrihydrite particles to the carbon nanotube in the composite material is from 30:70 to 40:60.

In some examples, the plurality of ferrihydrite particles are each substantially spherical in shape and have an average particle size of from 2 nm to 4 nm, wherein the carbon nanotube comprises a multi-walled carbon nanotube, and wherein the weight ratio of the plurality of ferrihydrite particles to the carbon nanotube in the composite material is from 30:70 to 40:60. In some examples, the carbon nanotube has an average outer diameter of from 30 nm to 50 nm and an average length of from 5 μm to 15 μm, and wherein the plurality of ferrihydrite particles are substantially spherical in shape and have an average particle size of from 2 nm to 4 nm, and wherein the weight ratio of the plurality of ferrihydrite particles to the carbon nanotube in the composite material is from 30:70 to 40:60. In some examples, the carbon nanotube has an average outer diameter of from 30 nm to 50 nm and an average length of from 5 μm to 15 μm, wherein the carbon nanotube comprises a multi-walled nanotube, wherein the plurality of ferrihydrite particles are substantially spherical in shape and have an average particle size of from 2 nm to 4 nm, and wherein the weight ratio of the plurality of ferrihydrite particles to the carbon nanotube in the composite material is from 30:70 to 40:60.

In some examples, the plurality of ferrihydrite particles are disposed substantially evenly on the outer surface of the carbon nanotube.

In some examples, the plurality of ferrihydrite particles are bonded to the outer surface of the carbon nanotube. In some examples, the plurality of ferrihydrite particles are bonded to the outer surface of the carbon nanotube via ionic bonds. In some examples, the carbon nanotube comprises a plurality of carboxylic groups on the outer surface, wherein each of the plurality of ferrihydrite particles has a surface and wherein each of the plurality of ferrihydrite particles comprises a plurality of hydroxyl groups on its surface, and wherein the plurality of ferrihydrite particles are bonded to the outer surface of the carbon nanotube via ionic bonds between the carboxyl groups and the hydroxyl groups.

In some examples, the composite material has a specific surface area of from 50 to 1000 meters squared per gram of the composite material ($m^2/g$). In some examples, the composite material has a specific surface area of from 50 $m^2/g$ to 460 $m^2/g$, from 150 $m^2/g$ to 350 $m^2/g$, or from 180 $m^2/g$ to 200 $m^2/g$.

In some examples, the composite material has a specific capacitance of from 10 to 500 Farads per gram of the composite material (F/g) measured at a scan rate of 5 millivolts per second (mV/s). In some examples, the composite material has a specific capacitance of from 30 F/g to 200 F/g, from 40 F/g to 120 F/g, or from 90 F/g to 110 F/g measured at a scan rate of 5 mV/s.

In some examples, the composite material has a specific surface area of from 180 $m^2/g$ to 200 $m^2/g$ and a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, wherein the plurality of ferrihydrite particles are substantially spherical in shape and have an average particle size of from 2 nm to 4 nm, and wherein the composite material has a specific surface area of from 180 $m^2/g$ to 200 $m^2/g$. In some examples, the weight ratio of the plurality of ferrihydrite particles to the carbon nanotube in the composite material is from 30:70 to 40:60 and wherein the composite material has a specific surface area of from 180 $m^2/g$ to 200 $m^2/g$. In some examples, the carbon nanotube has an average outer diameter of from 30 nm to 50 nm and an average length of from 5 μm to 15 μm, and wherein the plurality of ferrihydrite particles are substantially spherical in shape and have an average particle size of from 2 nm to 4 nm, wherein the weight ratio of the plurality of ferrihydrite particles to the carbon nanotube in the composite material is from 30:70 to 40:60, and wherein the composite material has a specific surface area of from 180 $m^2/g$ to 200 $m^2/g$. In some examples, the carbon nanotube has an average outer diameter of from 30 nm to 50 nm and an average length of from 5 μm to 15 μm, wherein the plurality of ferrihydrite particles are substantially spherical in shape and have an average particle size of from 2 nm to 4 nm, and wherein the composite material has a specific capacitance of from 90 F/g to 110 F/g measured at a scan rate of 5 mV/s. In some examples, the weight ratio of the plurality of ferrihydrite particles to the carbon nanotube in the composite material is from 30:70 to 40:60 and wherein the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, wherein the plurality of ferrihydrite particles are substantially spherical in shape and have an average particle size of from 2 nm to 4 nm, wherein the weight ratio of the plurality of ferrihydrite particles to the carbon nanotube in the composite material is from 30:70 to 40:60, and wherein the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, wherein the plurality of ferrihydrite particles are substantially spherical in shape and have an average particle size of from 2 nm to 4 nm, and wherein the composite material has a specific surface area of from 180 $m^2/g$ to 200 $m^2/g$ and a specific capacitance of from 90 F/g to 110 F/g measured at a scan rate of 5 mV/s. In some examples, the weight ratio of the plurality of ferrihydrite particles to the carbon nanotube in the composite material is from 30:70 to 40:60 and wherein the composite material has a specific surface area of from 180 $m^2/g$ to 200 $m^2/g$ and a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, wherein the plurality of ferrihydrite particles are substantially spherical in shape and have an average particle size of from 2 nm to 4 nm, wherein the weight ratio of the plurality of ferrihydrite particles to the carbon nanotube in the composite material is from 30:70 to 40:60, and wherein the composite material has a specific surface area of from 180 $m^2/g$ to 200 $m^2/g$ and a specific capacitance of from 90 F/g to 110 F/g measured at a scan rate of 5 mV/s.

Also disclosed herein are filters for separating a component from a fluid stream, the filters comprising any of the composite materials described herein. In some examples, the composite material forms a free-standing filter. In some examples, the composite material is supported by a substrate. In some examples, the composite material is coated on a plurality of particles or beads.

In some examples, the fluid stream comprises liquid water or an aqueous solution. In some examples, the fluid stream comprises an organic solvent.

In some examples, the component separated from the fluid stream comprises an inorganic contaminant, an organic contaminant, or a combination thereof. In some examples, the component separated from the fluid stream comprises a metal. In some examples, the component separated from the fluid stream comprises lead, arsenic, or a combination thereof. In some examples, the component separated from the fluid stream comprises an ion, a salt, an organic molecule, a biological agent, or a combination thereof. In some examples, the component separated from the fluid stream comprises a pesticide, a perfluorinated compound, a viral pathogen, or a combination thereof.

In some examples, the filter comprises a desalination filter, a wastewater treatment filter, a heavy metal removal filter, or a combination thereof.

Also disclosed herein are methods of use of any of the filters described herein, the methods comprising using the filter in a separation to separate the component from the fluid stream. In some examples, the method comprises water purification, environmental remediation, solid phase extraction, or a combination thereof. In some examples, the method comprises water desalination, wastewater treatment, heavy metal removal, water softening, or a combination thereof.

Also disclosed herein are methods for purifying an aqueous sample, the methods comprising contacting the aqueous sample with any of the filters described herein. In some examples, purifying the aqueous sample comprises water desalination, wastewater treatment, heavy metal removal, water softening, or a combination thereof.

Also disclosed herein are water purification systems, the systems comprising one or more of any of the filters described herein. In some examples, the system comprises a water desalination system, a wastewater treatment system, a heavy metal removal system, a water softening system, or a combination thereof.

Also disclosed herein are methods of making the composite materials described herein, the methods comprising: contacting the carbon nanotube with an amount of iron nitrate to form a mixture, wherein the amount of iron nitrate relative to the carbon nanotube determines the weight ratio of the plurality of ferrihydrite particles and the carbon nanotube in the composite material; contacting the mixture with a base to adjust the pH of the mixture to induce precipitation of the plurality of ferrihydrite particles onto the outer surface of the carbon nanotube; thereby forming the composite material. In some examples, the base comprises potassium hydroxide. In some examples, the mixture further comprises a solvent. In some examples, the solvent comprises water. In some examples, the method further comprises agitating the mixture before contacting the mixture with the base. In some examples, the method further comprises separating the composite material from the solvent. In some examples, the methods further comprise making the carbon nanotube. In some examples, prior to contacting the carbon nanotube with the iron nitrate, the carbon nanotube is refluxed with an acid or oxidizing agent.

Also disclosed herein are methods comprising: making a plurality of composite materials, wherein each composite material comprises a carbon nanotube and a plurality of ferrihydrite particles in a weight ratio, the carbon nanotube having an outer surface and the plurality of ferrihydrite particles being disposed on the outer surface of the carbon nanotube, and wherein the weight ratio of the plurality of ferrihydrite particles and the carbon nanotube is different for each composite material; determining the specific surface area and the specific capacitance of each composite material in the plurality of composite materials; comparing the specific surface area and specific surface capacitance for the plurality of composite materials to determine the weight ratio of the plurality of ferrihydrite particles and carbon nanotube at which the composite material has a desired balance between the specific surface area and the specific capacitance.

In some examples, making the plurality of composite materials comprises any of the methods described herein. In some examples, the specific surface area is determined via Brunauer-Emmet-Teller (BET) surface area analysis. In some examples, the specific capacitance is determined via cyclic voltammetry.

In some examples, the method further comprises combining each composite material with a Nafion ionomer solution to form a Nafion mixture, depositing the Nafion mixture on an electrode to form a thin film on the electrode, thus forming the working electrode, and performing cyclic voltammetry using the working electrode. In some examples, after depositing the Nafion mixture on the electrode, the method further comprises drying the thin film on the electrode. In some examples, drying the thin film on the electrode comprises placing the electrode with the thin film in a sealed chamber with an ethanol bath, sealing the chamber, and controlling the ethanol vapor pressure in the sealed chamber to dry the thin film on the electrode at a controlled rate.

Additional advantages of the disclosed devices and methods will be set forth in part in the description which follows, and in part will be obvious from the description. The advantages of the disclosed devices will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
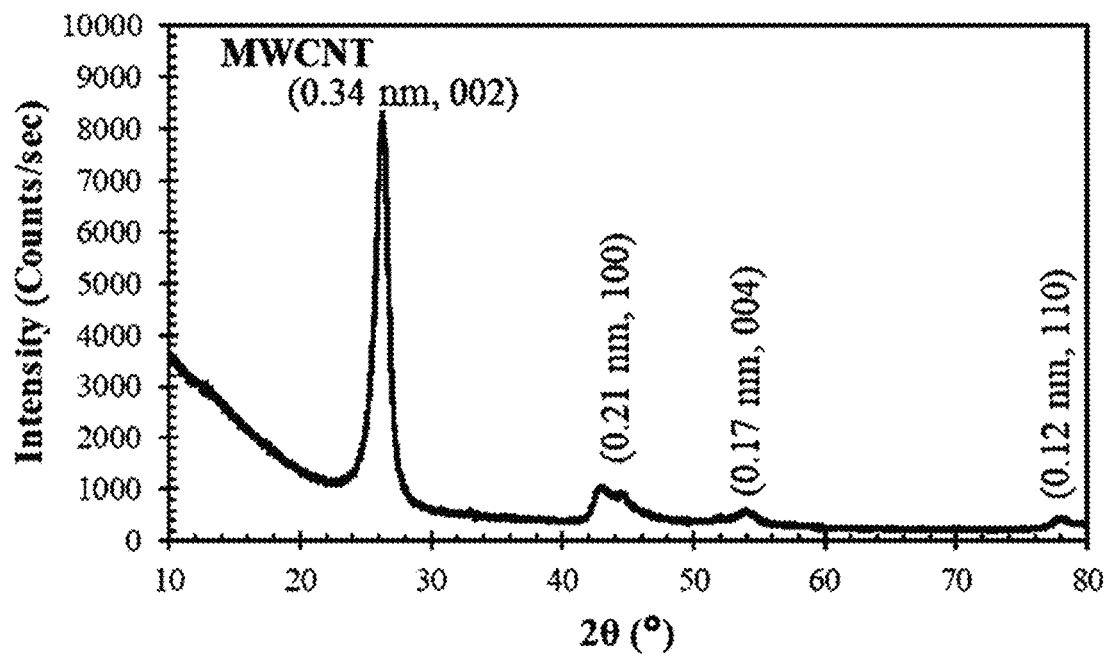
FIG. 1 is the XRD pattern of acid treated multi-walled carbon nanotubes. All XRD peaks are labeled with their corresponding 2 Theta angles, d-spacings (in nm), and their characterized XRD patterns from previous studies.

The compositions, devices, and methods described herein may be understood more readily by reference to the following detailed description of specific aspects of the disclosed subject matter and the Examples included therein.

Before the present compositions, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Composite Materials

Described herein are composite materials comprising: a carbon nanotube and a plurality of ferric oxyhydroxide (e.g., ferrihydrite) particles, the carbon nanotube having an outer surface and the plurality of ferric oxyhydroxide (e.g., ferrihydrite) particles being disposed on the outer surface of the carbon nanotube.

As used herein, "a carbon nanotube" and "the carbon nanotube" are meant to include any number of carbon nanotubes. Thus, for example "a carbon nanotube" includes one or more carbon nanotubes. In some embodiments, the carbon nanotube can comprise a plurality of carbon nanotubes.

As used herein, the term "carbon nanotubes" or "CNTs" refers to allotropes of carbon having an elongated tubular or cylindrical structure. Carbon nanotubes are hollow and typically have a linear fullerene structure and one or more inner walls. Carbon nanotubes can, for example, include single-walled carbon nanotubes (SWCNTs), multi-walled carbon nanotubes (MWCNTs), or combinations thereof. In some examples, the carbon nanotube comprises a multi-walled carbon nanotube.

The carbon nanotube can, for example, have an average outer diameter of 1 nanometer (nm) or more (e.g., 2 nm or more, 3 nm or more, 4 nm or more, 5 nm or more, 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, or 90 nm or more). In some examples, the carbon nanotube can have an average outer diameter of 100 nm or less (e.g., 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, or 5 nm or less). The average outer diameter of the carbon nanotube can range from any of the minimum values described above to any of the maximum values described above. For example, the carbon nanotube can have an average outer diameter of from 1 nm to 100 nm (e.g., from 1 nm to 50 nm, from 50 nm to 100 nm, from 1 nm to 20 nm, from 20 nm to 40 nm, from 40 nm to 60 nm, from 60 nm to 80 nm, from 80 nm to 100 nm, from 5 nm to 100 nm, from 1 nm to 90 nm, from 5 nm to 90 nm, from 20 nm to 80 nm, or from 30 nm to 50 nm). Average outer diameter can be measured using methods known in the art, such as evaluation by electron microscopy (e.g., scanning electron microscopy, transmission electron microscopy, or a combination thereof). As used herein, the average outer diameter is determined by transmission electron microscopy. In some examples, the average outer diameter can be substantially monodisperse.

The carbon nanotube can, for example, have an average length of 0.1 micrometers (μm) or more (e.g., 0.2 μm or more, 0.3 μm or more, 0.4 μm or more, 0.5 μm or more, 1 μm or more, 1.5 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 20 μm or more, 25 μm or more, 30 μm or more, 35 μm or more, 40 μm or more, 45 μm or more, 50 μm or more, 60 μm or more, 70 μm or more, 80 μm or more, 90 μm or more, 100 μm or more, 125 μm or more, 150 μm or more, 175 μm or more, 200 μm or more, 225 μm or more, 250 μm or more, 300 μm or more, 350 μm or more, 400 μm or more, 450 μm or more, 500 μm or more, 550 μm or more, 600 μm or more, 700 μm or more, 800 μm or more, 900 μm or more, 1 millimeter (mm) or more, 1.25 mm or more, 1.5 mm or more, 1.75 mm or more, 2 mm or more, 2.25 mm or more, 3 mm or more, 3.5 mm or more, 4 mm or more, 4.5 mm or more, 5 mm or more, 6 mm or more, 7 mm or more, or 8 mm or more). In some examples, the carbon nanotube can have an average length of 10 millimeters (mm) or less (e.g., 9 mm or less, 8 mm or less, 7 mm or less, 6 mm or less, 5 mm or less, 4.5 mm or less, 4 mm or less, 3.5 mm or less, 3 mm or less, 2.5 mm or less, 2.25 mm or less, 2 mm or less, 1.75 mm or less, 1.5 mm or less, 1.25 mm or less, 1 mm or less, 900 μm or less, 800 μm or less, 700 μm or less, 600 μm or less, 550 μm or less, 500 μm or less, 450 μm or less, 400 μm or less, 350 μm or less, 300 μm or less, 250 μm or less, 225 μm or less, 200 μm or less, 175 μm or less, 150 μm or less, 125 μm or less, 100 μm or less, 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 14 μm or less, 13 μm or less, 12 μm or less, 11 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.5 μm or less, 1 μm or less, or 0.5 μm or less). The average length of the carbon nanotube can range from any of the minimum values described above to any of the maximum values described above. For example, the carbon nanotube can have an average length of from 0.1 μm to 10 mm (e.g., from 0.1 μm to 100 μm, from 100 μm to 10 mm, from 0.1 μm to 50 μm, from 50 μm to 100 μm, from 100 μm to 1 mm, from 1 mm to 10 mm, from 1 μm to 10 mm, from 0.1 μm to 1 mm, from 1 μm to 1 mm, from 0.1 μm to 500 μm, from 0.1 μm to 100 μm, from 0.1 μm to 80 μm, from 0.1 μm to 60 μm, from 1 μm to 40 μm, or from 5 μm to 15 μm). Average length can be measured using methods known in the art, such as evaluation by electron microscopy (e.g., scanning electron microscopy, transmission electron microscopy, or a combination thereof). As used herein, the average length is determined by transmission electron microscopy. In some examples, the average length can be substantially monodisperse.

In some examples, the carbon nanotube has an average outer diameter of from 1 nm to 100 nm and an average length of from 0.1 μm to 10 mm. In some examples, the carbon nanotube has an average outer diameter of from 30 nm to 50 nm and an average length of from 5 μm to 15 μm.

In some examples, the carbon nanotube has an average outer diameter of from 1 nm to 100 nm and an average length of from 0.1 μm to 10 mm and comprises a multi-walled carbon nanotube. In some examples, the carbon nanotube has an average outer diameter of from 30 nm to 50 nm and an average length of from 5 μm to 15 μm and comprises a multi-walled carbon nanotube.

The carbon nanotube can have an average aspect ratio (e.g., average length divided by average outer diameter) of 20 or more (e.g., 25 or more, 30 or more, 35 or more, 40 or more, 45 or more, 50 or more, 55 or more, 60 or more, 65 or more, 70 or more, 75 or more, 80 or more, 85 or more, 90 or more, 95 or more, 100 or more, 110 or more, 120 or more, 130 or more, 140 or more, 150 or more, 175 or more, 200 or more, 225 or more, 250 or more, 300 or more, 350 or more, 400 or more, 450 or more, 500 or more, 600 or more, 700 or more, 800 or more, 900 or more, 1000 or more, 1250 or more, 1500 or more, 1750 or more, 2000 or more, 2250 or more, 2500 or more, 3000 or more, 3500 or more, or 4000 or more). In some examples, the carbon nanotube can have an average aspect ratio of 5000 or less (e.g., 4500 or less, 4000 or less, 3500 or less, 3000 or less, 2500 or less, 2250 or less, 2000 or less, 1750 or less, 1500 or less, 1250 or less, 1000 or less, 900 or less, 800 or less, 700 or less, 600 or less, 500 or less, 450 or less, 400 or less, 350 or less, 300 or less, 250 or less, 225 or less, 175 or less, 150 or less, 140 or less, 130 or less, 120 or less, 110 or less, 100 or less, 95 or less, 90 or less, 85 or less, 80 or less, 75 or less, 70 or less, 65 or less, 60 or less, 55 or less, 50 or less, 45 or less, 40 or less, 35 or less, or 30 or less). The average aspect ratio of the carbon nanotube can range from any of the minimum values described above to any of the maximum values described above. For example, the carbon nanotube can have an average aspect ratio of from 20 to 5000 (e.g., from 20 to 4000, from 20 to 3000, from 20 to 1000, from 10 to 500, from 500 to 1000, from 20 to 200, from 200 to 400, from 400 to 600, from 600 to 800, from 800 to 1000, from 30 to 1000, from 20 to 900, from 30 to 900, or from 80 to 500).

In some examples, the carbon nanotube has an average outer diameter of from 1 nm to 100 nm and an average aspect ratio of from 20 to 5000. In some examples, the carbon nanotube has an average length of from 0.1 μm to 10 mm and an average aspect ratio of from 20 to 5000. In some examples, the carbon nanotube has an average outer diameter of from 1 nm to 100 nm, an average length of from 0.1 μm to 10 mm, and an average aspect ratio of from 20 to 5000.

In some examples, the carbon nanotube has an average outer diameter of from 1 nm to 100 nm and an average aspect ratio of from 20 to 5000 and comprises a multi-walled carbon nanotube. In some examples, the carbon nanotube has an average length of from 0.1 μm to 10 mm and an average aspect ratio of from 20 to 5000 and comprises a multi-walled carbon nanotube. In some examples, the carbon nanotube has an average outer diameter of from 1 nm to 100 nm, an average length of from 0.1 μm to 10 mm, an average aspect ratio of from 20 to 5000, and comprises a multi-walled carbon nanotube.

In some examples, the carbon nanotube has an average outer diameter of from 30 nm to 50 nm and an average aspect ratio of from 80 to 500. In some examples, the carbon nanotube has an average length of from 5 μm to 15 μm and an average aspect ratio of from 80 to 500. In some examples, the carbon nanotube has an average outer diameter of from 30 nm to 50 nm, an average length of from 5 μm to 15 μm, and an average aspect ratio of from 80 to 500.

In some examples, the carbon nanotube has an average outer diameter of from 30 nm to 50 nm and an average aspect ratio of from 80 to 500 and comprises a multi-walled carbon nanotube. In some examples, the carbon nanotube has an average length of from 5 μm to 15 μm and an average aspect ratio of from 80 to 500 and comprises a multi-walled carbon nanotube. In some examples, the carbon nanotube has an average outer diameter of from 30 nm to 50 nm, an average length of from 5 µm to 15 µm, an average aspect ratio of from 80 to 500, and comprises a multi-walled carbon nanotube.

The carbon nanotube can have an average purity of 95% or more (e.g., 96% or more, 97% or more, 98% or more, or 99% or more).

In some examples, the carbon nanotube comprises an acid-treated carbon nanotube. In some examples the carbon nanotube comprises a carbon nanotube treated with an oxidizer. In some examples, the carbon nanotube comprises a plurality of carboxylic groups on the outer surface.

In some examples, the carbon nanotube can comprise a plurality of carbon nanotubes, the plurality of carbon nanotubes comprising: a first population of carbon nanotubes having a first average outer diameter, a first average length, a first average aspect ratio, and a first purity; and a second population of carbon nanotubes having a second average outer diameter, a second average length, a second average aspect ratio, and a second purity; wherein the first average outer diameter and the second average outer diameter are different, the first average length and the second average length are different, the first average aspect ratio and the second average aspect ratio are different, the first purity and the second purity are different, or a combination thereof. In some examples, the plurality of carbon nanotubes comprise a mixture of a plurality of populations of carbon nanotubes, wherein each population of carbon nanotubes within the mixture is different with respect to average outer diameter, average length, average aspect ratio, purity, or a combination thereof.

The plurality of ferric oxyhydroxide particles are a plurality of particles comprising a ferric oxyhydroxide. In some examples, the ferric oxyhydroxide can comprise ferrihydrite. Accordingly, in some examples, the plurality of ferric oxyhydroxide particles are a plurality of ferrihydrite particles, wherein the plurality of ferrihydrite particles are a plurality of particles comprising ferrihydrite.

The plurality of ferrihydrite particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.). For an anisotropic particle, the average particle size can refer to, for example, the hydrodynamic size of the particle. Mean particle size can be measured using methods known in the art, such as evaluation by electron microscopy (e.g., scanning electron microscopy, transmission electron microscopy, or a combination thereof) and/or dynamic light scattering. As used herein, the average particle size is determined by transmission electron microscopy.

The plurality of ferrihydrite particles can, for example, have an average particle size of 1 nm or more (e.g., 1.5 nm or more, 2 nm or more, 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, 8.5 nm or more, 9 nm or more, 9.5 nm or more, 10 nm or more, 11 nm or more, 12 nm or more, 13 nm or more, 14 nm or more, 15 nm or more, 16 nm or more, 17 nm or more, or 18 nm or more). In some examples, the plurality of ferrihydrite particles can have an average particle size of 20 nm or less (e.g., 19 nm or less, 18 nm or less, 17 nm or less, 16 nm or less, 15 nm or less, 14 nm or less, 13 nm or less, 12 nm or less, 11 nm or less, 10 nm or less, 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, 2.5 nm or less, or 2 nm or less). The average particle size of the plurality of ferrihydrite particles can range from any of the minimum values described above to any of the maximum values described above. For example, the plurality of ferrihydrite particles can have an average particle size of from 1 nm to 20 nm (e.g., from 1 nm to 10 nm, from 10 nm to 20 nm, from 1 nm to 15 nm, from 1 nm to 5 nm, or from 2 nm to 4 nm).

In some examples, the plurality of ferrihydrite particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the average particle size, within 15% of the average particle size, within 10% of the average particle size, or within 5% of the average particle size).

The plurality of ferrihydrite particles can comprise particles of any shape (e.g., a sphere, a rod, a quadrilateral, an ellipse, a triangle, a polygon, etc.). In some examples, the plurality of ferrihydrite particles can have a regular shape, an irregular shape, an isotropic shape, an anisotropic shape, or a combination thereof. In some examples, the plurality of ferrihydrite particles are each substantially spherical in shape.

In some examples, each of the plurality of ferrihydrite particles has a surface and each of the plurality of ferrihydrite particles comprises a plurality of hydroxyl groups on its surface.

In some examples, the plurality of ferrihydrite particles are each substantially spherical in shape and have an average particle size of from 1 nm to 10 nm. In some examples, the plurality of ferrihydrite particles are each substantially spherical in shape and have an average particle size of from 2 nm to 4 nm.

In some examples, the plurality of ferrihydrite particles can comprise: a first population of ferrihydrite particles having a first average particle size and a first particle shape; and a second population of ferrihydrite particles having a second average particle size and a second particle shape; wherein the first average particle size and the second average particle size are different, the first particle shape and the second particle shape are different, or a combination thereof. In some examples, the plurality of ferrihydrite particles can comprise a mixture of a plurality of populations of ferrihydrite particles, wherein each population of ferrihydrite particles within the mixture is different with respect to average particle size and/or shape.

Described herein are composite materials comprising: a carbon nanotube and a plurality of ferrihydrite particles, the carbon nanotube having an outer surface and the plurality of ferrihydrite particles being disposed on the outer surface of the carbon nanotube; wherein the composite material has a specific surface area and a specific capacitance; wherein the composite material comprises the plurality of ferrihydrite particles and the carbon nanotube in a weight ratio (e.g., ratio of the percent by weight of the ferrihydrite and carbon nanotube based on the total weight of the composite) of from 5:95 to 95:5; and wherein the weight ratio is selected such that the composite material has a desired balance between the specific surface area and the specific capacitance. For example, the weight ratio can be selected to maximize the specific surface area and the specific capacitance. In some examples, the weight ratio is selected to preserve and/or balance the electrochemical and adsorptive properties of both the carbon nanotube and the plurality of ferrihydrite particles.

For example, the composite material can comprise the plurality of ferrihydrite particles and the carbon nanotube in a weight ratio of 5:95 or more (e.g., 10:90 or more, 15:85 of more, 20:80 or more, 25:75 or more, 30:70 or more, 35:65 or more, 40:60 or more, 45:55 or more, 50:50 or more, 55:45 or more, 60:40 or more, 65:35 or more, 70:30 or more, 75:25 or more, 80:20 or more, 85:15 or more, or 90:10 or more). In some examples, the composite material can comprise the plurality of ferrihydrite particles and the carbon nanotube in a weight ratio of 95:5 or less (e.g., 90:10 or less, 85:15 or less, 80:20 or less, 75:25 or less, 70:30 or less, 65:35 or less, 60:40 or less, 55:45 or less, 50:50 or less, 45:55 or less, 40:60 or less, 35:65 or less, 30:70 or less, 25:75 or less, 20:80 or less, 15:85 or less, or 10:90 or less). The weight ratio of the plurality of ferrihydrite particles to the carbon nanotube in the composite material can range from any of the minimum values described above to any of the maximum values described above. For example, the composite material can comprise the plurality of ferrihydrite particles and the carbon nanotube in a weight ratio of from 5:95 to 95:5 (e.g., from 5:95 to 50:50, from 50:50 to 95:5, from 10:90 to 90:10, from 25:75 to 75:25, or from 30:70 to 40:60). In some examples, the weight ratio of the plurality of ferrihydrite particles to the carbon nanotube in the composite material is 36:64.

The plurality of ferrihydrite particles can, for example, be disposed substantially evenly (e.g., substantially homogeneously) on the outer surface of the carbon nanotube.

In some examples, the plurality of ferrihydrite particles are bonded to the outer surface of the carbon nanotube. In some examples, the plurality of ferrihydrite particles are bonded to the outer surface of the carbon nanotube via ionic bonds. In some examples, the carbon nanotube comprises a plurality of carboxylic groups on the outer surface, each of the plurality of ferrihydrite particles has a surface and each of the plurality of ferrihydrite particles comprises a plurality of hydroxyl groups on its surface, and the plurality of ferrihydrite particles are bonded to the outer surface of the carbon nanotube via ionic bonds between the carboxyl groups and the hydroxyl groups.

The composite material can have a specific surface area of 50 or more meters squared per gram of the composite material ($m^2/g$) (e.g., 55 $m^2/g$ or more, 60 $m^2/g$ or more, 65 $m^2/g$ or more, 70 $m^2/g$ or more, 75 $m^2/g$ or more, 80 $m^2/g$ or more, 85 $m^2/g$ or more, 90 $m^2/g$ or more, 95 $m^2/g$ or more, 100 $m^2/g$ or more, 110 $m^2/g$ or more, 120 $m^2/g$ or more, 130 $m^2/g$ or more, 140 $m^2/g$ or more, 150 $m^2/g$ or more, 160 $m^2/g$ or more, 170 $m^2/g$ or more, 180 $m^2/g$ or more, 190 $m^2/g$ or more, 200 $m^2/g$ or more, 225 $m^2/g$ or more, 250 $m^2/g$ or more, 275 $m^2/g$ or more, 300 $m^2/g$ or more, 325 $m^2/g$ or more, 350 $m^2/g$ or more, 375 $m^2/g$ or more, 400 $m^2/g$ or more, 425 $m^2/g$ or more, 450 $m^2/g$ or more, 475 $m^2/g$ or more, 500 $m^2/g$ or more, 550 $m^2/g$ or more, 600 $m^2/g$ or more, 650 $m^2/g$ or more, 700 $m^2/g$ or more, 750 $m^2/g$ or more, 800 $m^2/g$ or more, 850 $m^2/g$ or more, or 900 $m^2/g$ or more). In some examples, the composite material can have a specific surface area of 1000 $m^2/g$ or less (e.g., 950 $m^2/g$ or less, 900 $m^2/g$ or less, 850 $m^2/g$ or less, 800 $m^2/g$ or less, 750 $m^2/g$ or less, 700 $m^2/g$ or less, 650 $m^2/g$ or less, 600 $m^2/g$ or less, 550 $m^2/g$ or less, 500 $m^2/g$ or less, 475 $m^2/g$ or less, 450 $m^2/g$ or less, 425 $m^2/g$ or less, 400 $m^2/g$ or less, 375 $m^2/g$ or less, 350 $m^2/g$ or less, 325 $m^2/g$ or less, 300 $m^2/g$ or less, 275 $m^2/g$ or less, 250 $m^2/g$ or less, 225 $m^2/g$ or less, 200 $m^2/g$ or less, 190 $m^2/g$ or less, 180 $m^2/g$ or less, 170 $m^2/g$ or less, 160 $m^2/g$ or less, 150 $m^2/g$ or less, 140 $m^2/g$ or less, 130 $m^2/g$ or less, 120 $m^2/g$ or less, 110 $m^2/g$ or less, 100 $m^2/g$ or less, 95 $m^2/g$ or less, 90 $m^2/g$ or less, 85 $m^2/g$ or less, 80 $m^2/g$ or less, 75 $m^2/g$ or less, 70 $m^2/g$ or less, 65 $m^2/g$ or less, or 60 $m^2/g$ or less). The specific surface area of the composite material can range from any of the minimum values described above to any of the maximum values described above. For example, the composite material can have a specific surface area of from 50 $m^2/g$ to 1000 $m^2/g$ (e.g., from 50 $m^2/g$ to 500 $m^2/g$, from 500 $m^2/g$ to 1000 $m^2/g$, from 50 $m^2/g$ to 200 $m^2/g$, from 200 $m^2/g$ to 400 $m^2/g$, from 400 $m^2/g$ to 600 $m^2/g$, from 600 $m^2/g$ to 800 $m^2/g$, from 800 $m^2/g$ to 1000 $m^2/g$, from 50 $m^2/g$ to 900 $m^2/g$, from 100 $m^2/g$ to 1000 $m^2/g$, from 100 $m^2/g$ to 900 $m^2/g$, from 50 $m^2/g$ to 460 $m^2/g$, from 150 $m^2/g$ to 350 $m^2/g$, or from 180 $m^2/g$ to 200 $m^2/g$). Herein, the specific surface area is determined via Brunauer-Emmet-Teller (BET) surface area analysis.

In some examples, the composite material has a specific capacitance of 10 or more Farads per gram of the composite material (F/g) measured at a scan rate of 5 millivolts per second (mV/s) (e.g., 10 F/g or more, 15 F/g or more, 20 F/g or more, 25 F/g or more, 30 F/g or more, 35 F/g or more, 40 F/g or more, 45 F/g or more, 50 F/g or more, 55 F/g or more, 60 F/g or more, 65 F/g or more, 70 F/g or more, 75 F/g or more, 80 F/g or more, 85 F/g or more, 90 F/g or more, 95 F/g or more, 100 F/g or more, 110 F/g or more, 120 F/g or more, 130 F/g or more, 140 F/g or more, 150 F/g or more, 160 F/g or more, 170 F/g or more, 180 F/g or more, 190 F/g or more, 200 F/g or more, 225 F/g or more, 250 F/g or more, 275 F/g or more, 300 F/g or more, 325 F/g or more, 350 F/g or more, 375 F/g or more, 400 F/g or more, 425 F/g or more, or 450 F/g or more). In some examples, the composite material has a specific capacitance of 500 F/g or less measured at a scan rate of 5 mV/s (e.g., 475 F/g or less, 450 F/g or less, 425 F/g or less, 400 F/g or less, 375 F/g or less, 350 F/g or less, 325 F/g or less, 300 F/g or less, 275 F/g or less, 250 F/g or less, 225 F/g or less, 200 F/g or less, 190 F/g or less, 180 F/g or less, 170 F/g or less, 160 F/g or less, 150 F/g or less, 140 F/g or less, 130 F/g or less, 120 F/g or less, 110 F/g or less, 95 F/g or less, 90 F/g or less, 85 F/g or less, 80 F/g or less, 75 F/g or less, 70 F/g or less, 65 F/g or less, 60 F/g or less, 55 F/g or less, 50 F/g or less, 45 F/g or less, 40 F/g or less, 35 F/g or less, 30 F/g or less, 25 F/g or less, 20 F/g or less, or 15 F/g or less). The specific capacitance of the composite material can range from any of the minimum values described above to any of the maximum values described above. For example, the composite material can have a specific capacitance of from 10 F/g to 500 F/g measured at a scan rate of 5 millivolts per second (mV/s) (e.g., from 10 F/g to 250 F/g, from 250 F/g to 500 F/g, from 10 F/g to 100 F/g, from 100 F/g to 200, from 200 F/g to 300 F/g, from 300 F/g to 400 F/g, from 400 F/g to 500 F/g, from 20 F/g to 500 F/g, from 10 F/g to 450 F/g, from 20 F/g to 450 F/g, from 10 F/g to 400 F/g, from 10 F/g to 300 F/g, from 30 F/g to 200 F/g, from 40 F/g to 120 F/g, or from 90 F/g to 110 F/g). Herein, the specific capacitance is determined via cyclic voltammetry.

In some examples, the composite material can have a specific surface area of from 50 $m^2/g$ to 1000 $m^2/g$ and a specific capacitance of from 10 F/g to 500 F/g measured at a scan rate of 5 mV/s. In some examples, the composite material has a specific surface area of from 180 $m^2/g$ to 200 $m^2/g$ and a specific capacitance of from 90 F/g to 110 F/g measured at a scan rate of 5 mV/s.

The average outer diameter of the carbon nanotube, the average length of the carbon nanotube, the average aspect ratio of the carbon nanotube, the shape of the plurality of ferrihydrite particles, the average particle size of the plurality of ferrihydrite particles, the weight ratio of the plurality of ferrihydrite particles to the carbon nanotube in the composite material, or a combination thereof can be selected in view of a variety of factors. For example, average outer diameter of the carbon nanotube, the average length of the carbon nanotube, the average aspect ratio of the carbon nanotube, the shape of the plurality of ferrihydrite particles, the average particle size of the plurality of ferrihydrite particles, the weight ratio of the plurality of ferrihydrite particles to the carbon nanotube in the composite material, or a combination thereof can be selected based on the desired specific surface area of the composite material, the desired specific capacitance of the composite material, the desired balance between the specific surface area and the specific capacitance of the composite material, the desired use of the composite material, or a combination thereof.

In some examples, the composite material can comprise a plurality of composite materials, the plurality of composite materials comprising a first population of composite materials and a second population of composite materials; wherein the first population of composite materials comprises: a first carbon nanotube having a first average outer diameter, a first average length, a first average aspect ratio, and a first purity; a first plurality of ferrihydrite particles having a first average particle size and a first shape; wherein the first composite material comprises the first plurality of ferrihydrite particles and the first carbon nanotube at a first weight ratio; and wherein the first composite material has a first specific surface area and a first specific capacitance; wherein the second population of composite materials comprises: a second carbon nanotube having a second average outer diameter, a second average length, a second average aspect ratio, and a second purity; a second plurality of ferrihydrite particles having a second average particle size and a second shape; wherein the second composite material comprises the second plurality of ferrihydrite particles and the second carbon nanotube at a second weight ratio; wherein the second composite material has a second specific surface area and a second specific capacitance; and wherein the first average outer diameter and the second average outer diameter are different, the first average length and the second average length are different, the first average aspect ratio and the second average aspect ratio are different, the first purity and the second purity are different, first average particle size and the second average particle size are different, the first particle shape and the second particle shape are different, the first weight ratio and the second weight ratio are different, the first specific surface area and the second specific surface area are different, the first specific capacitance and the second specific capacitance are different, or a combination thereof.

In some examples, the composite material can comprise a mixture of a plurality of populations of composite materials, wherein each population of composite materials within the mixture is different with respect to the average outer diameter of the carbon nanotubes, the average length of the carbon nanotubes, the average aspect ratio of the carbon nanotubes, the purity of the carbon nanotubes, the average particle size of the plurality of ferrihydrite particles, the shape of the plurality of ferrihydrite particles, the specific surface area, the specific capacitance, or a combination thereof.

The composite materials described herein are different than the materials described by Poinern et al. *International Journal of Engineering, Science and Technology*, 2010, 8(2), 13-24. For example, the carbon nanotube (e.g., the average outer diameter, average length, average aspect ratio, purity, or combination thereof); the plurality of ferrihydrite particles (e.g., the average particle size, shape, or combination thereof); the weight ratio of the plurality of ferrihydrite particles and the carbon nanotube; the specific surface area of the composite material; the specific capacitance of the composite material; or a combination thereof is/are different than that described by Poinern et al. *International Journal of Engineering, Science and Technology*, 2010, 8(2), 13-24. The composite materials described herein are not the materials described by Poinern et al. *International Journal of Engineering, Science and Technology*, 2010, 8(2), 13-24.

Articles of Manufacture

Also described herein are objects and articles of manufacture comprising any of the composite materials described herein. Also described herein are methods of use of any of the composite materials described herein.

For example, also described herein are filters for separating a component from a fluid stream, the filter comprising any of the composite materials described herein. In some examples, the composite material can form a free-standing filter. In some examples, the composite material is supported by a substrate. In some examples, the composite material is coated on the substrate. Examples of suitable substrates include, but are not limited to, polymers (e.g., porous polymers), glass fibers, glass, quartz, silicon, nitrides (e.g., silicon nitride), and combinations thereof. In some examples, the substrate comprises a plurality of particles or beads, such that the filter comprises any of the composite materials described herein coated on a plurality of particles or beads.

In some examples, the fluid stream comprises liquid water or an aqueous solution. In some examples, the fluid stream can comprise a salt solution, produced water (e.g., from mining, fracking, oil recovery), brine, or a combination thereof. In some examples, the fluid stream comprises liquid water or an aqueous solution, such as drinking water, sea water, brackish water, saline water, wastewater, industrial effluent water, brine, salt water, or a combination thereof.

In some examples, the fluid stream comprises an organic solvent.

The component separated from the fluid stream can, for example, comprise an inorganic contaminant, an organic contaminant, or a combination thereof. In some examples, the component separated from the fluid stream comprises a metal. In some examples, the component separated from the fluid stream comprises a heavy metal, such as cadmium, arsenic, mercury, lead, chromium, zinc, copper, and combinations thereof. In some examples, the component separated from the fluid stream comprises lead, arsenic, or a combination thereof.

In some examples, the component separated from the fluid stream comprises a salt, an ion, an organic molecule, a biological agent (e.g., a bacterium, virus, protozoan, parasite, fungus, biological warfare agent, or combination thereof), or a combination thereof. In some examples, the component separated from the fluid stream comprises a pesticide, a perfluorinated compound, a viral pathogen, or a combination thereof.

In some examples, the filter can comprise a desalination filter, a wastewater treatment filter, a heavy metal removal filter, or a combination thereof.

As used herein, the term "desalination" refers to a process for removal of ion, salts, minerals, or a combination thereof from an aqueous sample. For example, desalination can remove ions, salts, minerals, or a combination thereof from an aqueous sample in order to produce potable water that is safe for ingestion and/or for a variety of domestic and industrial uses. Ions, salts, minerals, or a combination thereof that can be removed by the filters described herein include, but are not limited to, sodium, potassium, calcium, magnesium, chloride, fluoride, bromide, sulfate, sulfide, nitrate, bicarbonate, carbonate, and combinations thereof.

Also disclosed herein are methods of use of any of the filters described herein, the methods comprising using the filter in a separation to separate the component from the fluid stream. In some examples, the method comprises water purification, environmental remediation, solid phase extraction, or a combination thereof. In some examples, the method comprises water desalination, wastewater treatment, heavy metal removal, water softening, or a combination thereof. The methods can, for example, comprise contacting the fluid stream with the filter.

The fluid stream, for example, can be contacted with the filter for an amount of time of 10 seconds or more (e.g., 15 seconds or more, 20 seconds or more, 25 seconds or more, 30 seconds or more, 35 seconds or more, 40 seconds or more, 45 seconds or more, 50 seconds or more, 55 seconds or more, 1 minute or more, 1.5 minutes or more, 2 minutes or more, 2.5 minutes or more, 3 minutes or more, 3.5 minutes or more, 4 minutes or more, 4.5 minutes or more, 5 minutes or more, 6 minutes or more, 7 minutes or more, 8 minutes or more, 9 minutes or more, 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 1 hour or more, 1.5 hours or more, 2 hours or more, 2.5 hours or more, 3 hours or more, 3.5 hours or more, 4 hours or more, 4.5 hours or more, 5 hours or more, 5.5 hours or more, 6 hours or more, 7 hours or more, 8 hours or more, 9 hours or more, 10 hours or more, 11 hours or more, 12 hours or more, 14 hours or more, 16 hours or more, 18 hours or more, 20 hours or more, 22 hours or more, 24 hours or more, 30 hours or more, 36 hours or more, or 42 hours or more). In some examples, the fluid stream can be contacted with the filter for an amount of time of 48 hours or less (e.g., 42 hours or less, 36 hours or less, 30 hours or less, 24 hours or less, 22 hours or less, 20 hours or less, 18 hours or less, 16 hours or less, 14 hours or less, 12 hours or less, 11 hours or less, 10 hours or less, 9 hours or less, 8 hours or less, 7 hours or less, 6 hours or less, 5.5 hours or less, 5 hours or less, 4.5 hours or less, 4 hours or less, 3.5 hours or less, 3 hours or less, 2.5 hours or less, 2 hours or less, 1.5 hours or less, 1 hour or less, 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, 9 minutes or less, 8 minutes or less, 7 minutes or less, 6 minutes or less, 5 minutes or less, 4.5 minutes or less, 4 minutes or less, 3.5 minutes or less, 3 minutes or less, 2.5 minutes or less, 2 minutes or less, 1.5 minutes or less, 1 minute or less, 55 seconds or less, 50 seconds or less, 45 seconds or less, 40 seconds or less, 35 seconds or less, 30 seconds or less, 25 seconds or less, or 20 seconds or less). The amount of time that the fluid contacts the filter can range from any of the minimum values described above to any of the maximum values described above. For example, the fluid can be contacted with the filter for an amount of time of from 10 seconds to 48 hours (e.g., from 10 seconds to 1 minute, from 1 minute to 1 hour, from 1 hour to 24 hours, from 24 hours to 48 hours, from 1 minute to 48 hours, from 10 seconds to 36 hours, or from 1 minute to 36 hours).

Also disclosed herein are methods for purifying an aqueous sample, the methods comprising contacting the aqueous sample with any of the filters described herein. In some examples, purifying the aqueous sample comprises water desalination, wastewater treatment, heavy metal removal, water softening, or a combination thereof.

Also disclosed herein are water purification systems, the systems comprising one or more of the filters described herein. In some examples, the system comprises a water desalination system, a wastewater treatment system, a heavy metal removal system, a water softening system, or a combination thereof.

Methods of Making

Also disclosed herein are methods of making the composite materials described herein. The methods can, for example, comprise: contacting the carbon nanotube with an amount of iron nitrate to form a mixture, wherein the amount of iron nitrate relative to the carbon nanotube determines the weight ratio of the plurality of ferrihydrite particles and the carbon nanotube in the composite material; and contacting the mixture with a base to adjust the pH of the mixture to induce precipitation of the plurality of ferrihydrite particles onto the outer surface of the carbon nanotube; thereby forming the composite material. The base can comprise any suitable base for adjusting the pH of the mixture. Examples of bases include, but are not limited to lithium hydroxide, sodium hydroxide, potassium hydroxide, rubidium hydroxide, cesium hydroxide, calcium hydroxide, strontium hydroxide, barium hydroxide, butyl lithium, lithium diisopropylamide, lithium diethylamide, sodium amide, sodium hydride, lithium bis(trimethylsilyl)amide, ammonia, and combinations thereof. In some examples, the base comprises potassium hydroxide.

In some examples, the mixture further comprises a solvent. Examples of suitable solvents include, but are not limited to, tetrahydrofuran (THF), N-methyl-2-pyrrolidone (NMP), dimethylformamide (DMF), N-methylformamide, formamide, dimethyl sulfoxide (DMSO), dimethylacetamide, dichloromethane ($CH_2Cl_2$), ethylene glycol, polyethylene glycol, glycerol, alkane diol, tetraglyme, propylene carbonate, diglyme, dimethoxyethane, ethanol, methanol, propanol, isopropanol, water, acetonitrile, chloroform, acetone, hexane, heptane, toluene, xylene, methyl acetate, ethyl acetate, and combinations thereof. In some examples, the solvent comprises water, such that the mixture comprises an aqueous solution.

In some examples, the method further comprises agitating the mixture before contacting the mixture with the base. Agitating the mixture can be accomplished, for example, by mechanical stirring, shaking, vortexing, sonication (e.g., bath sonication, probe sonication, ultrasonication), and the like, or combinations thereof.

In some examples, the method further comprises separating the composite material from the solvent. Separating the composite material can, for example, comprise decanting, centrifugation, filtration, or a combination thereof.

In some examples, the methods can further comprise making the carbon nanotube.

In some examples, prior to contacting the carbon nanotube with the iron nitrate, the method further comprises refluxing the carbon nanotube with an acid or oxidizing agent. The refluxing can, for example, remove any residual catalyst or metal impurities from the methods of making the carbon nanotube and/or functionalize the surface of the carbon nanotube with carboxyl groups. This functionalization can, for example, enhance the dispersion, surface area, and electrical properties of the carbon nanotubes.

Examples of suitable acids include, but are not limited to, nitric acid, sulfuric acid, hydrochloric acid, acetic acid, hydroiodic acid, hydrobromic acid, perchloric acid, chloric acid, phosphoric acid, nitrous acid, hydrofluoric acid, oxalic acid, or combinations thereof. In some examples, the acid comprise nitric acid.

Examples of suitable oxidizing agents include, but are not limited to, aluminum nitrate, ammonium persulfate, barium peroxide, hydrogen peroxide, magnesium nitrate, m-chloroperoxybenzoic acid, nitric acid, peracetic acid, perchloric acid, potassium dichromate, potassium nitrate, silver nitrate, sodium dichloroisocyanurate dihydrate, sodium dichromate, sodium nitrate, sodium nitrite, sodium perborate, sodium persulfate, strontium nitrate, strontium peroxide, trichloroisocyanuric acid, zinc peroxide, calcium chloride, calcium hypochlorite, chromic acid (chromium trioxide), 1,3-dichloro-5,5-dimethylhydantoin, magnesium perchlorate, potassium permanganate, sodium permanganate, sodium chlorite, sodium perchlorate, sodium peroxide, ammonium dichromate, potassium bromate, potassium chlorate, potassium dichloroisocyanurate, sodium chlorate, sodium dichloroisocyanurate, ammonium perchlorate, ammonium permanganate, tetranitromethane, and combinations thereof. In some examples, the oxidizing agent can comprise nitric acid, potassium permanganate, hydrogen peroxide, or combinations thereof.

Methods

Also disclosed herein are methods comprising making a plurality of composite materials, wherein each composite material comprises a carbon nanotube and a plurality of ferrihydrite particles in a weight ratio, the carbon nanotube having an outer surface and the plurality of ferrihydrite particles being disposed on the outer surface of the carbon nanotube, and wherein the weight ratio of the plurality of ferrihydrite particles and the carbon nanotube is different for each composite material. Making the plurality of composite materials can comprise any of the methods described herein.

The methods further comprise determining the specific surface area and the specific capacitance of each composite material in the plurality of composite materials; and comparing the specific surface area and specific surface capacitance for the plurality of composite materials to determine the weight ratio of the plurality of ferrihydrite particles and carbon nanotube at which the composite material has a desired balance between the specific surface area and the specific capacitance. The specific surface area can, for example, be determined via Brunauer-Emmet-Teller (BET) surface area analysis.

The specific capacitance can, for example, be determined via cyclic voltammetry. In some examples, the method further comprises combining each composite material with a Nafion ionomer solution to form a Nafion mixture, depositing the Nafion mixture on an electrode to form a thin film on the electrode, thus forming the working electrode, and performing cyclic voltammetry using the working electrode. In some examples, after depositing the Nafion mixture on the electrode, the method further comprises drying the thin film on the electrode. Drying the thin film on the electrode can, for example, comprise placing the electrode with the thin film in a sealed chamber with an ethanol bath, sealing the chamber, and controlling the ethanol vapor pressure in the sealed chamber to dry the thin film on the electrode at a controlled rate (e.g., to avoid cracking the thin film due to rapid drying).

Example Composite Materials

In some examples, the carbon nanotube has an average outer diameter of from 1 nm to 100 nm and the plurality of ferrihydrite particles are each substantially spherical in shape. In some examples, the carbon nanotube has an average length of from 0.1 µm to 10 mm and the plurality of ferrihydrite particles are each substantially spherical in shape. In some examples, the carbon nanotube has an average aspect ratio of from 20 to 5000 and the plurality of ferrihydrite particles are each substantially spherical in shape. In some examples, the carbon nanotube has an average outer diameter of from 1 nm to 100 nm and an average length of from 0.1 µm to 10 mm, and the plurality of ferrihydrite particles are each substantially spherical in shape. In some examples, the carbon nanotube has an average outer diameter of from 1 nm to 100 nm and an average aspect ratio of from 20 to 5000, and the plurality of ferrihydrite particles are each substantially spherical in shape. In some examples, the carbon nanotube has an average length of from 0.1 µm to 10 mm and an average aspect ratio of from 20 to 5000, and the plurality of ferrihydrite particles are each substantially spherical in shape. In some examples, the carbon nanotube has an average outer diameter of from 1 nm to 100 nm, an average length of from 0.1 µm to 10 mm, and an average aspect ratio of from 20 to 5000, and the plurality of ferrihydrite particles are each substantially spherical in shape.

In some examples, the carbon nanotube has an average outer diameter of from 1 nm to 100 nm and the plurality of ferrihydrite particles have an average particle size of from 1 nm to 10 nm. In some examples, the carbon nanotube has an average length of from 0.1 µm to 10 mm and the plurality of ferrihydrite particles have an average particle size of from 1 nm to 10 nm. In some examples, the carbon nanotube has an average aspect ratio of from 20 to 5000 and the plurality of ferrihydrite particles have an average particle size of from 1 nm to 10 nm. In some examples, the carbon nanotube has an average outer diameter of from 1 nm to 100 nm and an average length of from 0.1 µm to 10 mm, and the plurality of ferrihydrite particles have an average particle size of from 1 nm to 10 nm. In some examples, the carbon nanotube has an average outer diameter of from 1 nm to 100 nm and an average aspect ratio of from 20 to 5000, and the plurality of ferrihydrite particles have an average particle size of from 1 nm to 10 nm. In some examples, the carbon nanotube has an average length of from 0.1 µm to 10 mm and an average aspect ratio of from 20 to 5000, and the plurality of ferrihydrite particles have an average particle size of from 1 nm to 10 nm. In some examples, the carbon nanotube has an average outer diameter of from 1 nm to 100 nm, an average length of from 0.1 µm to 10 mm, and an average aspect ratio of from 20 to 5000, and the plurality of ferrihydrite particles have an average particle size of from 1 nm to 10 nm.

In some examples, the carbon nanotube has an average outer diameter of from 1 nm to 100 nm and the plurality of ferrihydrite particles are each substantially spherical in shape and have an average particle size of from 1 nm to 10 nm. In some examples, the carbon nanotube has an average length of from 0.1 μm to 10 mm and the plurality of ferrihydrite particles are each substantially spherical in shape and have an average particle size of from 1 nm to 10 nm. In some examples, the carbon nanotube has an average aspect ratio of from 20 to 5000 and the plurality of ferrihydrite particles are each substantially spherical in shape and have an average particle size of from 1 nm to 10 nm. In some examples, the carbon nanotube has an average outer diameter of from 1 nm to 100 nm and an average length of from 0.1 μm to 10 mm, and the plurality of ferrihydrite particles are each substantially spherical in shape and have an average particle size of from 1 nm to 10 nm. In some examples, the carbon nanotube has an average outer diameter of from 1 nm to 100 nm and an average aspect ratio of from 20 to 5000, and the plurality of ferrihydrite particles are each substantially spherical in shape and have an average particle size of from 1 nm to 10 nm. In some examples, the carbon nanotube has an average length of from 0.1 μm to 10 mm and an average aspect ratio of from 20 to 5000, and the plurality of ferrihydrite particles are each substantially spherical in shape and have an average particle size of from 1 nm to 10 nm. In some examples, the carbon nanotube has an average outer diameter of from 1 nm to 100 nm, an average length of from 0.1 μm to 10 mm, and an average aspect ratio of from 20 to 5000, and the plurality of ferrihydrite particles are each substantially spherical in shape and have an average particle size of from 1 nm to 10 nm.

In some examples, the carbon nanotube has an average outer diameter of from 1 nm to 100 nm and the weight ratio of the plurality of ferrihydrite particles to the carbon nanotube in the composite material is from 5:95 to 95:5. In some examples, the carbon nanotube has an average length of from 0.1 μm to 10 mm and the weight ratio of the plurality of ferrihydrite particles to the carbon nanotube in the composite material is from 5:95 to 95:5. In some examples, the carbon nanotube has an average aspect ratio of from 20 to 5000 and the weight ratio of the plurality of ferrihydrite particles to the carbon nanotube in the composite material is from 5:95 to 95:5. In some examples, the carbon nanotube has an average outer diameter of from 1 nm to 100 nm and an average length of from 0.1 μm to 10 mm, and the weight ratio of the plurality of ferrihydrite particles to the carbon nanotube in the composite material is from 5:95 to 95:5. In some examples, the carbon nanotube has an average outer diameter of from 1 nm to 100 nm and an average aspect ratio of from 20 to 5000, and the weight ratio of the plurality of ferrihydrite particles to the carbon nanotube in the composite material is from 5:95 to 95:5. In some examples, the carbon nanotube has an average length of from 0.1 μm to 10 mm and an average aspect ratio of from 20 to 5000, and the weight ratio of the plurality of ferrihydrite particles to the carbon nanotube in the composite material is from 5:95 to 95:5. In some examples, the carbon nanotube has an average outer diameter of from 1 nm to 100 nm, an average length of from 0.1 μm to 10 mm, and an average aspect ratio of from 20 to 5000, and the weight ratio of the plurality of ferrihydrite particles to the carbon nanotube in the composite material is from 5:95 to 95:5.

In some examples, the plurality of ferrihydrite particles are each substantially spherical in shape and the weight ratio of the plurality of ferrihydrite particles to the carbon nanotube in the composite material is from 5:95 to 95:5. In some examples, the plurality of ferrihydrite particles have an average particle size of from 1 nm to 10 nm and the weight ratio of the plurality of ferrihydrite particles to the carbon nanotube in the composite material is from 5:95 to 95:5. In some examples, the plurality of ferrihydrite particles are each substantially spherical in shape and have an average particle size of from 1 nm to 10 nm, and the weight ratio of the plurality of ferrihydrite particles to the carbon nanotube in the composite material is from 5:95 to 95:5.

In some examples, the carbon nanotube has an average outer diameter of from 1 nm to 100 nm, the plurality of ferrihydrite particles are each substantially spherical in shape, and the weight ratio of the plurality of ferrihydrite particles to the carbon nanotube in the composite material is from 5:95 to 95:5. In some examples, the carbon nanotube has an average length of from 0.1 μm to 10 mm, the plurality of ferrihydrite particles are each substantially spherical in shape, and the weight ratio of the plurality of ferrihydrite particles to the carbon nanotube in the composite material is from 5:95 to 95:5. In some examples, the carbon nanotube has an average aspect ratio of from 20 to 5000, the plurality of ferrihydrite particles are each substantially spherical in shape, and the weight ratio of the plurality of ferrihydrite particles to the carbon nanotube in the composite material is from 5:95 to 95:5. In some examples, the carbon nanotube has an average outer diameter of from 1 nm to 100 nm and an average length of from 0.1 μm to 10 mm, the plurality of ferrihydrite particles are each substantially spherical in shape, and the weight ratio of the plurality of ferrihydrite particles to the carbon nanotube in the composite material is from 5:95 to 95:5. In some examples, the carbon nanotube has an average outer diameter of from 1 nm to 100 nm and an average aspect ratio of from 20 to 5000, the plurality of ferrihydrite particles are each substantially spherical in shape, and the weight ratio of the plurality of ferrihydrite particles to the carbon nanotube in the composite material is from 5:95 to 95:5. In some examples, the carbon nanotube has an average length of from 0.1 μm to 10 mm and an average aspect ratio of from 20 to 5000, the plurality of ferrihydrite particles are each substantially spherical in shape, and the weight ratio of the plurality of ferrihydrite particles to the carbon nanotube in the composite material is from 5:95 to 95:5. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape, and the weight ratio of the plurality of ferrihydrite particles to the carbon nanotube in the composite material is from 5:95 to 95:5.

In some examples, the carbon nanotube has an average outer diameter of from 1 nm to 100 nm, the plurality of ferrihydrite particles have an average particle size of from 1 nm to 10 nm, and the weight ratio of the plurality of ferrihydrite particles to the carbon nanotube in the composite material is from 5:95 to 95:5. In some examples, the carbon nanotube has an average length of from 0.1 μm to 10 mm, the plurality of ferrihydrite particles have an average particle size of from 1 nm to 10 nm, and the weight ratio of the plurality of ferrihydrite particles to the carbon nanotube in the composite material is from 5:95 to 95:5. In some examples, the carbon nanotube has an average aspect ratio of from 20 to 5000, the plurality of ferrihydrite particles have an average particle size of from 1 nm to 10 nm, and the weight ratio of the plurality of ferrihydrite particles to the carbon nanotube in the composite material is from 5:95 to 95:5. In some examples, the carbon nanotube has an average outer diameter of from 1 nm to 100 nm and an average length of from 0.1 μm to 10 mm, the plurality of ferrihydrite particles have an average particle size of from 1 nm to 10 nm, and the weight ratio of the plurality of ferrihydrite particles to the carbon nanotube in the composite material is from 5:95 to 95:5. In some examples, the carbon nanotube has an average outer diameter of from 1 nm to 100 nm and an average aspect ratio of from 20 to 5000, the plurality of ferrihydrite particles have an average particle size of from 1 nm to 10 nm, and the weight ratio of the plurality of ferrihydrite particles to the carbon nanotube in the composite material is from 5:95 to 95:5. In some examples, the carbon nanotube has an average length of from 0.1 μm to 10 mm and an average aspect ratio of from 20 to 5000, the plurality of ferrihydrite particles have an average particle size of from 1 nm to 10 nm, and the weight ratio of the plurality of ferrihydrite particles to the carbon nanotube in the composite material is from 5:95 to 95:5. In some examples, the carbon nanotube has an average outer diameter of from 1 nm to 100 nm, an average length of from 0.1 μm to 10 mm, and an average aspect ratio of from 20 to 5000, the plurality of ferrihydrite particles have an average particle size of from 1 nm to 10 nm, and the weight ratio of the plurality of ferrihydrite particles to the carbon nanotube in the composite material is from 5:95 to 95:5.

In some examples, the carbon nanotube has an average outer diameter of from 1 nm to 100 nm, the plurality of ferrihydrite particles are each substantially spherical in shape and have an average particle size of from 1 nm to 10 nm, and the weight ratio of the plurality of ferrihydrite particles to the carbon nanotube in the composite material is from 5:95 to 95:5. In some examples, the carbon nanotube has an average length of from 0.1 μm to 10 mm, the plurality of ferrihydrite particles are each substantially spherical in shape and have an average particle size of from 1 nm to 10 nm, and the weight ratio of the plurality of ferrihydrite particles to the carbon nanotube in the composite material is from 5:95 to 95:5. In some examples, the carbon nanotube has an average aspect ratio of from 20 to 5000, the plurality of ferrihydrite particles are each substantially spherical in shape and have an average particle size of from 1 nm to 10 nm, and the weight ratio of the plurality of ferrihydrite particles to the carbon nanotube in the composite material is from 5:95 to 95:5. In some examples, the carbon nanotube has an average outer diameter of from 1 nm to 100 nm and an average length of from 0.1 μm to 10 mm, the plurality of ferrihydrite particles are each substantially spherical in shape and have an average particle size of from 1 nm to 10 nm, and the weight ratio of the plurality of ferrihydrite particles to the carbon nanotube in the composite material is from 5:95 to 95:5. In some examples, the carbon nanotube has an average outer diameter of from 1 nm to 100 nm and an average aspect ratio of from 20 to 5000, the plurality of ferrihydrite particles are each substantially spherical in shape and have an average particle size of from 1 nm to 10 nm, and the weight ratio of the plurality of ferrihydrite particles to the carbon nanotube in the composite material is from 5:95 to 95:5. In some examples, the carbon nanotube has an average length of from 0.1 μm to 10 mm and an average aspect ratio of from 20 to 5000, the plurality of ferrihydrite particles are each substantially spherical in shape and have an average particle size of from 1 nm to 10 nm, and the weight ratio of the plurality of ferrihydrite particles to the carbon nanotube in the composite material is from 5:95 to 95:5. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape and have an average particle size of from 1 nm to 10 nm, and the weight ratio of the plurality of ferrihydrite particles to the carbon nanotube in the composite material is from 5:95 to 95:5.

In some examples, the carbon nanotube has an average outer diameter of from 1 nm to 100 nm and the composite material has a specific surface area of from 50 $m^2/g$ to 1000 $m^2/g$. In some examples, the carbon nanotube has an average length of from 0.1 μm to 10 mm and the composite material has a specific surface area of from 50 $m^2/g$ to 1000 $m^2/g$. In some examples, the carbon nanotube has an average aspect ratio of from 20 to 5000 and the composite material has a specific surface area of from 50 $m^2/g$ to 1000 $m^2/g$. In some examples, the carbon nanotube has an average outer diameter of from 1 nm to 100 nm and an average length of from 0.1 μm to 10 mm, and the composite material has a specific surface area of from 50 $m^2/g$ to 1000 $m^2/g$. In some examples, the carbon nanotube has an average outer diameter of from 1 nm to 100 nm and an average aspect ratio of from 20 to 5000, and the composite material has a specific surface area of from 50 $m^2/g$ to 1000 $m^2/g$. In some examples, the carbon nanotube has an average length of from 0.1 μm to 10 mm and an average aspect ratio of from 20 to 5000, and the composite material has a specific surface area of from 50 $m^2/g$ to 1000 $m^2/g$. In some examples, the carbon nanotube has an average outer diameter of from 1 nm to 100 nm, an average length of from 0.1 μm to 10 mm, and an average aspect ratio of from 20 to 5000, and the composite material has a specific surface area of from 50 $m^2/g$ to 1000 $m^2/g$.

In some examples, the plurality of ferrihydrite particles are each substantially spherical in shape and the composite material has a specific surface area of from 50 $m^2/g$ to 1000 $m^2/g$. In some examples, the plurality of ferrihydrite particles have an average particle size of from 1 nm to 10 nm and the composite material has a specific surface area of from 50 $m^2/g$ to 1000 $m^2/g$. In some examples, the plurality of ferrihydrite particles are each substantially spherical in shape and have an average particle size of from 1 nm to 10 nm, and the composite material has a specific surface area of from 50 $m^2/g$ to 1000 $m^2/g$.

In some examples, the carbon nanotube has an average outer diameter of from 1 nm to 100 nm, the plurality of ferrihydrite particles are each substantially spherical in shape, and the composite material has a specific surface area of from 50 $m^2/g$ to 1000 $m^2/g$. In some examples, the carbon nanotube has an average length of from 0.1 μm to 10 mm, the plurality of ferrihydrite particles are each substantially spherical in shape, and the composite material has a specific surface area of from 50 $m^2/g$ to 1000 $m^2/g$. In some examples, the carbon nanotube has an average aspect ratio of from 20 to 5000, the plurality of ferrihydrite particles are each substantially spherical in shape, and the composite material has a specific surface area of from 50 $m^2/g$ to 1000 $m^2/g$. In some examples, the carbon nanotube has an average outer diameter of from 1 nm to 100 nm and an average length of from 0.1 μm to 10 mm, the plurality of ferrihydrite particles are each substantially spherical in shape, and the composite material has a specific surface area of from 50 $m^2/g$ to 1000 $m^2/g$. In some examples, the carbon nanotube has an average outer diameter of from 1 nm to 100 nm and an average aspect ratio of from 20 to 5000, the plurality of ferrihydrite particles are each substantially spherical in shape, and the composite material has a specific surface area of from 50 $m^2/g$ to 1000 $m^2/g$. In some examples, the carbon nanotube has an average length of from 0.1 μm to 10 mm and an average aspect ratio of from 20 to 5000, the plurality of ferrihydrite particles are each substantially spherical in shape, and the composite material has a specific surface area of from 50 m²/g to 1000 m²/g. In some examples, the carbon nanotube has an average outer diameter of from 1 nm to 100 nm, an average length of from 0.1 µm to 10 mm, and an average aspect ratio of from 20 to 5000, the plurality of ferrihydrite particles are each substantially spherical in shape, and the composite material has a specific surface area of from 50 m²/g to 1000 m²/g.

In some examples, the carbon nanotube has an average outer diameter of from 1 nm to 100 nm, the plurality of ferrihydrite particles have an average particle size of from 1 nm to 10 nm, and the composite material has a specific surface area of from 50 m²/g to 1000 m²/g. In some examples, the carbon nanotube has an average length of from 0.1 µm to 10 mm, the plurality of ferrihydrite particles have an average particle size of from 1 nm to 10 nm, and the composite material has a specific surface area of from 50 m²/g to 1000 m²/g. In some examples, the carbon nanotube has an average aspect ratio of from 20 to 5000, the plurality of ferrihydrite particles have an average particle size of from 1 nm to 10 nm, and the composite material has a specific surface area of from 50 m²/g to 1000 m²/g. In some examples, the carbon nanotube has an average outer diameter of from 1 nm to 100 nm and an average length of from 0.1 µm to 10 mm, the plurality of ferrihydrite particles have an average particle size of from 1 nm to 10 nm, and the composite material has a specific surface area of from 50 m²/g to 1000 m²/g. In some examples, the carbon nanotube has an average outer diameter of from 1 nm to 100 nm and an average aspect ratio of from 20 to 5000, the plurality of ferrihydrite particles have an average particle size of from 1 nm to 10 nm, and the composite material has a specific surface area of from 50 m²/g to 1000 m²/g. In some examples, the carbon nanotube has an average length of from 0.1 µm to 10 mm and an average aspect ratio of from 20 to 5000, the plurality of ferrihydrite particles have an average particle size of from 1 nm to 10 nm, and the composite material has a specific surface area of from 50 m²/g to 1000 m²/g. In some examples, the carbon nanotube has an average outer diameter of from 1 nm to 100 nm, an average length of from 0.1 µm to 10 mm, and an average aspect ratio of from 20 to 5000, the plurality of ferrihydrite particles have an average particle size of from 1 nm to 10 nm, and the composite material has a specific surface area of from 50 m²/g to 1000 m²/g.

In some examples, the carbon nanotube has an average outer diameter of from 1 nm to 100 nm, the plurality of ferrihydrite particles are each substantially spherical in shape and have an average particle size of from 1 nm to 10 nm, and the composite material has a specific surface area of from 50 m²/g to 1000 m²/g. In some examples, the carbon nanotube has an average length of from 0.1 µm to 10 mm the plurality of ferrihydrite particles are each substantially spherical in shape and have an average particle size of from 1 nm to 10 nm, and the composite material has a specific surface area of from 50 m²/g to 1000 m²/g. In some examples, the carbon nanotube has an average aspect ratio of from 20 to 5000, the plurality of ferrihydrite particles are each substantially spherical in shape and have an average particle size of from 1 nm to 10 nm, and the composite material has a specific surface area of from 50 m²/g to 1000 m²/g. In some examples, the carbon nanotube has an average outer diameter of from 1 nm to 100 nm and an average length of from 0.1 µm to 10 mm, the plurality of ferrihydrite particles are each substantially spherical in shape and have an average particle size of from 1 nm to 10 nm, and the composite material has a specific surface area of from 50 m²/g to 1000 m²/g. In some examples, the carbon nanotube has an average outer diameter of from 1 nm to 100 nm and an average aspect ratio of from 20 to 5000, the plurality of ferrihydrite particles are each substantially spherical in shape and have an average particle size of from 1 nm to 10 nm, and the composite material has a specific surface area of from 50 m²/g to 1000 m²/g. In some examples, the carbon nanotube has an average length of from 0.1 µm to 10 mm and an average aspect ratio of from 20 to 5000, the plurality of ferrihydrite particles are each substantially spherical in shape and have an average particle size of from 1 nm to 10 nm, and the composite material has a specific surface area of from 50 m²/g to 1000 m²/g. In some examples, the carbon nanotube has an average outer diameter of from 1 nm to 100 nm, an average length of from 0.1 µm to 10 mm, and an average aspect ratio of from 20 to 5000, the plurality of ferrihydrite particles are each substantially spherical in shape and have an average particle size of from 1 nm to 10 nm, and the composite material has a specific surface area of from 50 m²/g to 1000 m²/g.

In some examples, the carbon nanotube has an average outer diameter of from 1 nm to 100 nm, the weight ratio of the plurality of ferrihydrite particles to the carbon nanotube in the composite material is from 5:95 to 95:5, and the composite material has a specific surface area of from 50 m²/g to 1000 m²/g. In some examples, the carbon nanotube has an average length of from 0.1 µm to 10 mm, the weight ratio of the plurality of ferrihydrite particles to the carbon nanotube in the composite material is from 5:95 to 95:5, and the composite material has a specific surface area of from 50 m²/g to 1000 m²/g. In some examples, the carbon nanotube has an average aspect ratio of from 20 to 5000, the weight ratio of the plurality of ferrihydrite particles to the carbon nanotube in the composite material is from 5:95 to 95:5, and the composite material has a specific surface area of from 50 m²/g to 1000 m²/g. In some examples, the carbon nanotube has an average outer diameter of from 1 nm to 100 nm and an average length of from 0.1 µm to 10 mm, the weight ratio of the plurality of ferrihydrite particles to the carbon nanotube in the composite material is from 5:95 to 95:5, and the composite material has a specific surface area of from 50 m²/g to 1000 m²/g. In some examples, the carbon nanotube has an average outer diameter of from 1 nm to 100 nm and an average aspect ratio of from 20 to 5000, the weight ratio of the plurality of ferrihydrite particles to the carbon nanotube in the composite material is from 5:95 to 95:5, and the composite material has a specific surface area of from 50 m²/g to 1000 m²/g. In some examples, the carbon nanotube has an average length of from 0.1 µm to 10 mm and an average aspect ratio of from 20 to 5000, the weight ratio of the plurality of ferrihydrite particles to the carbon nanotube in the composite material is from 5:95 to 95:5, and the composite material has a specific surface area of from 50 m²/g to 1000 m²/g. In some examples, the carbon nanotube has an average outer diameter of from 1 nm to 100 nm, an average length of from 0.1 µm to 10 mm, and an average aspect ratio of from 20 to 5000, the weight ratio of the plurality of ferrihydrite particles to the carbon nanotube in the composite material is from 5:95 to 95:5, and the composite material has a specific surface area of from 50 m²/g to 1000 m²/g. In some examples, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m²/g to 1000 m²/g. In some examples, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g.

In some examples, the carbon nanotube has an average outer diameter of from 1 nm to 100 nm, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average length of from 0.1 μm to 10 mm, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average outer diameter of from 1 nm to 100 nm and an average length of from 0.1 μm to 10 mm, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average outer diameter of from 1 nm to 100 nm and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average length of from 0.1 μm to 10 mm and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g.

In some examples, the carbon nanotube has an average outer diameter of from 1 nm to 100 nm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average length of from 0.1 μm to 10 mm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average outer diameter of from 1 nm to 100 nm and an average length of from 0.1 μm to 10 mm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average outer diameter of from 1 nm to 100 nm and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average length of from 0.1 μm to 10 mm and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5 and the composite material has a specific surface area of from 50 m$^2$/g to 1000 m$^2$/g. In some examples, the carbon nanotube has an average outer diameter of from 1 nm to 100 nm, an average length of from 0.1 μm to 10 mm, and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g.

In some examples, the carbon nanotube has an average outer diameter of from 1 nm to 100 nm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average length of from 0.1 μm to 10 mm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average outer diameter of from 1 nm to 100 nm and an average length of from 0.1 μm to 10 mm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average outer diameter of from 1 nm to 100 nm and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average length of from 0.1 μm to 10 mm and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g.

In some examples, the carbon nanotube has an average outer diameter of from 1 nm to 100 nm and the composite material has a specific capacitance of from 10 F/g to 500 F/g measured at a scan rate of 5 mV/s. In some examples, the carbon nanotube has an average length of from 0.1 μm to 10 mm and the composite material has a specific capacitance of from 10 F/g to 500 F/g measured at a scan rate of 5 mV/s. In some examples, the carbon nanotube has an average aspect ratio of from 20 to 5000 and the composite material has a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, and the composite material has a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, and the composite material has a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, and the composite material has a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, and the composite material has a specific capacitance of from 10 F/g to 500 F/g measured at a scan rate of 5 mV/s.

In some examples, the plurality of ferrihydrite particles are each substantially spherical in shape and the composite material has a specific capacitance of from 10 F/g to 500 F/g measured at a scan rate of 5 mV/s. In some examples, the plurality of ferrihydrite particles have an average particle size of from 1 nm to 10 nm and the composite material has a specific capacitance of from 10 F/g to 500 F/g measured at a scan rate of 5 mV/s. In some examples, the plurality of ferrihydrite particles are each substantially spherical in shape and have an average particle size of from 1 nm to 10 nm, and the composite material has a specific capacitance of from 10 F/g to 500 F/g measured at a scan rate of 5 mV/s.

In some examples, the carbon nanotube has an average outer diameter of from 1 nm to 100 nm, the plurality of ferrihydrite particles are each substantially spherical in shape, and the composite material has a specific capacitance of from 10 F/g to 500 F/g measured at a scan rate of 5 mV/s. In some examples, the carbon nanotube has an average length of from 0.1 μm to 10 mm, the plurality of ferrihydrite particles are each substantially spherical in shape, and the composite material has a specific surface area of from 50 m$^2$/g to 1000 m$^2$/g. In some examples, the carbon nanotube has an average aspect ratio of from 20 to 5000, the plurality of ferrihydrite particles are each substantially spherical in shape, and the composite material has a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the plurality of ferrihydrite particles are each substantially spherical in shape, and the composite material has a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles are each substantially spherical in shape, and the composite material has a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the plurality of ferrihydrite particles are each substantially spherical in shape, and the composite material has a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape, and the composite material has a specific capacitance of from 10 F/g to 500 F/g measured at a scan rate of 5 mV/s.

In some examples, the carbon nanotube has an average outer diameter of from 1 nm to 100 nm, the plurality of ferrihydrite particles have an average particle size of from 1 nm to 10 nm, and the composite material has a specific capacitance of from 10 F/g to 500 F/g measured at a scan rate of 5 mV/s. In some examples, the carbon nanotube has an average length of from 0.1 μm to 10 mm, the plurality of ferrihydrite particles have an average particle size of from 1 nm to 10 nm, and the composite material has a specific capacitance of from 10 F/g to 500 F/g measured at a scan rate of 5 mV/s. In some examples, the carbon nanotube has an average aspect ratio of from 20 to 5000, the plurality of ferrihydrite particles have an average particle size of from 1 nm to 10 nm, and the composite material has a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the plurality of ferrihydrite particles have an average particle size of from 1 nm to 10 nm, and the composite material has a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles have an average particle size of from 1 nm to 10 nm, and the composite material has a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the plurality of ferrihydrite particles have an average particle size of from 1 nm to 10 nm, and the composite material has a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the plurality of ferrihydrite particles have an average particle size of from 1 nm to 10 nm, and the composite material has a specific capacitance of from 10 F/g to 500 F/g measured at a scan rate of 5 mV/s.

In some examples, the carbon nanotube has an average outer diameter of from 1 nm to 100 nm, the plurality of ferrihydrite particles are each substantially spherical in shape and have an average particle size of from 1 nm to 10 nm, and the composite material has a specific capacitance of from 10 F/g to 500 F/g measured at a scan rate of 5 mV/s. In some examples, the carbon nanotube has an average length of from 0.1 μm to 10 mm the plurality of ferrihydrite particles are each substantially spherical in shape and have an average particle size of from 1 nm to 10 nm, and the composite material has a specific capacitance of from 10 F/g to 500 F/g measured at a scan rate of 5 mV/s. In some examples, the carbon nanotube has an average aspect ratio of from 20 to 5000, the plurality of ferrihydrite particles are each substantially spherical in shape and have an average particle size of from 1 nm to 10 nm, and the composite material has a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the plurality of ferrihydrite particles are each substantially spherical in shape and have an average particle size of from 1 nm to 10 nm, and the composite material has a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles are each substantially spherical in shape and have an average particle size of from 1 nm to 10 nm, and the composite material has a specific surface area of from 50 m²/g to 1000 m²/g. In some examples, the carbon nanotube has an average length of from 0.1 μm to 10 mm and an average aspect ratio of from 20 to 5000, the plurality of ferrihydrite particles are each substantially spherical in shape and have an average particle size of from 1 nm to 10 nm, and the composite material has a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape and have an average particle size of from 1 nm to 10 nm, and the composite material has a specific capacitance of from 10 F/g to 500 F/g measured at a scan rate of 5 mV/s.

In some examples, the carbon nanotube has an average outer diameter of from 1 nm to 100 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average length of from 0.1 μm to 10 mm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average aspect ratio of from 20 to 5000, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the plurality of ferrihydrite particles are each substantially spherical in shape, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s.

In some examples, the carbon nanotube has an average outer diameter of from 1 nm to 100 nm, the plurality of ferrihydrite particles are each substantially spherical in shape, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average length of from 0.1 µm to 10 mm, the plurality of ferrihydrite particles are each substantially spherical in shape, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm and an average length of from 0.1 µm to 10 mm, the plurality of ferrihydrite particles are each substantially spherical in shape, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average length of from 0.1 µm to 10 mm and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm, an average length of from 0.1 µm to 10 mm, and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s.

In some examples, the carbon nanotube has an average outer diameter of from 1 nm to 100 nm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average length of from 0.1 µm to 10 mm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm and an average length of from 0.1 µm to 10 mm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average length of from 0.1 µm to 10 mm and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5 and the composite material has a specific capacitance of from 10 F/g to 500 F/g measured at a scan rate of 5 mV/s. In some examples, the carbon nanotube has an average outer diameter of from 1 nm to 100 nm, an average length of from 0.1 µm to 10 mm, and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s.

In some examples, the carbon nanotube has an average outer diameter of from 1 nm to 100 nm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average length of from 0.1 µm to 10 mm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm and an average length of from 0.1 µm to 10 mm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average length of from 0.1 µm to 10 mm and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s. In some examples, the carbon nanotube has an average outer diameter of from 1 nm to 100 nm, an average length of from 0.1 µm to 10 mm, and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific capacitance of from 10 F/g to 500 F/g measured at a scan rate of 5 mV/s.

In some examples, the carbon nanotube has an average outer diameter of from 1 nm to 100 nm and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average length of from 0.1 µm to 10 mm and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average aspect ratio of from 20 to 5000 and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average outer diameter of from 1 nm to 100 nm and an average length of from 0.1 µm to 10 mm, and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average length of from 0.1 µm to 10 mm and an average aspect ratio of from 20 to 5000, and the composite material has a specific surface area of from 50 $m^2$/g to 1000 $m^2$/g and a specific capacitance of from 10 F/g to 500 F/g measured at a scan rate of 5 mV/s.

In some examples, the plurality of ferrihydrite particles are each substantially spherical in shape and the composite material has a specific surface area of from 50 $m^2$/g to 1000 $m^2$/g and a specific capacitance of from 10 F/g to 500 F/g measured at a scan rate of 5 mV/s. In some examples, the plurality of ferrihydrite particles have an average particle size of from 1 nm to 10 nm and the composite material has a specific surface area of from 50 $m^2$/g to 1000 $m^2$/g and a specific capacitance of from 10 F/g to 500 F/g measured at a scan rate of 5 mV/s. In some examples, the plurality of ferrihydrite particles are each substantially spherical in shape and have an average particle size of from 1 nm to 10 nm, and the composite material has a specific surface area of from 50 $m^2$/g to 1000 $m^2$/g and a specific capacitance of from 10 F/g to 500 F/g measured at a scan rate of 5 mV/s.

In some examples, the carbon nanotube has an average outer diameter of from 1 nm to 100 nm, the plurality of ferrihydrite particles are each substantially spherical in shape, and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average length of from 0.1 µm to 10 mm, the plurality of ferrihydrite particles are each substantially spherical in shape, and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average aspect ratio of from 20 to 5000, the plurality of ferrihydrite particles are each substantially spherical in shape, and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average outer diameter of from 1 nm to 100 nm and an average length of from 0.1 µm to 10 mm, the plurality of ferrihydrite particles are each substantially spherical in shape, and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles are each substantially spherical in shape, and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average length of from 0.1 µm to 10 mm and an average aspect ratio of from 20 to 5000, the plurality of ferrihydrite particles are each substantially spherical in shape, and the composite material has a specific surface area of from 50 $m^2$/g to 1000 $m^2$/g and a specific capacitance of from 10 F/g to 500 F/g measured at a scan rate of 5 mV/s. In some examples, the carbon nanotube has an average outer diameter of from 1 nm to 100 nm, an average length of from 0.1 µm to 10 mm, and an average aspect ratio of from 20 to 5000, the plurality of ferrihydrite particles are each substantially spherical in shape, and the composite material has a specific surface area of from 50 $m^2$/g to 1000 $m^2$/g and a specific capacitance of from 10 F/g to 500 F/g measured at a scan rate of 5 mV/s.

In some examples, the carbon nanotube has an average outer diameter of from 1 nm to 100 nm, the plurality of ferrihydrite particles have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm, the plurality of ferrihydrite particles have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average aspect ratio of from 20 to 5000, the plurality of ferrihydrite particles have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the plurality of ferrihydrite particles have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the plurality of ferrihydrite particles have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the plurality of ferrihydrite particles have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s.

In some examples, the carbon nanotube has an average outer diameter of from 1 nm to 100 nm, the plurality of ferrihydrite particles are each substantially spherical in shape and have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm the plurality of ferrihydrite particles are each substantially spherical in shape and have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average aspect ratio of from 20 to 5000, the plurality of ferrihydrite particles are each substantially spherical in shape and have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the plurality of ferrihydrite particles are each substantially spherical in shape and have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles are each substantially spherical in shape and have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the plurality of ferrihydrite particles are each substantially spherical in shape and have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape and have an average particle size of from 1 nm to 10 nm, and the composite material has a specific surface area of from 50 m$^2$/g to 1000 m$^2$/g and a specific capacitance of from 10 F/g to 500 F/g measured at a scan rate of 5 mV/s.

In some examples, the carbon nanotube has an average outer diameter of from 1 nm to 100 nm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average aspect ratio of from 20 to 5000, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s.

In some examples, the carbon nanotube has an average outer diameter of from 1 nm to 100 nm, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s.

In some examples, the carbon nanotube has an average outer diameter of from 1 nm to 100 nm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average length of from 0.1 μm to 10 mm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 m$^2$/g to 1000 m$^2$/g and a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5 and the composite material has a specific surface area of from 50 $m^2/g$ to 1000 $m^2/g$ and a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the plurality of ferrihydrite particles have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s.

In some examples, the carbon nanotube has an average outer diameter of from 1 nm to 100 nm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s. In some examples, the carbon nanotube has an average length of from 0.1 μm to 10 mm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s. In some examples, the carbon nanotube has an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s. In some examples, the carbon nanotube has an average outer diameter of from 1 nm to 100 nm and an average length of from 0.1 μm to 10 mm, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s. In some examples, the carbon nanotube has an average outer diameter of from 1 nm to 100 nm and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s. In some examples, the carbon nanotube has an average length of from 0.1 μm to 10 mm and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s. In some examples, the carbon nanotube has an average outer diameter of from 1 nm to 100 nm, an average length of from 0.1 μm to 10 mm, and an average aspect ratio of from 20 to 5000, the plurality of ferrihydrite particles are each substantially spherical in shape and have an average particle size of from 1 nm to 10 nm, the weight ratio of the plurality of ferrihydrite particles to the carbon nanotube in the composite material is from 5:95 to 95:5, and the composite material has a specific surface area of from 50 $m^2/g$ to 1000 $m^2/g$ and a specific capacitance of from 10 F/g to 500 F/g measured at a scan rate of 5 mV/s.

In some examples, the carbon nanotube has an average outer diameter of from 30 nm to 50 nm and the plurality of ferrihydrite particles have an average particle size of from 2 nm to 4 nm. In some examples, the carbon nanotube has an average length of from 5 μm to 15 μm and the plurality of ferrihydrite particles have an average particle size of from 2 nm to 4 nm. In some examples, the carbon nanotube has an average outer diameter of from 30 nm to 50 nm and an average length of from 5 μm to 15 μm, and the plurality of ferrihydrite particles have an average particle size of from 2 nm to 4 nm. In some examples, the carbon nanotube has an average aspect ratio of from 80 to 500 and the plurality of ferrihydrite particles have an average particle size of from 2 nm to 4 nm. In some examples, the carbon nanotube has an average outer diameter of from 30 nm to 50 nm and an average aspect ratio of from 80 to 500, and the plurality of ferrihydrite particles have an average particle size of from 2 nm to 4 nm. In some examples, the carbon nanotube has an average length of from 5 μm to 15 μm and an average aspect ratio of from 80 to 500, and the plurality of ferrihydrite particles have an average particle size of from 2 nm to 4 nm. In some examples, the carbon nanotube has an average outer diameter of from 30 nm to 50 nm, an average length of from 5 μm to 15 μm, and an average aspect ratio of from 80 to 500, and the plurality of ferrihydrite particles have an average particle size of from 2 nm to 4 nm.

In some examples, the carbon nanotube has an average outer diameter of from 30 nm to 50 nm and the plurality of ferrihydrite particles are substantially spherical in shape. In some examples, the carbon nanotube has an average length of from 5 μm to 15 μm and the plurality of ferrihydrite particles are substantially spherical in shape. In some examples, the carbon nanotube has an average outer diameter of from 30 nm to 50 nm and an average length of from 5 μm to 15 μm, and the plurality of ferrihydrite particles are substantially spherical in shape. In some examples, the carbon nanotube has an average aspect ratio of from 80 to 500 and the plurality of ferrihydrite particles are substantially spherical in shape. In some examples, the carbon nanotube has an average outer diameter of from 30 nm to 50 nm and an average aspect ratio of from 80 to 500, and the plurality of ferrihydrite particles are substantially spherical in shape. In some examples, the carbon nanotube has an average length of from 5 μm to 15 μm and an average aspect ratio of from 80 to 500, and the plurality of ferrihydrite particles are substantially spherical in shape. In some examples, the carbon nanotube has an average outer diameter of from 30 nm to 50 nm, an average length of from 5 μm to 15 μm, and an average aspect ratio of from 80 to 500, and the plurality of ferrihydrite particles are substantially spherical in shape.

In some examples, the carbon nanotube has an average outer diameter of from 30 nm to 50 nm and the plurality of ferrihydrite particles are substantially spherical in shape and have an average particle size of from 2 nm to 4 nm. In some examples, the carbon nanotube has an average length of from 5 μm to 15 μm and the plurality of ferrihydrite particles are substantially spherical in shape and have an average particle size of from 2 nm to 4 nm. In some examples, the carbon nanotube has an average outer diameter of from 30 nm to 50 nm and an average length of from 5 μm to 15 μm, and the plurality of ferrihydrite particles are substantially spherical in shape and have an average particle size of from 2 nm to 4 nm. In some examples, the carbon nanotube has an average aspect ratio of from 80 to 500 and the plurality of ferrihydrite particles are substantially spherical in shape and have an average particle size of from 2 nm to 4 nm. In some examples, the carbon nanotube has an average outer diameter of from 30 nm to 50 nm and an average aspect ratio of from 80 to 500, and the plurality of ferrihydrite particles are substantially spherical in shape and have an average particle size of from 2 nm to 4 nm. In some examples, the carbon nanotube has an average length of from 5 μm to 15 μm and an average aspect ratio of from 80 to 500, and the plurality of ferrihydrite particles are substantially spherical in shape and have an average particle size of from 2 nm to 4 nm. In some examples, the carbon nanotube has an average outer diameter of from 30 nm to 50 nm, an average length of from 5 μm to 15 μm, and an average aspect ratio of from 80 to 500, and the plurality of ferrihydrite particles are substantially spherical in shape and have an average particle size of from 2 nm to 4 nm.

In some examples, the carbon nanotube has an average outer diameter of from 30 nm to 50 nm and the weight ratio of the plurality of ferrihydrite particles to the carbon nanotube in the composite material is from 30:70 to 40:60. In some examples, the carbon nanotube has an average length of from 5 μm to 15 μm and the weight ratio of the plurality of ferrihydrite particles to the carbon nanotube in the composite material is from 30:70 to 40:60. In some examples, the carbon nanotube has an average outer diameter of from 30 nm to 50 nm and an average length of from 5 μm to 15 μm, and the weight ratio of the plurality of ferrihydrite particles to the carbon nanotube in the composite material is from 30:70 to 40:60. In some examples, the carbon nanotube has an average aspect ratio of from 80 to 500, and the weight ratio of the plurality of ferrihydrite particles to the carbon nanotube in the composite material is from 30:70 to 40:60. In some examples, the carbon nanotube has an average outer diameter of from 30 nm to 50 nm and an average aspect ratio of from 80 to 500, and the weight ratio of the plurality of ferrihydrite particles to the carbon nanotube in the composite material is from 30:70 to 40:60. In some examples, the carbon nanotube has an average length of from 5 μm to 15 μm and an average aspect ratio of from 80 to 500, and the weight ratio of the plurality of ferrihydrite particles to the carbon nanotube in the composite material is from 30:70 to 40:60. In some examples, the carbon nanotube has an average outer diameter of from 30 nm to 50 nm, an average length of from 5 μm to 15 μm, and an average aspect ratio of from 80 to 500, and the weight ratio of the plurality of ferrihydrite particles to the carbon nanotube in the composite material is from 30:70 to 40:60.

In some examples, the plurality of ferrihydrite particles have an average particle size of from 2 nm to 4 nm, and the weight ratio of the plurality of ferrihydrite particles to the carbon nanotube in the composite material is from 30:70 to 40:60. In some examples, the plurality of ferrihydrite particles are each substantially spherical in shape, and the weight ratio of the plurality of ferrihydrite particles to the carbon nanotube in the composite material is from 30:70 to 40:60. In some examples, the plurality of ferrihydrite particles are each substantially spherical in shape and have an average particle size of from 2 nm to 4 nm, and the weight ratio of the plurality of ferrihydrite particles to the carbon nanotube in the composite material is from 30:70 to 40:60.

In some examples, the carbon nanotube has an average outer diameter of from 30 nm to 50 nm and the plurality of ferrihydrite particles have an average particle size of from 2 nm to 4 nm, and the weight ratio of the plurality of ferrihydrite particles to the carbon nanotube in the composite material is from 30:70 to 40:60. In some examples, the carbon nanotube has an average outer diameter of from 30 nm to 50 nm and the plurality of ferrihydrite particles are substantially spherical in shape, and the weight ratio of the plurality of ferrihydrite particles to the carbon nanotube in the composite material is from 30:70 to 40:60. In some examples, the carbon nanotube has an average outer diameter of from 30 nm to 50 nm and the plurality of ferrihydrite particles are substantially spherical in shape and have an average particle size of from 2 nm to 4 nm, and the weight ratio of the plurality of ferrihydrite particles to the carbon nanotube in the composite material is from 30:70 to 40:60. In some examples, the carbon nanotube has an average length of from 5 μm to 15 μm and the plurality of ferrihydrite particles have an average particle size of from 2 nm to 4 nm, and the weight ratio of the plurality of ferrihydrite particles to the carbon nanotube in the composite material is from 30:70 to 40:60. In some examples, the carbon nanotube has an average length of from 5 μm to 15 μm and the plurality of ferrihydrite particles are substantially spherical in shape, and the weight ratio of the plurality of ferrihydrite particles to the carbon nanotube in the composite material is from 30:70 to 40:60. In some examples, the carbon nanotube has an average length of from 5 μm to 15 μm and the plurality of ferrihydrite particles are substantially spherical in shape and have an average particle size of from 2 nm to 4 nm, and the weight ratio of the plurality of ferrihydrite particles to the carbon nanotube in the composite material is from 30:70 to 40:60. In some examples, the carbon nanotube has an average outer diameter of from 30 nm to 50 nm and an average length of from 5 μm to 15 μm, and the plurality of ferrihydrite particles have an average particle size of from 2 nm to 4 nm, and the weight ratio of the plurality of ferrihydrite particles to the carbon nanotube in the composite material is from 30:70 to 40:60. In some examples, the carbon nanotube has an average outer diameter of from 30 nm to 50 nm and an average length of from 5 μm to 15 μm, and the plurality of ferrihydrite particles are substantially spherical in shape, and the weight ratio of the plurality of ferrihydrite particles to the carbon nanotube in the composite material is from 30:70 to 40:60. In some examples, the carbon nanotube has an average outer diameter of from 30 nm to 50 nm and an average length of from 5 μm to 15 μm, and the plurality of ferrihydrite particles are substantially spherical in shape and have an average particle size of from 2 nm to 4 nm, and the weight ratio of the plurality of ferrihydrite particles to the carbon nanotube in the composite material is from 30:70 to 40:60. In some examples, the carbon nanotube has an average aspect ratio of from 80 to 500 and the plurality of ferrihydrite particles have an average particle size of from 2 nm to 4 nm, and the weight ratio of the plurality of ferrihydrite particles to the carbon nanotube in the composite material is from 30:70 to 40:60. In some examples, the carbon nanotube has an average aspect ratio of from 80 to 500 and the plurality of ferrihydrite particles are substantially spherical in shape, and the weight ratio of the plurality of ferrihydrite particles to the carbon nanotube in the composite material is from 30:70 to 40:60. In some examples, the carbon nanotube has an average aspect ratio of from 80 to 500 and the plurality of ferrihydrite particles are substantially spherical in shape and have an average particle size of from 2 nm to 4 nm, and the weight ratio of the plurality of ferrihydrite particles to the carbon nanotube in the composite material is from 30:70 to 40:60. In some examples, the carbon nanotube has an average outer diameter of from 30 nm to 50 nm and an average aspect ratio of from 80 to 500, and the plurality of ferrihydrite particles have an average particle size of from 2 nm to 4 nm, and the weight ratio of the plurality of ferrihydrite particles to the carbon nanotube in the composite material is from 30:70 to 40:60. In some examples, the carbon nanotube has an average outer diameter of from 30 nm to 50 nm and an average aspect ratio of from 80 to 500, and the plurality of ferrihydrite particles are substantially spherical in shape, and the weight ratio of the plurality of ferrihydrite particles to the carbon nanotube in the composite material is from 30:70 to 40:60. In some examples, the carbon nanotube has an average outer diameter of from 30 nm to 50 nm and an average aspect ratio of from 80 to 500, and the plurality of ferrihydrite particles are substantially spherical in shape and have an average particle size of from 2 nm to 4 nm, and the weight ratio of the plurality of ferrihydrite particles to the carbon nanotube in the composite material is from 30:70 to 40:60. In some examples, the carbon nanotube has an average length of from 5 μm to 15 μm and an average aspect ratio of from 80 to 500, and the plurality of ferrihydrite particles have an average particle size of from 2 nm to 4 nm, and the weight ratio of the plurality of ferrihydrite particles to the carbon nanotube in the composite material is from 30:70 to 40:60. In some examples, the carbon nanotube has an average length of from 5 μm to 15 μm and an average aspect ratio of from 80 to 500, and the plurality of ferrihydrite particles are substantially spherical in shape, and the weight ratio of the plurality of ferrihydrite particles to the carbon nanotube in the composite material is from 30:70 to 40:60. In some examples, the carbon nanotube has an average length of from 5 μm to 15 μm and an average aspect ratio of from 80 to 500, and the plurality of ferrihydrite particles are substantially spherical in shape and have an average particle size of from 2 nm to 4 nm, and the weight ratio of the plurality of ferrihydrite particles to the carbon nanotube in the composite material is from 30:70 to 40:60. In some examples, the carbon nanotube has an average outer diameter of from 30 nm to 50 nm, an average length of from 5 μm to 15 μm, and an average aspect ratio of from 80 to 500, and the plurality of ferrihydrite particles have an average particle size of from 2 nm to 4 nm, and the weight ratio of the plurality of ferrihydrite particles to the carbon nanotube in the composite material is from 30:70 to 40:60. In some examples, the carbon nanotube has an average outer diameter of from 30 nm to 50 nm, an average length of from 5 μm to 15 μm, and an average aspect ratio of from 80 to 500, and the plurality of ferrihydrite particles are substantially spherical in shape, and the weight ratio of the plurality of ferrihydrite particles to the carbon nanotube in the composite material is from 30:70 to 40:60. In some examples, the carbon nanotube has an average outer diameter of from 30 nm to 50 nm, an average length of from 5 μm to 15 μm, and an average aspect ratio of from 80 to 500, and the plurality of ferrihydrite particles are substantially spherical in shape and have an average particle size of from 2 nm to 4 nm, and the weight ratio of the plurality of ferrihydrite particles to the carbon nanotube in the composite material is from 30:70 to 40:60.

In some examples, the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and the composite material has a specific surface area of from 180 m$^2$/g to 200 m$^2$/g. In some examples, the carbon nanotube has an average length of from 5 μm to 15 μm and the composite material has a specific surface area of from 180 m$^2$/g to 200 m$^2$/g. In some examples, the carbon nanotube has an average aspect ratio of from 80 to 500 and the composite material has a specific surface area of from 180 m$^2$/g to 200 m$^2$/g. In some examples, the carbon nanotube has an average outer diameter of from 30 nm to 50 nm and an average aspect ratio of from 80 to 500, and the composite material has a specific surface area of from 180 m$^2$/g to 200 m$^2$/g. In some examples, the carbon nanotube has an average length of from 5 μm to 15 μm and an average aspect ratio of from 80 to 500, and the composite material has a specific surface area of from 180 m$^2$/g to 200 m$^2$/g. In some examples, the carbon nanotube has an average outer diameter of from 30 nm to 50 nm, an average length of from 5 μm to 15 μm, and an average aspect ratio of from 80 to 500, and the composite material has a specific surface area of from 180 m$^2$/g to 200 m$^2$/g.

In some examples, the plurality of ferrihydrite particles are each substantially spherical in shape and the composite material has a specific surface area of from 180 m$^2$/g to 200 m$^2$/g. In some examples, the plurality of ferrihydrite particles have an average particle size of from 2 nm to 4 nm and the composite material has a specific surface area of from 180 m$^2$/g to 200 m$^2$/g. In some examples, the plurality of ferrihydrite particles are each substantially spherical in shape and have an average particle size of from 2 nm to 4 nm, and the composite material has a specific surface area of from 180 m$^2$/g to 200 m$^2$/g.

In some examples, the carbon nanotube has an average outer diameter of from 30 nm to 50 nm and the plurality of ferrihydrite particles have an average particle size of from 2 nm to 4 nm, and the composite material has a specific surface area of from 180 m$^2$/g to 200 m$^2$/g. In some examples, the carbon nanotube has an average outer diameter of from 30 nm to 50 nm and the plurality of ferrihydrite particles are substantially spherical in shape, and the composite material has a specific surface area of from 180 m$^2$/g to 200 m$^2$/g. In some examples, the carbon nanotube has an average outer diameter of from 30 nm to 50 nm and the plurality of ferrihydrite particles are substantially spherical in shape and have an average particle size of from 2 nm to 4 nm, and the composite material has a specific surface area of from 180 m$^2$/g to 200 m$^2$/g. In some examples, the carbon nanotube has an average length of from 5 μm to 15 μm and the plurality of ferrihydrite particles have an average particle size of from 2 nm to 4 nm, and the composite material has a specific surface area of from 180 m²/g to 200 m²/g. In some examples, the carbon nanotube has an average length of from 5 μm to 15 μm and the plurality of ferrihydrite particles are substantially spherical in shape, and the composite material has a specific surface area of from 180 m²/g to 200 m²/g. In some examples, the carbon nanotube has an average length of from 5 μm to 15 μm and the plurality of ferrihydrite particles are substantially spherical in shape and have an average particle size of from 2 nm to 4 nm, and the composite material has a specific surface area of from 180 m²/g to 200 m²/g. In some examples, the carbon nanotube has an average outer diameter of from 30 nm to 50 nm and an average length of from 5 μm to 15 μm, the plurality of ferrihydrite particles have an average particle size of from 2 nm to 4 nm, and the composite material has a specific surface area of from 180 m²/g to 200 m²/g. In some examples, the carbon nanotube has an average outer diameter of from 30 nm to 50 nm and an average length of from 5 μm to 15 μm, the plurality of ferrihydrite particles are substantially spherical in shape, and the composite material has a specific surface area of from 180 m²/g to 200 m²/g. In some examples, the carbon nanotube has an average outer diameter of from 30 nm to 50 nm and an average length of from 5 μm to 15 μm, the plurality of ferrihydrite particles are substantially spherical in shape and have an average particle size of from 2 nm to 4 nm, and the composite material has a specific surface area of from 180 m²/g to 200 m²/g. In some examples, the carbon nanotube has an average aspect ratio of from 80 to 500 and the plurality of ferrihydrite particles have an average particle size of from 2 nm to 4 nm, and the composite material has a specific surface area of from 180 m²/g to 200 m²/g. In some examples, the carbon nanotube has an average aspect ratio of from 80 to 500 and the plurality of ferrihydrite particles are substantially spherical in shape, and the composite material has a specific surface area of from 180 m²/g to 200 m²/g. In some examples, the carbon nanotube has an average aspect ratio of from 80 to 500, the plurality of ferrihydrite particles are substantially spherical in shape and have an average particle size of from 2 nm to 4 nm, and the composite material has a specific surface area of from 180 m²/g to 200 m²/g. In some examples, the carbon nanotube has an average outer diameter of from 30 nm to 50 nm and an average aspect ratio of from 80 to 500, the plurality of ferrihydrite particles have an average particle size of from 2 nm to 4 nm, and the composite material has a specific surface area of from 180 m²/g to 200 m²/g. In some examples, the carbon nanotube has an average outer diameter of from 30 nm to 50 nm and an average aspect ratio of from 80 to 500, the plurality of ferrihydrite particles are substantially spherical in shape, and the composite material has a specific surface area of from 180 m²/g to 200 m²/g. In some examples, the carbon nanotube has an average outer diameter of from 30 nm to 50 nm and an average aspect ratio of from 80 to 500, the plurality of ferrihydrite particles are substantially spherical in shape and have an average particle size of from 2 nm to 4 nm, and the composite material has a specific surface area of from 180 m²/g to 200 m²/g. In some examples, the carbon nanotube has an average length of from 5 μm to 15 μm and an average aspect ratio of from 80 to 500, the plurality of ferrihydrite particles have an average particle size of from 2 nm to 4 nm, and the composite material has a specific surface area of from 180 m²/g to 200 m²/g. In some examples, the carbon nanotube has an average length of from 5 μm to 15 μm and an average aspect ratio of from 80 to 500, the plurality of ferrihydrite particles are substantially spherical in shape, and the composite material has a specific surface area of from 180 m²/g to 200 m²/g. In some examples, the carbon nanotube has an average length of from 5 μm to 15 μm and an average aspect ratio of from 80 to 500, the plurality of ferrihydrite particles are substantially spherical in shape and have an average particle size of from 2 nm to 4 nm, and the composite material has a specific surface area of from 180 m²/g to 200 m²/g. In some examples, the carbon nanotube has an average outer diameter of from 30 nm to 50 nm, an average length of from 5 μm to 15 μm, and an average aspect ratio of from 80 to 500, the plurality of ferrihydrite particles have an average particle size of from 2 nm to 4 nm, and the composite material has a specific surface area of from 180 m²/g to 200 m²/g. In some examples, the carbon nanotube has an average outer diameter of from 30 nm to 50 nm, an average length of from 5 μm to 15 μm, and an average aspect ratio of from 80 to 500, the plurality of ferrihydrite particles are substantially spherical in shape, and the composite material has a specific surface area of from 180 m²/g to 200 m²/g. In some examples, the carbon nanotube has an average outer diameter of from 30 nm to 50 nm, an average length of from 5 μm to 15 μm, and an average aspect ratio of from 80 to 500, the plurality of ferrihydrite particles are substantially spherical in shape and have an average particle size of from 2 nm to 4 nm, and the composite material has a specific surface area of from 180 m²/g to 200 m²/g.

In some examples, the weight ratio of the plurality of ferrihydrite particles to the carbon nanotube in the composite material is from 30:70 to 40:60 and the composite material has a specific surface area of from 180 m²/g to 200 m²/g. In some examples, the carbon nanotube has an average outer diameter of from 30 nm to 50 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average length of from 5 μm to 15 μm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and an average length of from 5 μm to 15 μm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average aspect ratio of from 80 to 500, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and an average aspect ratio of from 80 to 500, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average length of from 5 μm to 15 μm and an average aspect ratio of from 80 to 500, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm, an average length of from 5 μm to 15 μm, and an average aspect ratio of from 80 to 500, the weight ratio of the plurality of ferrihydrite particles to the carbon nanotube in the composite material is from 30:70 to 40:60, and the composite material has a specific surface area of from 180 m²/g to 200 m²/g. In some examples, the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the plurality of ferrihydrite particles are each substantially spherical in shape, the weight ratio of the plurality of ferrihydrite particles to the carbon nanotube in the composite material is from 30:70 to 40:60, and the composite material has a specific surface area of from 180 m²/g to 200 m²/g. In some examples, the plurality of ferrihydrite particles are each substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average length of from 5 μm to 15 μm and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average length of from 5 μm to 15 μm and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average length of from 5 μm to 15 μm and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and an average length of from 5 μm to 15 μm, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and an average length of from 5 μm to 15 μm, and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and an average length of from 5 μm to 15 μm, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average aspect ratio of from 80 to 500 and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average aspect ratio of from 80 to 500 and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average aspect ratio of from 80 to 500 and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average length of from 5 μm to 15 μm and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average length of from 5 μm to 15 μm and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average length of from 5 μm to 15 μm and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm, an average length of from 5 μm to 15 μm, and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm, an average length of from 5 μm to 15 μm, and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m²/g to 200 m²/g. In some examples, the carbon nanotube has an average outer diameter of from 30 nm to 50 nm, an average length of from 5 μm to 15 μm, and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m²/g to 200 m²/g.

In some examples, the carbon nanotube has an average outer diameter of from 30 nm to 50 nm and the composite material has a specific capacitance of from 90 F/g to 110 F/g measured at a scan rate of 5 mV/s. In some examples, the carbon nanotube has an average length of from 5 μm to 15 μm and the composite material has a specific capacitance of from 90 F/g to 110 F/g measured at a scan rate of 5 mV/s. In some examples, the carbon nanotube has an average aspect ratio of from 80 to 500 and the composite material has a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, and the composite material has a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, and the composite material has a specific capacitance of from 90 F/g to 110 F/g measured at a scan rate of 5 mV/s.

In some examples, the plurality of ferrihydrite particles are each substantially spherical in shape and the composite material has a specific capacitance of from 90 F/g to 110 F/g measured at a scan rate of 5 mV/s. In some examples, the plurality of ferrihydrite particles have an average particle size of from 2 nm to 4 nm and the composite material has a specific capacitance of from 90 F/g to 110 F/g measured at a scan rate of 5 mV/s. In some examples, the plurality of ferrihydrite particles are each substantially spherical in shape and have an average particle size of from 2 nm to 4 nm, and the composite material has a specific capacitance of from 90 F/g to 110 F/g measured at a scan rate of 5 mV/s.

In some examples, the carbon nanotube has an average outer diameter of from 30 nm to 50 nm and the plurality of ferrihydrite particles have an average particle size of from 2 nm to 4 nm, and the composite material has a specific capacitance of from 90 F/g to 110 F/g measured at a scan rate of 5 mV/s. In some examples, the carbon nanotube has an average outer diameter of from 30 nm to 50 nm and the plurality of ferrihydrite particles are substantially spherical in shape, and the composite material has a specific capacitance of from 90 F/g to 110 F/g measured at a scan rate of 5 mV/s. In some examples, the carbon nanotube has an average outer diameter of from 30 nm to 50 nm and the plurality of ferrihydrite particles are substantially spherical in shape and have an average particle size of from 2 nm to 4 nm, and the composite material has a specific capacitance of from 90 F/g to 110 F/g measured at a scan rate of 5 mV/s. In some examples, the carbon nanotube has an average length of from 5 μm to 15 μm and the plurality of ferrihydrite particles have an average particle size of from 2 nm to 4 nm, and the composite material has a specific capacitance of from 90 F/g to 110 F/g measured at a scan rate of 5 mV/s. In some examples, the carbon nanotube has an average length of from 5 μm to 15 μm and the plurality of ferrihydrite particles are substantially spherical in shape, and the composite material has a specific capacitance of from 90 F/g to 110 F/g measured at a scan rate of 5 mV/s. In some examples, the carbon nanotube has an average length of from 5 μm to 15 μm and the plurality of ferrihydrite particles are substantially spherical in shape and have an average particle size of from 2 nm to 4 nm, and the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, the plurality of ferrihydrite particles have an average particle size of from 2 nm to 4 nm, and the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, the plurality of ferrihydrite particles are substantially spherical in shape, and the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, the plurality of ferrihydrite particles are substantially spherical in shape and have an average particle size of from 2 nm to 4 nm, and the composite material has a specific capacitance of from 90 F/g to 110 F/g measured at a scan rate of 5 mV/s. In some examples, the carbon nanotube has an average aspect ratio of from 80 to 500 and the plurality of ferrihydrite particles have an average particle size of from 2 nm to 4 nm, and the composite material has a specific capacitance of from 90 F/g to 110 F/g measured at a scan rate of 5 mV/s. In some examples, the carbon nanotube has an average aspect ratio of from 80 to 500 and the plurality of ferrihydrite particles are substantially spherical in shape, and the composite material has a specific capacitance of from 90 F/g to 110 F/g measured at a scan rate of 5 mV/s. In some examples, the carbon nanotube has an average aspect ratio of from 80 to 500, the plurality of ferrihydrite particles are substantially spherical in shape and have an average particle size of from 2 nm to 4 nm, and the composite material has a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, the plurality of ferrihydrite particles have an average particle size of from 2 nm to 4 nm, and the composite material has a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, the plurality of ferrihydrite particles are substantially spherical in shape, and the composite material has a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, the plurality of ferrihydrite particles are substantially spherical in shape and have an average particle size of from 2 nm to 4 nm, and the composite material has a specific capacitance of from 90 F/g to 110 F/g measured at a scan rate of 5 mV/s. In some examples, the carbon nanotube has an average length of from 5 μm to 15 μm and an average aspect ratio of from 80 to 500, the plurality of ferrihydrite particles have an average particle size of from 2 nm to 4 nm, and the composite material has a specific capacitance of from 90 F/g to 110 F/g measured at a scan rate of 5 mV/s. In some examples, the carbon nanotube has an average length of from 5 μm to 15 μm and an average aspect ratio of from 80 to 500, the plurality of ferrihydrite particles are substantially spherical in shape, and the composite material has a specific capacitance of from 90 F/g to 110 F/g measured at a scan rate of 5 mV/s. In some examples, the carbon nanotube has an average length of from 5 μm to 15 μm and an average aspect ratio of from 80 to 500, the plurality of ferrihydrite particles are substantially spherical in shape and have an average particle size of from 2 nm to 4 nm, and the composite material has a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, the plurality of ferrihydrite particles have an average particle size of from 2 nm to 4 nm, and the composite material has a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, the plurality of ferrihydrite particles are substantially spherical in shape, and the composite material has a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, the plurality of ferrihydrite particles are substantially spherical in shape and have an average particle size of from 2 nm to 4 nm, and the composite material has a specific capacitance of from 90 F/g to 110 F/g measured at a scan rate of 5 mV/s.

In some examples, the weight ratio of the plurality of ferrihydrite particles to the carbon nanotube in the composite material is from 30:70 to 40:60 and the composite material has a specific capacitance of from 90 F/g to 110 F/g measured at a scan rate of 5 mV/s. In some examples, the carbon nanotube has an average outer diameter of from 30 nm to 50 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average length of from 5 μm to 15 μm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average aspect ratio of from 80 to 500, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average length of from 5 μm to 15 μm and an average aspect ratio of from 80 to 500, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the plurality of ferrihydrite particles are each substantially spherical in shape, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the plurality of ferrihydrite particles are each substantially spherical in shape and have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and the plurality of ferrihydrite particles are substantially spherical in shape, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average length of from 5 μm to 15 μm and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average length of from 5 μm to 15 μm and the plurality of ferrihydrite particles are substantially spherical in shape, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average length of from 5 μm to 15 μm and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, and the plurality of ferrihydrite particles are substantially spherical in shape, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average aspect ratio of from 80 to 500 and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average aspect ratio of from 80 to 500 and the plurality of ferrihydrite particles are substantially spherical in shape, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average aspect ratio of from 80 to 500 and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average length of from 5 μm to 15 μm and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average length of from 5 μm to 15 μm and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average length of from 5 μm to 15 μm and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific capacitance of from 90 F/g to 110 F/g measured at a scan rate of 5 mV/s.

In some examples, the carbon nanotube has an average outer diameter of from 30 nm to 50 nm and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 μm to 15 μm and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average aspect ratio of from 80 to 500 and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 μm to 15 μm and an average aspect ratio of from 80 to 500, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, and the composite material has a specific surface area of from 180 m$^2$/g to 200 m$^2$/g and a specific capacitance of from 90 F/g to 110 F/g measured at a scan rate of 5 mV/s.

In some examples, the plurality of ferrihydrite particles are each substantially spherical in shape and the composite material has a specific surface area of from 180 m$^2$/g to 200 m$^2$/g and a specific capacitance of from 90 F/g to 110 F/g measured at a scan rate of 5 mV/s. In some examples, the plurality of ferrihydrite particles have an average particle size of from 2 nm to 4 nm and the composite material has a specific surface area of from 180 m$^2$/g to 200 m$^2$/g and a specific capacitance of from 90 F/g to 110 F/g measured at a scan rate of 5 mV/s. In some examples, the plurality of ferrihydrite particles are each substantially spherical in shape and have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s.

In some examples, the carbon nanotube has an average outer diameter of from 30 nm to 50 nm and the plurality of ferrihydrite particles have an average particle size of from 2 nm to 4 nm, and the composite material has a specific surface area of from 180 m$^2$/g to 200 m$^2$/g. and a specific capacitance of from 90 F/g to 110 F/g measured at a scan rate of 5 mV/s. In some examples, the carbon nanotube has an average outer diameter of from 30 nm to 50 nm and the plurality of ferrihydrite particles are substantially spherical in shape, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and the plurality of ferrihydrite particles are substantially spherical in shape and have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 μm to 15 μm and the plurality of ferrihydrite particles have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 μm to 15 μm and the plurality of ferrihydrite particles are substantially spherical in shape, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 μm to 15 μm and the plurality of ferrihydrite particles are substantially spherical in shape and have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, the plurality of ferrihydrite particles have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, the plurality of ferrihydrite particles are substantially spherical in shape, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average length of from 5 µm to 15 µm, the plurality of ferrihydrite particles are substantially spherical in shape and have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average aspect ratio of from 80 to 500 and the plurality of ferrihydrite particles have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average aspect ratio of from 80 to 500 and the plurality of ferrihydrite particles are substantially spherical in shape, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average aspect ratio of from 80 to 500, the plurality of ferrihydrite particles are substantially spherical in shape and have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, the plurality of ferrihydrite particles have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, the plurality of ferrihydrite particles are substantially spherical in shape, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, the plurality of ferrihydrite particles are substantially spherical in shape and have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 µm to 15 µm and an average aspect ratio of from 80 to 500, the plurality of ferrihydrite particles have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 µm to 15 µm and an average aspect ratio of from 80 to 500, the plurality of ferrihydrite particles are substantially spherical in shape, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 µm to 15 µm and an average aspect ratio of from 80 to 500, the plurality of ferrihydrite particles are substantially spherical in shape and have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, an average length of from 5 µm to 15 µm, and an average aspect ratio of from 80 to 500, the plurality of ferrihydrite particles have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, an average length of from 5 µm to 15 µm, and an average aspect ratio of from 80 to 500, the plurality of ferrihydrite particles are substantially spherical in shape, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, an average length of from 5 µm to 15 µm, and an average aspect ratio of from 80 to 500, the plurality of ferrihydrite particles are substantially spherical in shape and have an average particle size of from 2 nm to 4 nm, and the composite material has a specific surface area of from 180 m$^2$/g to 200 m$^2$/g and a specific capacitance of from 90 F/g to 110 F/g measured at a scan rate of 5 mV/s.

In some examples, the weight ratio of the plurality of ferrihydrite particles to the carbon nanotube in the composite material is from 30:70 to 40:60 and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 µm to 15 µm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average length of from 5 µm to 15 µm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average aspect ratio of from 80 to 500, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 µm to 15 µm and an average aspect ratio of from 80 to 500, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, an average length of from 5 μm to 15 μm, and an average aspect ratio of from 80 to 500, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the plurality of ferrihydrite particles are each substantially spherical in shape, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the plurality of ferrihydrite particles are each substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 μm to 15 μm and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 μm to 15 μm and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 μm to 15 μm and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average length of from 5 μm to 15 μm, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average aspect ratio of from 80 to 500 and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average aspect ratio of from 80 to 500 and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average aspect ratio of from 80 to 500 and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 µm to 15 µm and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 µm to 15 µm and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average length of from 5 µm to 15 µm and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, an average length of from 5 µm to 15 µm, and an average aspect ratio of from 80 to 500, and the plurality of ferrihydrite particles have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, an average length of from 5 µm to 15 µm, and an average aspect ratio of from 80 to 500, and the plurality of ferrihydrite particles are substantially spherical in shape, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s. In some examples, the carbon nanotube has an average outer diameter of from 30 nm to 50 nm, an average length of from 5 µm to 15 µm, and an average aspect ratio of from 80 to 500, and the plurality of ferrihydrite particles are substantially spherical in shape and have an average particle size of from 2 nm to 4 nm, the weight ratio of the plurality of ferrihydrite particles to the carbon nanotube in the composite material is from 30:70 to 40:60, and the composite material has a specific surface area of from 180 m$^2$/g to 200 m$^2$/g and a specific capacitance of from 90 F/g to 110 F/g measured at a scan rate of 5 mV/s.

The examples below are intended to further illustrate certain aspects of the methods and compounds described herein and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Synthesis and Optimization of Multi-Walled Carbon Nanotube-Ferrihydrite Hybrid Composites Abstract: Carbon nanotubes (CNTs) are a family of carbon nanomaterials that have uses in many technological and medical applications due to their unique properties. However, compared to other nanomaterials, carbon nanotubes are not as popular in commercial applications due to their lower specific surface areas (SSA). To overcome this limitation, a protocol for synthesizing a hybrid material composed of multi-walled carbon nanotubes (MWCNTs) and ferrihydrite (FHY) in varying ratios is described herein. Furthermore, through a series of physical and electrochemical characterization tests, it was determined that a composite with 36% ferrihydrite and 64% multi-walled carbon nanotubes maximizes both specific surface area and specific capacitance. The calculated specific surface area of the composite was 190 m$^2$ g$^{-1}$, 2.9 times higher than that of multi-walled carbon nanotubes alone. Moreover, the composite retained valuable electrochemical properties of carbon nanotubes with an estimated specific capacitance of 100 F g$^{-1}$. This composite is a promising material for environmental and technological applications requiring electrochemical reactivity and high specific areas such as environmental biosensors, and capacitive deionization for wastewater remediation, and water softening.

Introduction. In 1991, carbon nanotubes (CNT) were characterized by Ijima (Ijima. *Nature.* 1991, 354, 56-58), and have since received increased attention in both research and development due to their remarkable electrical conductivity, wide thermal operating range, chemical and physical stability, and high aspect ratios (Khan et al. *Arab. J. Chem.* 2019, 12, 908-931; Jeevanandam et al. *J. Nanotechnol.* 2018, 9, 1050-1074; Li et al. *Nanoscale.* 2015, 7, 17167-17194). Unlike other conventional carbon materials, carbon nanotubes have a 3D structure of cylindrically rolled-up tubes resembling chicken wire made from covalently bonded carbon atoms. There are two main types of carbon nanotubes: (1) Single-walled carbon nanotubes (SWCNTs) comprising a single layer graphene sheet (Bethune et al. *Nature.* 1993, 363, 605-607; Thostenson et al. *Compos. Sci. Technol.* 2001, 61, 1899-1912), and (2) multi-walled carbon nanotubes (MWCNTs) comprising multilayered graphene sheets (Iijima. *Nature.* 1991, 354, 56-58; Thostenson et al. *Compos. Sci. Technol.* 2001, 61, 1899-1912).

Due to their desirable high aspect ratios and electrochemical performance, carbon nanotubes are good candidates for many applications, including use as potential adsorbents for contaminants in water and supercapacitor electrode materials (Thostenson et al. *Compos. Sci. Technol.* 2001, 61, 1899-1912; Pan et al. *Nanoscale Res. Lett.* 2010, 5, 654-6; Das et al. *Desalination.* 2014, 336, 97-109; Gupta et al. *RSC Adv.* 2012, 2, 6380-6388; Fornasiero et al. *Mater. Res. Soc. Symp. Proc.* 2008, 105, 17250-17255). The reported specific surface area for multi-walled carbon nanotubes ranges from 170 m$^2$ g$^{-1}$ to 280 m$^2$ g$^{-1}$ (Peigney et al. *Carbon N. Y.* 2001, 39, 507-514). Meanwhile, reported specific surface area values for activated carbon nanomaterials, for instance, are higher than 500 m$^2$ g$^{-1}$ (Bergna et al. *J. Carbon Res.* 2018, 4, 1-10). The overall lower specific surface area of multi-walled carbon nanotubes limits their popularity for commercial applications. To overcome this obstacle, some researchers have developed carbon nanotube-based hybrid materials by including materials such as mesoporous carbon, activated carbon, nanofibers, nano-porous anodic alumina and ferrihydrite (FHY), and the resulting hybrid materials showed a significant improvement in surface area relative to the carbon nanotubes alone (Peng et al. *J. Mater. Chem.* 2012, 22, 6603-6612; Zhang et al. *Mater. Lett.* 2006, 60, 360-363; Wang et al. *Appl. Phys. Lett.* 2006, 89, E23-E26; Alsawat et al. *J. Phys. Chem. C.* 2017, 121, 13634-13644; Poinern et al. *Int. J. Eng. Sci. Technol.* 2010, 2, 13-24; Peng et al. *Carbon N. Y.* 2005, 43, 855-894).

Ferrihydrite is a naturally occurring nanocrystalline iron oxyhydroxide, with a reported specific surface area of up to 650 m$^2$ g$^{-1}$ (Hiemstra et al. *Geochim. Cosmochim. Acta.* 2009, 73, 4423-4436). Ferrihydrite plays a role in trapping contaminants from groundwater and moving them across terrestrial environments (Jia et al. *Environ. Sci. Technol.* 2005, 39, 9523-9527; Raven et al. *Environ. Sci. Technol.* 1998, 32, 344-349). Previous studies have combined ferrihydrite with multi-walled carbon nanotubes to improve the adsorption capacity of multi-walled carbon nanotubes in adsorbing aqueous contaminants (Poinern et al. *Int. J. Eng. Sci. Technol.* 2010, 2, 13-24; Peng et al. *Carbon N. Y.* 2005, 43, 855-894). However, these studies only considered a single composition ratio of multi-walled carbon nanotubes and ferrihydrite and only assessed changes of the physical properties of that mixture, e.g., crystal structure, morphology, and specific surface area (Poinern et al. *Int. J. Eng. Sci. Technol.* 2010, 2, 13-24; Peng et al. *Carbon N. Y.* 2005, 43, 855-894). Moreover, no other studies have investigated the electrochemical performance of a ferrihydrite/multi-walled carbon nanotube composite.

Herein, composites of ferrihydrite and multi-walled carbon nanotubes are synthesized at five different composition ratios and their physical and electrochemical properties are characterized and optimized. The detailed characterization includes determination of the specific surface area by Brunauer-Emmett-Teller (BET) analysis, morphology by Transmission Electron Microscopy (TEM), crystallinity by X-ray Powder Diffraction (XRD), and electrochemical properties by Cyclic Voltammetry (CV). The composites exhibited physico-chemical properties, e.g. density and dispersibility, that proved problematic in preparation procedures traditionally used for certain characterization methods. Thus, also reported herein are protocols that were developed for synthesizing and characterizing the physical, chemical, and electrochemical properties of the composite materials. These procedures can be adopted to develop and investigate other composites containing metal oxides/hydroxides.

Experimental

Materials and Preparation. Prior to the experiments, all equipment and glassware were treated with ethanol and 10% nitric acid solution to reduce organic and metal contaminations, respectively. Multi-walled carbon nanotubes (>97% purity) manufactured by catalytic decomposition of methane were purchased from Shenzhen Nanotech Port Co. Ltd. (China). According to the manufacturer, the purchased multi-walled carbon nanotubes had outer diameters between 40 and 60 nm and lengths between 5 and 15 μm.

Multi-walled carbon nanotubes were refluxed in 2.6 M HNO$_3$ solution at 140° C. for 24 hours, then washed repeatedly under vacuum filtration with 18.2 MΩ·cm deionized H$_2$O until the effluent pH reached 7.0±0.2. The multi-walled carbon nanotubes were dried in an oven at 100° C. for 24 hours. The acid refluxing step was intended to remove any residual catalyst or metal impurities from the manufacturing processes and functionalize the surface of the multi-walled carbon nanotubes with carboxyl groups. This functionalization can enhance the dispersion, surface area, and electrical properties of the multi-walled carbon nanotubes (Liao et al. *Carbon N. Y.* 2008, 46, 553-555; Le et al. *Adv. Nat. Sci. Nanosci. Nanotechnol.* 2013, 3, 035017; Zhang et al. *Mater. Lett.* 2005, 59, 4044-4047).

Ferrihydrite/multi-walled carbon nanotube composite synthesis. The composite materials were synthesized at five percent ratios of ferrihydrite/multi-walled carbon nanotubes (e.g., 100/0, 75/25, 50/50, 25/75, and 0/100) as follows. Appropriate masses of multi-walled carbon nanotubes and iron nitrate (Fe(NO$_3$)$_3$·9(H$_2$O), ACS grade, ACROS Organics) were mixed in glass beakers. The mixture was then added to 200 mL of 18.2 MΩ·cm H$_2$O, magnetically stirred for 10 minutes, and sonicated for another 30 minutes for even dispersion. These well-dispersed suspensions were treated according to a modified 2-line ferrihydrite synthesis protocol (Schwertmann et al. Iron Oxides in the Laboratory: Preparation and characterization, 2nd ed., Wiley-VCH, Weinheim, Germany, 2007), which calls for titrating with 1 M potassium hydroxide solution (KOH, Laboratory Grade, Carolina) to pH 7.5±0.2 to induce ferrihydrite precipitation. The precipitates were washed repeatedly with 18.2 MΩ·cm H₂O using vacuum filtration until the conductivity of effluent solutions reached a value below 20 µS cm⁻¹. On average, analyzed samples showed that most of the $Fe^{3+}_{(aq)}$ (mass balance, >92%) was driven into a solid phase and precipitated onto the surface of multi-walled carbon nanotubes. The synthesized composites were dried first under a vacuum desiccator for 24 hours, then under a fume hood for an additional 24 hours to ensure complete water evaporation. The dry composites were stored in sealed containers that were placed in a freezer at −18° C. pending analysis.

X-ray Powder Diffraction (XRD) analysis. Samples were analyzed on a XPERT PRO MPD X-ray diffractometer (Malvern Panalytical, Malvern, UK), operated at 45 kV and 40 mA, from 5-80° 2θ, using a Cu anode and a graphite crystal monochromator to eliminate Fe fluorescence.

Transmission Electron Microscope (TEM) analysis. Transmission electron microscopy was used to study the surface morphology, structure orientation, topography, and uniformity of the composites. A 0.5 mg/mL solution of each sample in ethanol was dispersed using sonication at >20 kHz for few minutes. These suspensions were then dropped on a LC300-Cu-150 TEM grid, with 150 nm openings lacey C support (Electron Microscopy Sciences, Hatfield, PA, USA) for TEM analysis. Samples were analyzed on a JEOL-2100 LaB6 TEM (JEOL, Peabody, MA, USA), with a point resolution of 0.194 nm, operated at 200 keV.

The TEM is equipped with a JEOL EX-230 Silicon Drift Detector (JEOL, Peabody, MA, USA) with a 60 mm² window of acquisition for Energy Dispersive X-ray Analysis (EDS). Scanning transmission electron microscopy (STEM) digital scanning images were acquired while collecting EDS maps with a JEOL EM-245111SIOD (JEOL, Peabody, MA, USA) bright field STEM detector that has a resolution of 1 nm.

Brunauer-Emmett-Teller (BET) surface area analysis. The specific surface areas of the dried composites were evaluated by conducting 7-point BET N₂ adsorption isotherms at 77 K ET using a Quantachrome Autosorb-1 (Quantachrome Instruments, Boynton Beach, FL, USA). Before the measurements, the samples were degassed overnight at 80° C. A low degassing temperature was selected to prevent the removal of the structural water of ferrihydrite. The sample mass utilized for the analysis varied from 0.08 to 0.31 g, depending on the density of each composite.

Thin Film Deposition for working electrodes (WE) for Cyclic Voltammetry (CV) analysis. Cyclic voltammetry was used to analyze the specific capacitance of each composite at various scan rates. Multi-walled carbon nanotubes have been a popular material for supercapacitors, and there are several standard methods for thin film deposition of multi-walled carbon nanotubes (Kamat et al. *J. Am. Chem. Soc.* 2004, 126, 10757-10762; Thomas et al. *J. Am. Ceram. Soc.* 2005, 88, 980-982; Karakaya et al. *Appl. Phys. Lett.* 2014, 105, 263103; Sarkar et al. *Nanomaterials.* 2013, 3, 272-288; Wang et al. *InTech,* 2011. DOI: 10.5772/22021). However, the ferrihydrite/multi-walled carbon nanotube composites had new electrochemical properties compared to carbon nanotubes or ferrihydrite alone. Attempts at conventional thin film deposition techniques, such as chemical vapor deposition, electrophoretic deposition, and doctor blade techniques, were unsuccessful.

Thus, in order to perform the cyclic voltammetry measurements, an effective method of depositing the composites on metal plate substrates was developed. Specifically, a 5 wt % Nafion ionomer solution ($C_7HF_{13}O_5S \cdot C_2F_4$, Ion Power) was used as a binder to deposit the composites on stainless steel substrate plates. Nafion has been used in previous electrochemical studies as a binder that does not interfere with the signal of target analytes (Fortier et al. *Electroanalysis.* 1992, 4, 275-283; Harrison et al. *Anal. Chem.* 1992, 64, 1926-1932; Wang et al. *J. Am. Chem. Soc.* 2003, 125, 2408-2409). Working electrodes (WE) were made from stainless steel (ASTM A240, 16 Ga) with dimensions of 1.5 cm×0.19 cm×1 cm. These electrodes were cleaned by acetone prior to the cyclic voltammetry analysis.

Suspensions combining each composite and Nafion at a density of 2 mg mL⁻¹ were prepared and sonicated for at least 30 minutes. Then, 50 µL of each mixture was drop-casted on each side of the electrode. The electrodes were placed on a rack in a sealed chamber, suspended over an ethanol bath to avoid cracking due to rapid drying. The elevated ethanol vapor pressure in the chamber slowed the evaporation rate sufficiently to allow the composite to deposit evenly on the surface of the electrodes. These electrodes were then air-dried for at least 15 more minutes before the cyclic voltammetry experiments to ensure complete evaporation. Three working electrode samples were made at each composite ratio. The deposited amount of material on these electrodes was recorded for later mass-based calculations; the deposited mass was kept under 5 mg.

Cyclic Voltammetry (CV) setup. A standardized potentiostat (Reference 600, Gamry instruments, Pa., USA) was used for the cyclic voltammetry analysis in a standard three-electrode system. The working electrodes were the stainless-steel plates with composite material deposited thereon (described above). The counter electrode (CE) was a platinum plate (Gesswein, CT, USA) and the reference electrode (RE) was Ag/AgCl in 3 M saturated NaCl solution (BASi, IN, USA).

The potentials of the working electrodes were measured against the reference electrode with a negatively charged counter electrode. The electrolyte in these experiments was a 0.5 M Na₂SO₄ solution. Unlike other organic electrolytes, Na₂SO₄ solution has a lower equivalent series resistance and pore size requirement (Gudavalli et al. *MRS Adv.* 2017, 2, 3263-3269). Measurements were made within a potential window of 1 V with an upper and lower limit of 0.5 V and −0.5 V, respectively. This potential window was limited to the 1 V range because water could breakdown at 1.23 V (Frackowiak. *Phys. Chem. Chem. Phys.* 2007, 9, 1774-1785). Cyclic voltammetry for each composite working electrode was run three times and scanned at the following scan rates: 100, 70, 50, 20, and 2 mV·s⁻¹. The following equation was used to determine the specific capacitance ($C_s$, in F·g⁻¹) of samples at various sweep rates (Gudavalli et al. *MRS Adv.* 2017, 2, 3263-3269; Zhu et al. *Ind. Eng. Chem. Res.* 2015, 54, 4956-4964):

$$C_s = \frac{\int_{V_a}^{V_b} i(V)dV}{2(V_b - V_a)vm} \quad (1)$$

where $\int_{V_a}^{V_b} i(V)dV$ is the integrated area of the cyclic voltammetry plots; v (in V s⁻¹) is the scan rate; m (in g) is the mass of loaded material on the working electrode; and $V_b$ and $V_a$ (in V) are the upper and lower voltage limit of the scan, respectively.

Figure 2:
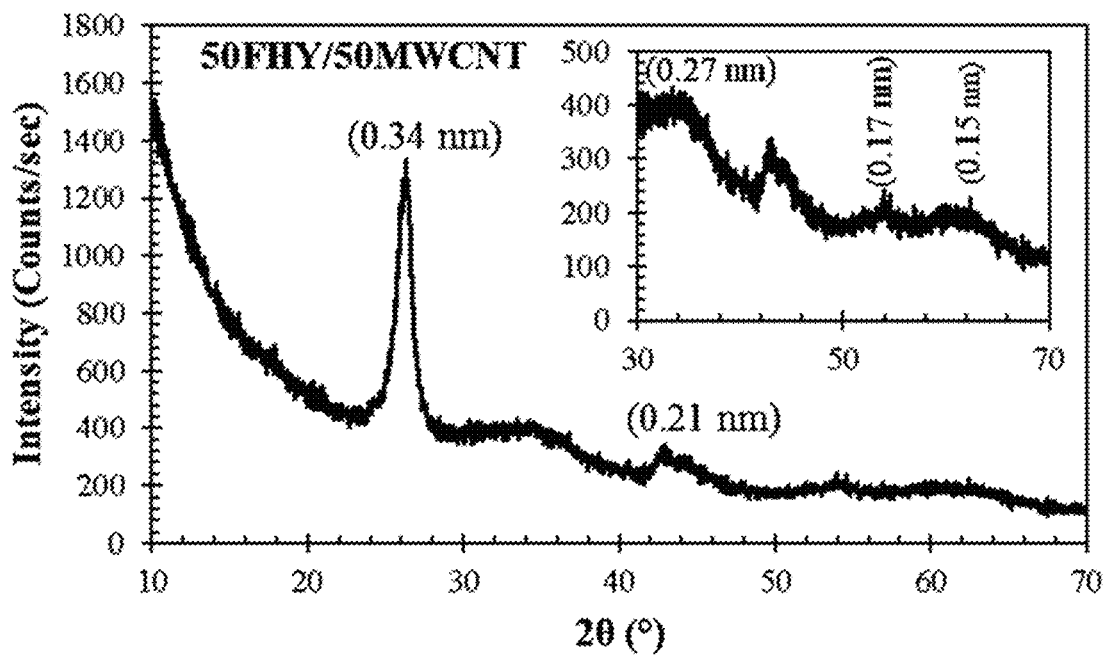
FIG. 2 is the XRD pattern of 50/50 ferrihydrite/multi-walled carbon nanotube composite, the inset shows smaller intensity XRD peaks at 30-70° for better illustration. All XRD peak are labeled with their corresponding 2 Theta angles and d-spacings (in nm).
Figure 3:
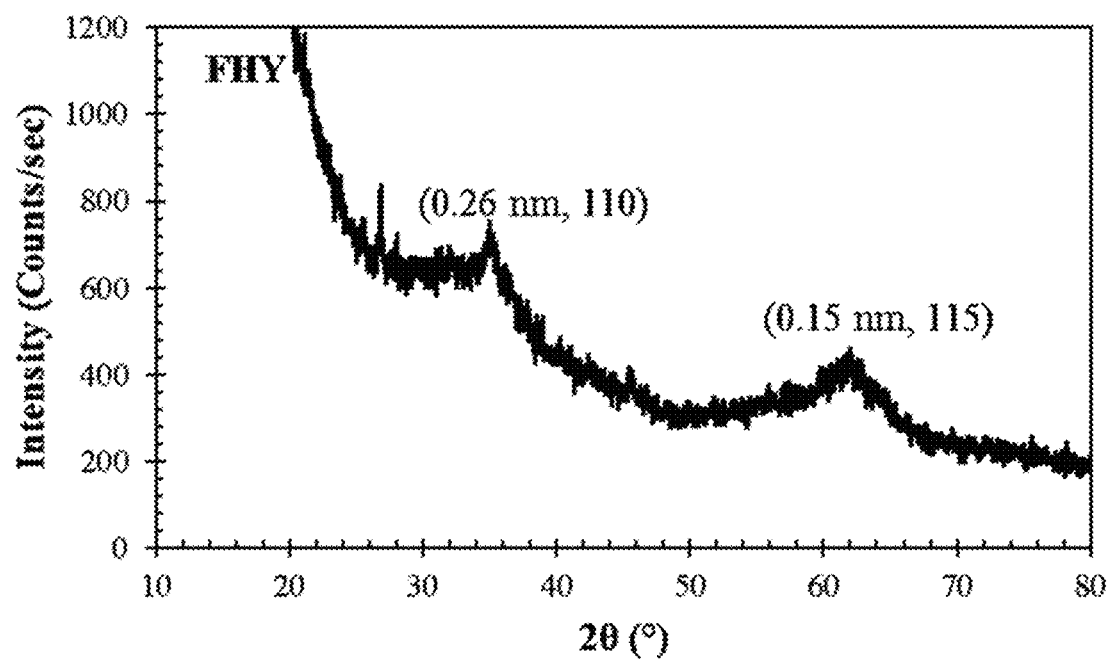
FIG. 3 is the XRD pattern of synthesized ferrihydrite. All XRD peaks are labeled with their corresponding 2 Theta angles, d-spacings (in nm), and their characterized XRD patterns from previous studies.

Results and Discussion. Representative X-ray diffractograms for the 0/100, 50/50, and 100/0 ferrihydrite/multi-walled carbon nanotube materials are shown in FIG. 1, FIG. 2, and FIG. 3, respectively. The multi-walled carbon nanotubes presented a high intensity diffraction peak around 26°

(d=0.34 nm), and three lower intensity diffraction peaks around 44° (d=0.21 nm), 53° (d=0.17 nm), and 78° (d=0.12 nm) (FIG. 1). These peaks correspond respectively to the (002), (100), (004), and (110) diffraction patterns of typical graphite, which indicates that the acid-treated multi-walled carbon nanotubes used herein were well graphitized (Atchudan et al. *J. Nanosci. Nanotechnol.* 2015, 15, 4255-4267). All these peaks, except the (110), were also present in the pattern of the 50/50 ferrihydrite/multi-walled carbon nanotube composite (FIG. 2). Based on the similarity of the XRD patterns with those from Atchudan et al. (Atchudan et al. *J. Nanosci. Nanotechnol.* 2015, 15, 4255-4267), it can be concluded that neither the multi-walled carbon nanotubes alone nor the ferrihydrite/multi-walled carbon nanotube composite contains significant carbonaceous or metal impurities. Therefore, it can be concluded that the quality of the multi-walled carbon nanotube starting material is not compromised during the synthesis of the composite materials.

The pattern for ferrihydrite alone showed two main diffraction peaks around 34° (d=0.26 nm) and 61° (d=0.15 nm) (FIG. 3), which correspond to the (110) and (115) diffraction patterns, respectively, of a 2-line ferrihydrite (Liu et al. *PLoS One.* 2018, 13, e0191229). These peaks are also evident in FIG. 2 for the ferrihydrite/multi-walled carbon nanotube composite, revealing that ferrihydrite was successfully synthesized in the composite.

The XRD data indicates that the ferrihydrite/multi-walled carbon nanotube composite inherited the characteristic XRD patterns of both the ferrihydrite and the multi-walled carbon nanotubes. Hence, the synthesis procedure developed herein for the composite materials did not interfere with the formation of ferrihydrite or the integrity of the multi-walled carbon nanotubes. Moreover, the crystallinity signature of each composite sample is qualitatively representative of each of its respective components.

Figure 4:
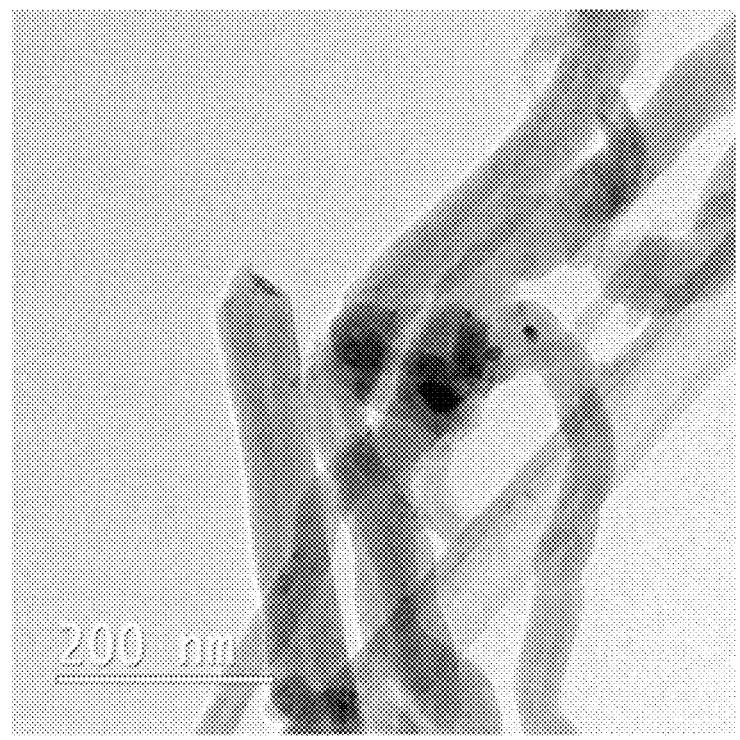
FIG. 4 is a TEM image of acid treated multi-walled carbon nanotubes.

FIG. 4 shows the morphology of acid treated multi-walled carbon nanotubes, which comprised regular tubular structures with outer diameters in the range of 30-50 nm and lengths varying from 5-15 μm.

Figure 6:
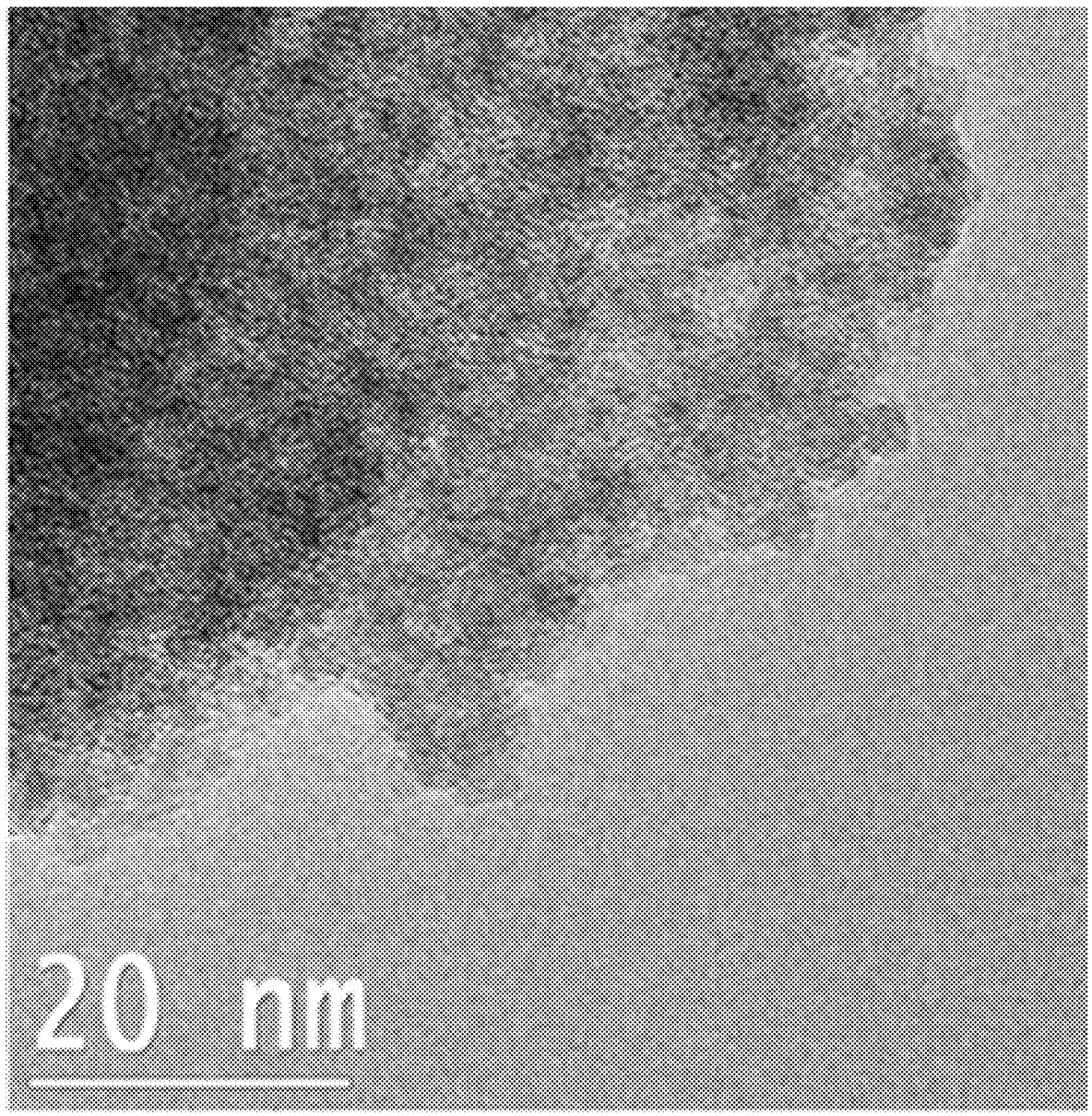
FIG. 6 is a TEM image of synthesized ferrihydrite.

FIG. 6 reveals the morphology of synthesized ferrihydrite particles (e.g., composite sample 100/0). The ferrihydrite particles were nano-crystalline with a particle size estimated roughly to be 3 nm, similar to two-line ferrihydrite reported in earlier studies (Rout et al. *Dalt. Trans.* 2012, 41, 3302; Liu et al. *Langmuir.* 2006, 22, 9313-9321; Mikutta et al. *Geochim. Cosmochim. Acta.* 2008, 72, 1111-1127).

Figure 5:
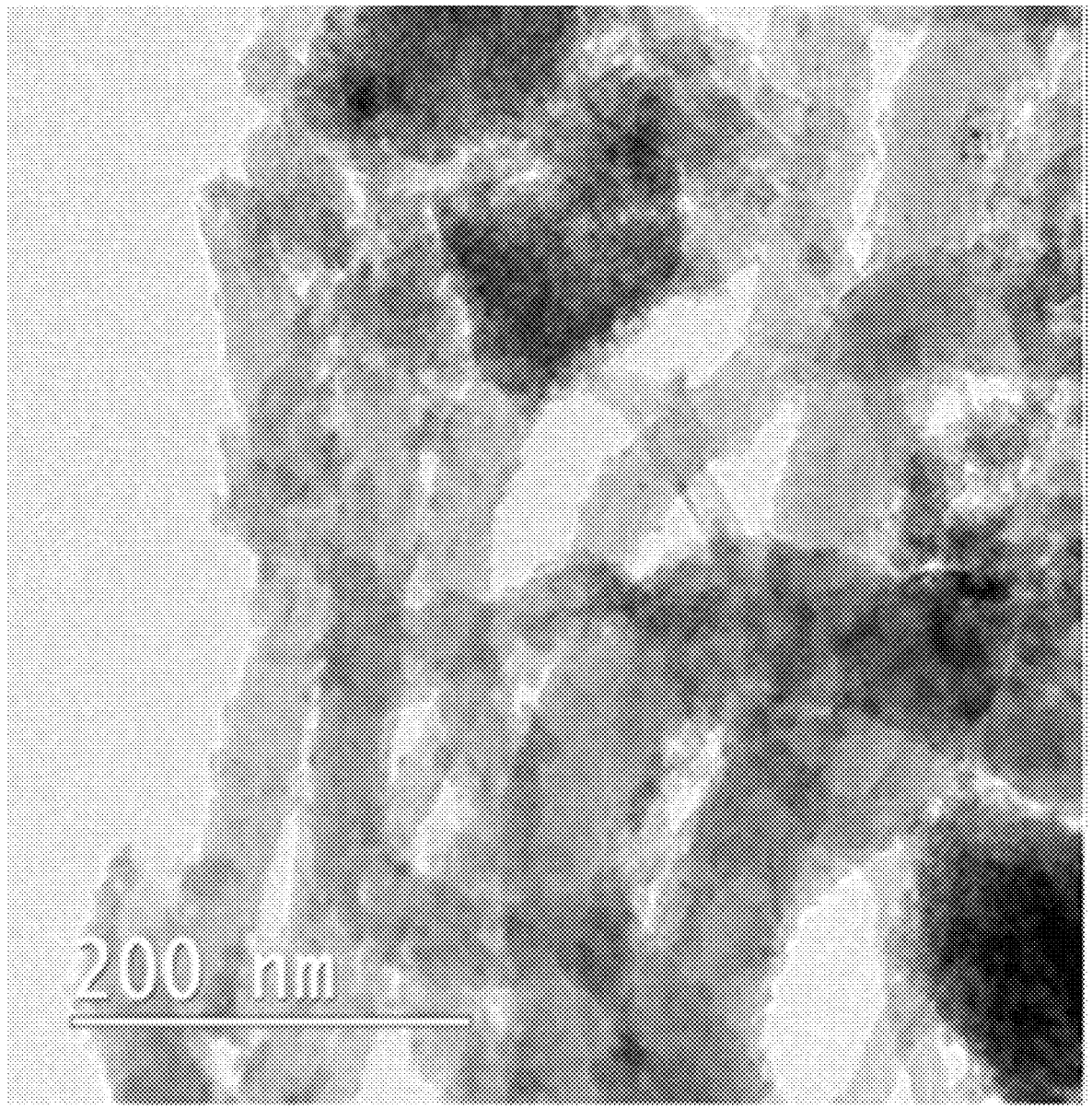
FIG. 5 is a TEM image of 50/50 ferrihydrite/multi-walled carbon nanotube composite.

The 50/50 ferrihydrite/multi-walled carbon nanotube sample (FIG. 5) comprises multi-walled carbon nanotubes covered with an agglomerated layer of ferrihydrite particles coating the surface of the multi-walled carbon nanotubes. While most of the surface of the multi-walled carbon nanotubes appears to be covered by ferrihydrite, some regions had a higher density of ferrihydrite deposition than others, as evidenced by the higher-contrast regions. This morphology confirmed the presence of a two-phase solid made of ferrihydrite and multi-walled carbon nanotubes. Based on the distribution of ferrihydrite on the multi-walled carbon nanotubes seen in FIG. 5, it was concluded that there is a strong bonding between these two materials in the composites, since the ferrihydrite remained intact on the multi-walled carbon nanotubes despite the extensive sonication administered prior to TEM analysis.

During the $HNO_3$ refluxing step (discussed above), the surface of multi-walled carbon nanotubes was functionalized with carboxylic groups with pKa values of 1.8-2.4. At the pH values of 6-7.0 reached during the synthesis and subsequent washing, the carboxylic groups can fully deprotonate and therefore the multi-walled carbon nanotubes can carry an overall negative charge. The point of zero charge ($pH_{pzc}$) of ferrihydrite is between 7.5 and 8.2 (Pereira et al. *Geochem. Trans.* 2019, 20, 1-14; Zhou et al. *Minerals.* 2018, 8, 1-101; Parks. *Chem. Rev.* 1965, 65, 177-198), and thus in the synthesized ferrihydrite nanoparticles carry a positive charge in the experiments herein. The attachment between the ferrihydrite multi-walled carbon nanotubes in the hybrid composites can involve ionic bonds between the carboxyl groups on the multi-walled carbon nanotubes and the hydroxyl groups on ferrihydrite.

Figure 7:
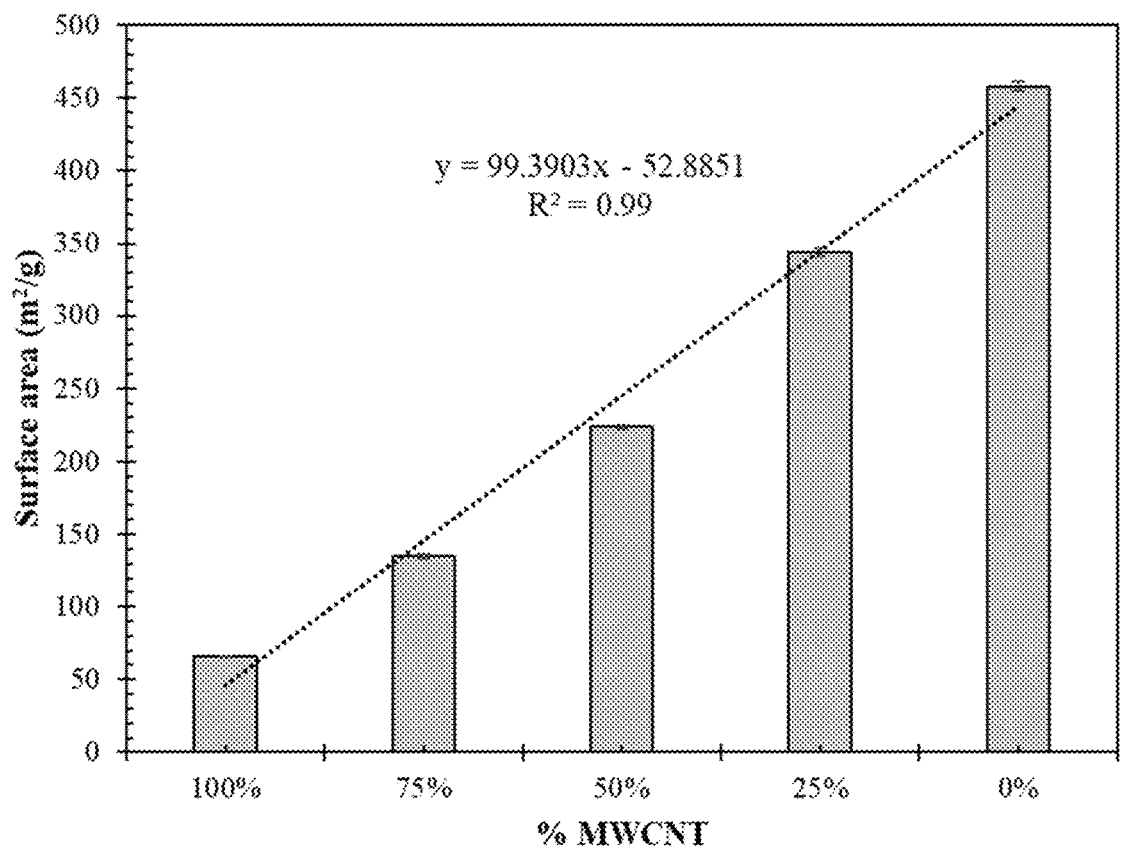
FIG. 7 shows the specific surface area data for all composite and control samples. Trendline and equation showing the relationship between the % multi-walled carbon nanotubes in the composite material and its measured BET specific surface area. Error bars represent the standard deviation of triplicate samples.

FIG. 7 shows a strong correlation between the measured specific surface area and the % ferrihydrite in the composite materials ($R^2$=0.99). The specific surface area increased with increasing % ferrihydrite in the composite samples (FIG. 7). Ferrihydrite alone (e.g., 0% MWCNT in FIG. 7) had the highest specific surface area of 458.02 $m^2$ $g^{-1}$, which is almost 7 times higher than that measured for the multi-walled carbon nanotubes alone (65.76 $m^2$ $g^{-1}$, 100% MWCNT in FIG. 7). The trend observed in FIG. 7 supports the viability of incorporating ferrihydrite with multi-walled carbon nanotubes to increase the specific surface area. On average, the surface area increased by approximately 5.97% for every % ferrihydrite increase in the composite. Additionally, the specific surface area value obtained for untreated multi-walled carbon nanotubes was 54.23 $m^2$ $g^{-1}$, which is 1.2 times lower than that of the acid-treated multi-walled carbon nanotubes (100% MWCNTs in FIG. 7), indicating that refluxing the multi-walled carbon nanotubes with $HNO_3$ can also increase the surface area of the multi-walled carbon nanotubes.

Obtaining cyclic voltammetry data for the hybrid composites proved extremely challenging due to the difficulties in achieving evenly-coated electrodes with no factures despite the use of a delayed-evaporation chamber. This challenge highlights the need to further improve the electrochemical characterization methods.

Figure 8:
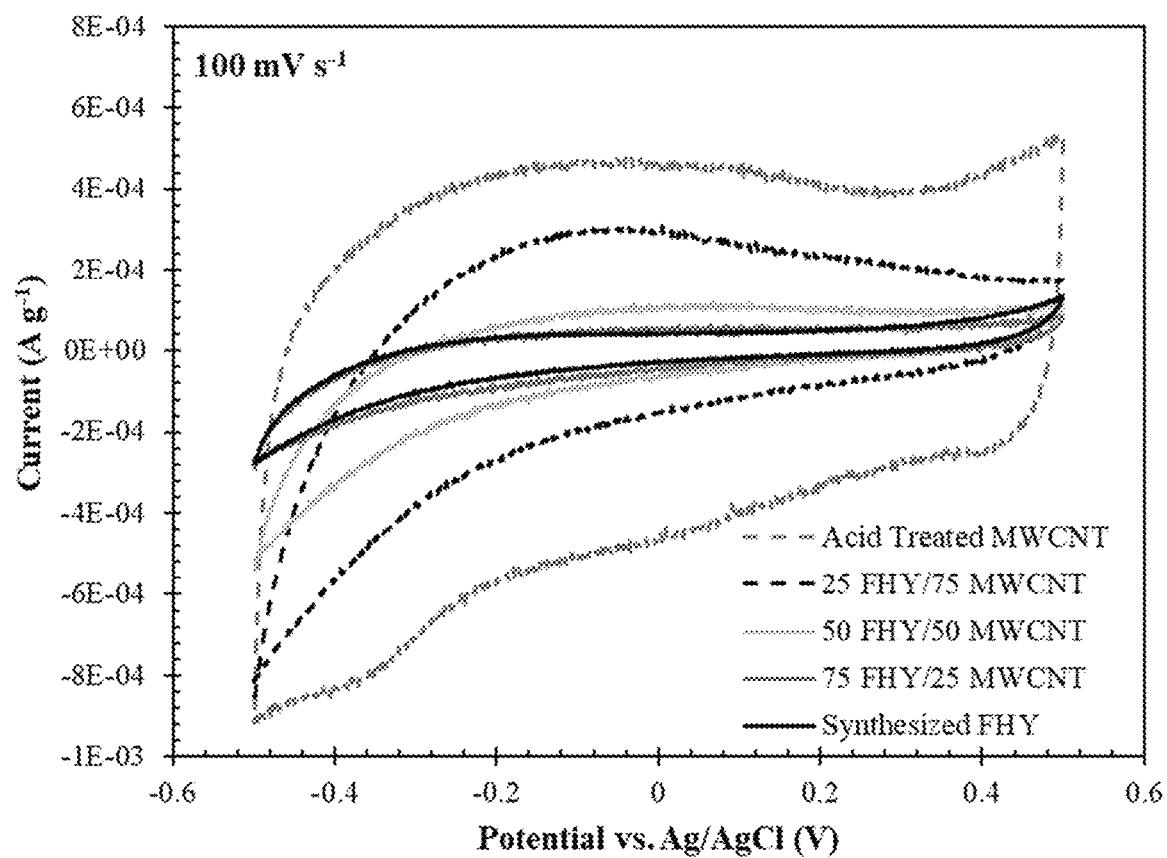
FIG. 8 shows the cyclic voltammetry plots of all composite samples and controls at 100 mV s$^{-1}$ in 0.5 mol L$^{-1}$ Na$_2$SO$_4$ electrolyte solution.

In any case, FIG. 8 shows the cyclic voltammetry plots of all samples at a scan rate of 100 mV $s^{-1}$. The current density increased with increasing % multi-walled carbon nanotubes in all composite samples (FIG. 8), indicating more electrolyte ions in the electrical double layer at the surface of the composite electrode with higher % multi-walled carbon nanotubes (Gudavalli et al. *MRS Adv.* 2017, 2, 3263-3269; Zhu et al. *Ind. Eng. Chem. Res.* 2015, 54, 4956-4964).

Figure 9:
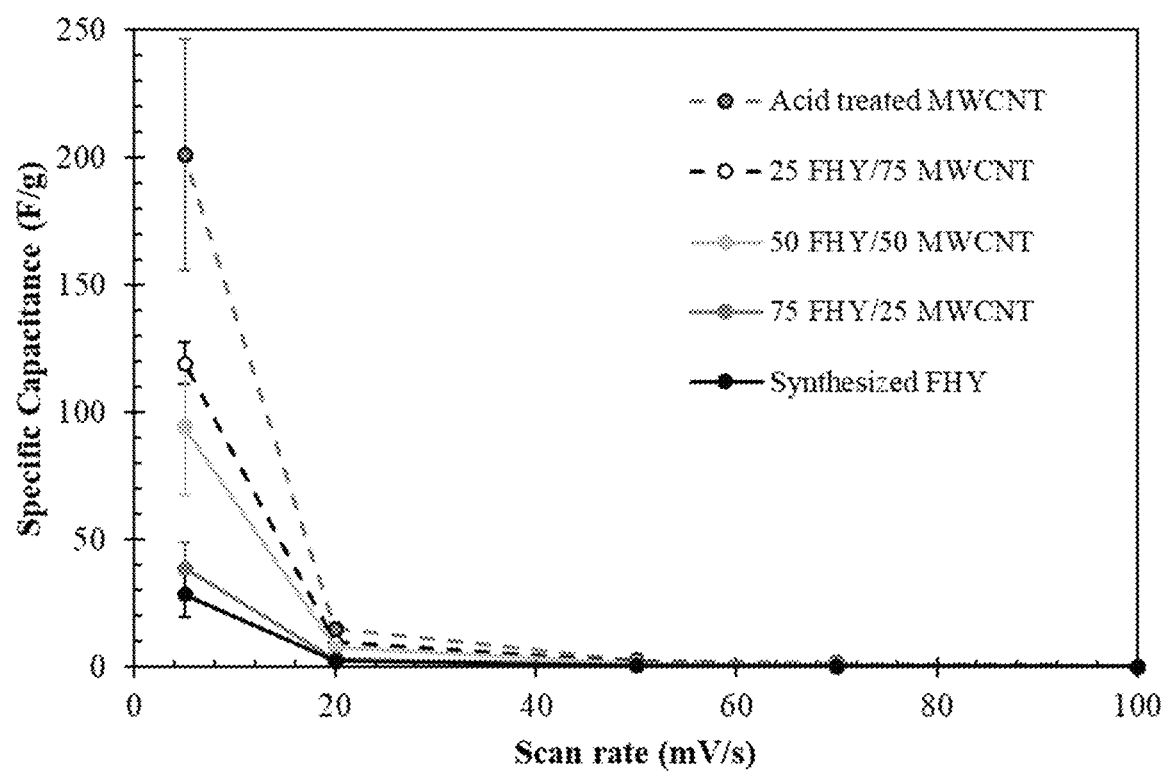
FIG. 9 shows the specific capacitance of all composite samples and controls at various scan rates. Error bars reveal the standard deviation obtained from triplicate electrode measurements.

Moreover, the cyclic voltammetry plot of the multi-walled carbon nanotubes alone had a near rectangular shape (Acid-Treated MWCNT in FIG. 8), indicating the characteristics of an effective capacitor (Gudavalli et al. *MRS Adv.* 2017, 2, 3263-3269; Zhu et al. *Ind. Eng. Chem. Res.* 2015, 54, 4956-4964). The cyclic voltammetry plots for the hybrid composite materials deviated further from the ideal rectangle shape with increasing % ferrihydrite (FIG. 8), suggesting a lower electrochemical performance in these samples. This negative impact of increasing % ferrihydrite on the electrochemical performance of the composite was also observed at all other scan rates tested (FIG. 9).

Figure 10:
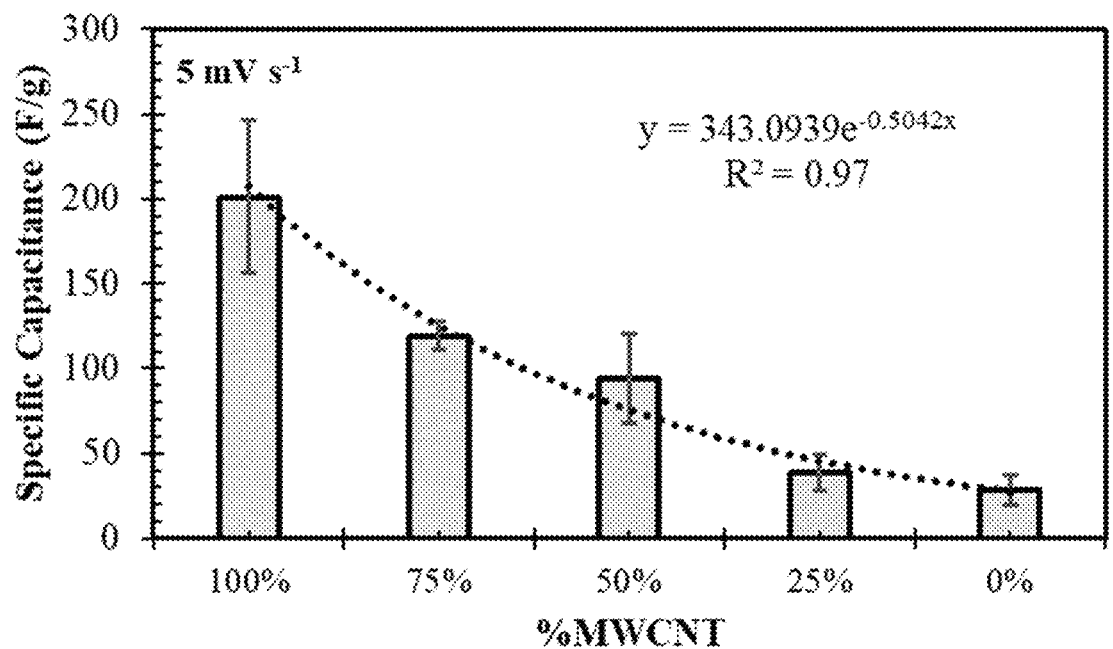
FIG. 10 shows the specific capacitance data of all composite samples and controls at the scan rate of 5 mV s$^{-1}$. Trendline and equation showing the relationship between composite ratio and specific capacitance are included.

FIG. 10 shows the highest observed specific capacitance of the samples at 5 mV $s^{-1}$. The precision of 50/50 ferrihydrite/multi-walled carbon nanotube composite results in FIG. 10 may have been compromised by the loss of one sample in the three replications during the analysis. The samples with higher % multi-walled carbon nanotubes exhibit higher specific capacitance (FIG. 10) indicating better electrochemical characteristics. At 5 mV $s^{-1}$, the calculated specific capacitance of the multi-walled carbon nanotubes alone was 200.91 F $g^{-1}$, which was ~7 times higher than that of the ferrihydrite alone (28.35 F $g^{-1}$). Furthermore, the effect of increasing multi-walled carbon nanotube content on specific capacitance of the composite was close to exponential growth, with $R^2$=0.97. On average, the specific capacitance increased 2.75% for every percent increase in multi-walled carbon nanotubes in the composite.

Taken cumulatively, the results indicate that both multi-walled carbon nanotubes and ferrihydrite impart both desirable and undesirable properties on the composite materials. The multi-walled carbon nanotubes enhance the specific capacitance but reduce the specific surface area, while the opposite effects are true for ferrihydrite. Therefore, the specific surface area and specific capacitance are both plotted in FIG. 11 to determine the optimum ratio for a composite material with the highest specific surface area and specific capacitance, where the intersection of the two plots represents the optimal composition.

Figure 11:
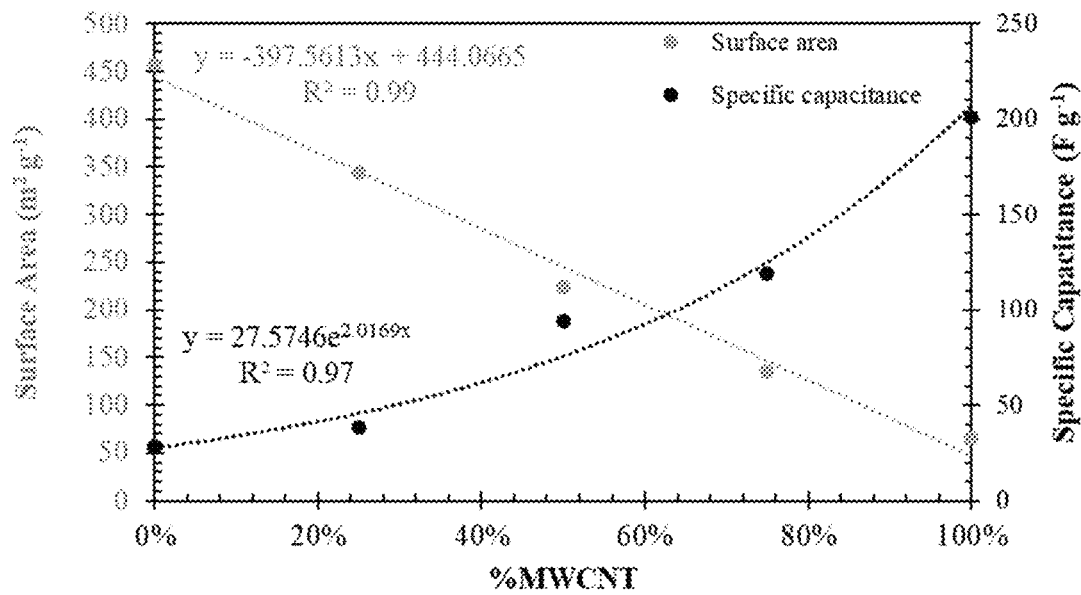
FIG. 11 is a combination plot showing the fluctuation of both specific capacitance and specific surface area with different ratios of multi-walled carbon nanotubes and ferrihydrite in the composite materials.

The intersection between the two curves in FIG. 11 occurred at about 36% ferrihydrite and 64% multi-walled carbon nanotubes. This composite ratio yields a calculated surface area of 190 $m^2$ $g^{-1}$ and an estimated specific capacitance of 100 F $g^{-1}$ at 5 mV $s^{-1}$. In comparison, the specific surface area of this composite was 2.9 times higher than that of the multi-walled carbon nanotubes alone and about 3.5 times higher in specific capacitance at 5 mV·$s^{-1}$ than ferrihydrite alone.

The relationship between the specific surface area and the specific capacitance to the % multi-walled carbon nanotubes in the composite materials can be explained in view of other properties measured for the composite samples. BET $N_2$ adsorption responds to changes in the surface of the composite materials. Therefore, if the materials are synthesized carefully and the target ratio of ferrihydrite to multi-walled carbon nanotubes in the composite is achieved, the measured specific surface area will increase proportionally and linearly with the mass of ferrihydrite. In contrast, the pathways of ion movement during electrochemical measurements are potentially more complicated. These pathways determine the current density, and hence directly affect the calculated specific capacitance of the materials. As mentioned above, based on TEM data, ferrihydrite coated most of the surface of the of multi-walled carbon nanotubes in the composite samples, but the ferrihydrite tended to aggregate together in samples with higher % ferrihydrite. These ferrihydrite aggregates can prevent the transport of solvent ions and can reduce the observed specific capacitance of those materials. Thus, obtaining an even coating/adsorption of ferrihydrite onto the surface of the multi-walled carbon nanotubes can improve the specific capacitance of the hybrid materials.

Conclusions and Technical Implication. A synthesis procedure to create hybrid materials that can address the deficiencies of the specific surface area of traditional multi-walled carbon nanotubes when compared to conventional carbon nanomaterials was developed. The results demonstrated that the specific surface area of multi-walled carbon nanotubes could be increased by doping them with ferrihydrite. Yet, to preserve desirable electrochemical reactivity of the composites, an optimal composite ratio was estimated to be 36% ferrihydrite and 64% multi-walled carbon nanotubes. This ratio can yield a hybrid material with a specific surface area that is 2.9 times higher and a specific capacitance that is 2.0 times lower than for the multi-walled carbon nanotubes alone. In addition to improving traditional multi-walled carbon nanotubes, the synthesized hybrid materials can have direct uses in applications that already utilize carbon nanotubes and other metal oxides, such as capacitive deionization technologies as applied to water treatment.

Example 2

Conventional activated carbon filters have a limited sorption capacity, and relatively low surface area, and often become clogged due to biofouling.

Carbon nanotubes and graphene in general have high surface electrical charge and so are useful in sorbing charged species from solution. However, they have relatively low surface area. Ferrihydrite (iron oxy-hydroxide) has relatively low charge, but a high surface area. Creating a composite optimized the benefit and drawbacks of each of these materials.

The methods of synthesis described herein allow for precise control of the proportion of carbon nanotubes to ferrihydrite in the resulting composite, therefore allowing precise control of the surface area and surface charge. The methods also provide the ability to vary the proportion of the two components of the composite, thereby controlling the surface area and electrochemical properties of the composite.

Because carbon nanotubes have antimicrobial properties (Kang et al. *Langmuir,* 2007, 23(17), 8670-8673; Kang et al. *Langmuir* 2008, 24(13), 6409-6413), it is expected that the composite will have antimicrobial properties that solve the common biofouling problems of standard water filters.

This technology is relevant to the field of solid phase extraction/separation, sorption/remediation, water purification and filtration (e.g., desalination), and environmental remediation. The composite has potential application as a sorbent to remove contaminants from water, including inorganic phases (e.g., lead, arsenic), organic compounds (e.g. pesticides, perfluorinated compounds), and viral pathogens. The composite, as a charged filtration system, as potential applications in separation methods applied to any solute that has fractions that can be isolated through filtration. This applied to organic and inorganic materials. This separation material has potential applications in water, food, medicine, biotech, and pharma.

The composites can be used as water filters which are capable of removing metal and organic contaminants from water with reduced biofouling properties.

Example 3

Both lead and arsenic have been known hazards/contaminants to water for many years, yet are still present in drinking water due to old pipes or environmental presence from well water (13M households in the US).

Per- and polyfluoroalkyl substances (PFASs) are synthetic organic compounds that are used for certain industrial purposes (stain/water repellants, paints and coatings, fire foams), the same factors that make them suitable for these industrial purposes also leads to them being difficult to breakdown and remove from contaminated water, soil, etc. In 1990s and 2000s, PFASs were identified and recognized as potential environment hazards with studies showing a persistence in blood/serum of those exposed to such chemicals as well as increased types of cancer. Known PFAS hazards are being phased out by US manufacturers, however, there remain 26,000 contaminated sites in the US and estimated 6M people exposed to elevated levels through drinking water. Therefore, there continues to be a need for effective removal of both elemental contaminants and PFAS compounds from water.

Current filter technologies suffer from poor throughput, poor sorption, as well as biofouling. Activated carbon (including graphene) is often a component of single and compound filters due to its ability to pull charged particles from solution as well as its large surface to mass ratio. These same characteristics also make carbon filters prone to biofouling in which bacteria grow on the surface and pores of the filter. This can lead to the addition of biologic contaminants as well as slowing of filtration.

Ferrihydrite (FHY) is an iron hydoxyoxide which has been used for its filtering properties due to its porosity and high surface area to volume ratio. Ferrihydrite has high adsorption of lead and arsenic which in part make it useful in water remediation and filtration. Ferrihydrite, however, is unable to remove synthetic organic compounds.

Described herein is a composite filter incorporating both multiwalled carbon nanotubes (MWCNTs) or single-walled carbon nanotubes (SWCNTs), which retain the same adsorptive characteristics of activated carbon filters, with ferrihydrite for improved water decontamination. These filters are capable of removing any organic or inorganic aqueous ionic contaminant, elemental contaminants (for example, lead, arsenic, etc.) as well as PFASs. Additionally, the antimicrobial properties of carbon nanotubes can reduce potential biofouling.

Example 4

Nanofiltration is a pressure-driven, membrane-based separation technology utilizing membranes that are capable of retaining particles and molecules with dimensions between 1 nm and 10 nm. Over the years, three main types of nanofiltration membranes have been developed: organic (primarily polymeric), inorganic (or ceramic), and hybrid (or organic/inorganic).

The overall global market for nanofiltration membranes is expected to grow from $518 million in 2019 to $1.2 billion by 2024 with a compound annual growth rate (CAGR) of 18.2% from 2019 to 2024. Within the overall nanofiltration membrane market, water and wastewater treatment is the largest segment within the overall market. This subset is anticipated to expand from $392 million in 2019 to $896 million by 2024 with a CAGR of 18.0%. Within this segment, nanofiltration membranes are being used primarily for water softening, water purification, desalination, and wastewater treatment. Sales of these products have risen at a CAGR of 18.0% during the 2017-2019 period.

The global home water filtration unit market size was estimated at USD 9.92 billion in 2019 and is expected to reach USD 11.48 billion in 2020. The global home water filtration unit market is expected to grow at a compound annual growth rate of 15.9% from 2019 to 2025 to reach USD 24.11 billion by 2025.

The global water purifier market size is expected to reach USD 45.00 billion by 2027, exhibiting a CAGR of 7.2% during the forecast period. The advent of technologically advanced smart water purifier will further bolster healthy growth of the market.

Potentially relevant areas driving growth of nanofiltration technologies include water treatment (e.g., potable water); chemical industry (e.g., removal of solids and organic solids); and other areas.

In water treatment, nanofiltration can be used as a replacement for reverse osmosis in applications that do not require ultra-pure water (e.g., removal of all monovalent solvents). Compared to reverse osmosis, nanofiltration offers advantages of being lower energy and cost, producing less waste waters, and working at higher pH. Also, nanofiltration can be used in conjunction with reverse osmosis (RO) to reduce costs—essentially "pre-filtering" water for RO, which reduces subsequent pressure and energy needed for the RO process.

In chemical industry uses, nanofiltration has been used for several decades for processing non-aqueous fluids (i.e., organic solvents). Organic solvent nanofiltration (OSN) currently represents a fast-growing segment of the nanofiltration market.

Other areas include, for example, agriculture (e.g., treatment of drainage water and removal of pesticides) and landfill leachate management (e.g., filtration of water from precipitation that becomes contaminated by dissolving organic and inorganic materials present in the solid waste).

Current water filtration/purification methods include activated carbon, reverse osmosis, UV treatment, ozone treatment, ion exchange, distillation, and multistep processes.

Activated Carbon is used in many capacities and can be impregnated with silver to reduce likelihood of bacterial growth.

Reverse Osmosis uses a thin semipermeable membrane (film) and pressure to remove chemical and biological impurities from water composite membrane. Reverse osmosis can generate high wastewater output when used in small scale (home), may remove desirable materials, and can be costly when used to scale as it requires energy input to system to function.

UV treatment uses UV light, is easy and relatively inexpensive, but generally only removes biologic contaminants and does not work well in situation where water is not first filtered to some level to remove suspended particles. Further, the flow rate must be slow enough to provide sufficient UV exposure to kill microorganisms.

Ozone treatment uses ozone (a powerful oxidizing agent which is toxic to most waterborne organisms) to purify water from microbes. Ozone must be created onsite and bubbled through water. This method requires additional energy to be added to the system to function and does not filter or remove other contaminants.

Ion exchange is a water softening method in which certain metal ions are removed from water and replaced with others. Ion exchange can also remove toxic ions like arsenic and lead.

Distillation systems boil water into vapor and then condense the vapor back into liquid in a separate container. However, impurities may remain in the original container if they have boiling points above that of water.

Multistep processes combine multiple filtration and purification steps into single processes (i.e. activated carbon filters and UV light disinfection).

Accordingly, current filter technologies suffer from various drawbacks. Described herein is a composite filter incorporating both multiwalled carbon nanotubes (MWCNTs), which retain the same adsorptive characteristics of activated carbon filters, with ferrihydrite for improved water decontamination. The composite filters described herein: have a reduced potential for biofouling; can remove both elemental hazards and organic contaminants from water to improve its potability; can have improved adsorption of contaminants via use of carbon nanotubes rather than graphene or other nanoformulations of carbon; and can have improved water transport over other carbon-based filters.

Example 5

Per- and polyfluoroalkyl substances (PFAS) are a group of artificial organic compounds, usually referred to as "forever chemicals" due to their remarkable recalcitrance in the nature. PFAS are characterized by a hydrophobic-oleophobic carbon chain where the hydrogen atoms are partially or completely replaced by fluorine atoms, and a polar functional group at the end of the carbon chain is commonly displayed (Kucharzyk K H et al. *J. Environ. Manage.* 2017, 204, 757-764; Rahman M F et al. *Water Res.* 2014, 50, 318-340; Román Santiago A et al. *Electrochim. Acta* 2022, 403, 139635). Due to their unique structures, PFAS have displayed outstanding properties such as thermal stability, chemical inertness, and good surfactant properties, making them attractive for many applications such as coating ingredients, adhesive materials, and industrial products (Román Santiago A et al. *Electrochim. Acta* 2022, 403, 139635; Zhang D Q et al. *Sci. Total Environ.* 2019, 694, 133606).

Perfluorooctanoic acid (PFOA) was one of the first manufactured PFAS and has been historically heavily used, especially as an active ingredient in aqueous film-forming foams on military bases since the early 1940s (Paul A G et al. *Environ. Sci. Technol.* 2009, 43, 386-392; Prevedouros K et al. *Environ. Sci. Technol.* 2006, 40, 32-44; Radjenovic J et al. *Environ. Sci. Technol.* 2020, 54, 14815-14829; Román Santiago A et al. *Electrochim. Acta* 2022, 403, 139635). Large amounts of PFOA has been found in the various aqueous natural environment: ca. 2-8 ng/mL of PFOA is commonly found in human samples (blood, serum, plasma and urine) in industrialized countries (Hölzer J et al. *Int. J Hyg. Environ. Health* 2009, 212, 499-504; Poothong S et al. *Environ. Sci. Technol.* 2017, 51, 13388-13396), ca. 2234-5200 ng/L was encountered in surface/groundwater (Bai X et al. *Sci. Total Environ.* 2021, 751, 141622; Hepburn E et al. *Environ. Pollut.* 2019, 248, 101-113), and ca. 5-1475 ng/L was reported in public water systems (Becker A M et al. *Chemosphere* 2008, 72, 115-121; Giesy J P et al. *Environ. Sci. Technol.* 2001, 35, 1339-1342; Jin Y H et al. *Chemosphere* 2009, 77, 605-611; Pitter G et al. *Environ. Health Perspect.* 2020, 128, 1-12). Previous epidemiological and toxicology studies have concluded PFOA is associated with harmful effects to human health, such as liver/testicular cancer, high cholesterol levels, pre-eclampsia, and interference with vaccine responses in children (ATSDR, 2020. Immunotoxicity Associated with Exposure to Perfluorooctanoic Acid or Perfluorooctane Sulfonate; Calafat A M et al. *Environ. Health Perspect.* 2007, 115, 1596-1602). Additionally, a previous study reported that PFOA is one of the most difficult PFAS to degrade (Arvaniti O S et al. *Chem. Eng. J.* 2015, 262, 133-139). Thus, this highlights an urgent need to develop an effective method for removing PFOA from nature.

Various technologies have been proposed to remove PFOA from aqueous environments, including advanced chemical oxidation processes, photochemical oxidation, and sono-chemical decomposition etc. (Arvaniti O S et al. *Chem. Eng. J.* 2015, 262, 133-139; Carter K E et al. *Environ. Sci. Technol.* 2008, 42, 6111-6115; Cheng J et al. *Environ. Sci. Technol.* 2010, 44, 445-450; Hori H et al. *Environ. Sci. Technol.* 2004, 38, 6118-6124; Hori H et al. *Environ. Sci. Technol.* 2006, 40, 1049-1054; Tang C Y et al. *Environ. Sci. Technol.* 2006, 40, 7343-7349). However, many of these proposed techniques are destructive methods which require harsh experimental conditions and have a high chance of generating unwanted by-products, such as shorter chain PFAS. It has been reported that shorter chain PFAS are even harder to remove than longer chain PFAS precursors (Glover C M et al. *Water Res.* 2018, 144, 454-461). Likewise, destructive chemical oxidation/reduction methods for the remediation of PFAS inevitably generate fluorine ions (Horst J et al. *Groundw. Monit. Remediat.* 2020, 40, 17-27).

In environmental remediation, adsorption is considered an effective, non-destructive, low energy cost and preferable for eco-friendly approaches in removing trace aqueous contaminants (Li X et al. *Environ. Sci. Technol.* 2011, 45, 8498-8505; Román Santiago A et al. *Electrochim. Acta* 2022, 403, 139635). Electrosorption is an innovative approach in removing aqueous contaminants, this process involves the non-faradic attraction of dissolved species onto the surface of a polarized electrode by means of an induced electric field (Chen R et al. *Environ. Sci. Water Res. Technol.* 2020, 6, 258-282; Román Santiago A et al. *Electrochim. Acta* 2022, 403, 139635). Electrosorption has been previously reported to be able to improve the adsorption rates and adsorption capacity of various aqueous contaminants (Chen R et al. *Adv. Funct. Mater.* 2021, 31, 2009307; Chen R et al. *Environ. Sci. Water Res. Technol.* 2020, 6, 258-282; Kim K et al. *Adv. Mater.* 2020, 32, 1-8; Li X et al. *Environ. Sci. Technol.* 2011, 45, 8498-8505; Su X et al. *Adv. Funct. Mater.* 2016, 26, 3394-3404; Su X et al. *Nat. Commun.* 2018, 9, 4701).

Carbon-based electrodes have been widely used for environmental electrosorption studies (Bayram E et al. *Environ. Sci. Technol.* 2010, 44, 6331-6336; Foo K Y et al. *J. Hazard. Mater.* 2009, 170, 552-559; Li X et al. *Environ. Sci. Technol.* 2011, 45, 8498-8505). Multi-walled carbon nanotubes (MWCNTs) are multilayered graphene sheets of covalently bonded carbon atoms rolled up cylindrically (Iijima S. *Nature*, 1991, 354, 56-58; Thostenson E T et al. *Compos. Sci. Technol.* 2001, 61, 1899-1912). MWCNTs are a promising material for electrochemical applications, due to their unique structures, good surface area, porosity, electrochemical stability, and good conductivity (Du Z et al. *J. Hazard. Mater.* 2014, 274, 443-454; Li H et al. *J. Electroanal. Chem.* 2011, 653, 40-44; Li X et al. *Environ. Sci. Technol.* 2011, 45, 8498-8505; Román Santiago A et al. *Electrochim. Acta* 2022, 403, 139635). However, there has been little investigation of the application of MWCNTs for electrosorption (Liu Y X et al. *J. Hazard. Mater.* 2011, 186, 473-480; Román Santiago A et al. *Electrochim. Acta* 2022, 403, 139635). Further, there has been limited study of applying electrosorption to remove PFOA (Li X et al. *Environ. Sci. Technol.* 2011, 45, 8498-8505). Perhaps, the relatively low specific surface area (SSA) of MWCNTs (170-280 $m^2 \cdot g^{-1}$) (Peigney A et al. *Carbon N. Y.* 2001, 39, 507-514) compared to conventional materials such as activated carbon (500 $m^2 \cdot g^{-1}$) (Bergna D et al. *J. Carbon Res.* 2018, 4, 1-10), has limited the attraction of using MWCNTs for environmental adsorption studies. To address this issue, a composite material was developed by doping MWCNTs with ferrihydrite, (FHY)—a nanocrystalline iron oxyhydroxide mineral with high SSA (650 $m^2 \cdot g^{-1}$) (Hiemstra T et al. *Geochim. Cosmochim. Acta* 2009, 73, 4423-4436). The effect of the ratio of FHY to MWCNTs in the composite materials was investigated and the FHY/MWCNT composite materials were found to have a higher SSA than pristine MWCNTs, but still retained good performance (Tran T et al. *J. Compos. Sci.* 2020, 5, 5).

Herein, the efficacy of FHY/MWCNT composite materials was extended by evaluating the efficiency of the FHY/MWCNT composites in removing aqueous PFOA under electrochemical assistance. This is the first time the electrosorption of PFOA on FHY/MWCNT has been studied. Both the electrosorption kinetics and isotherms of PFOA under various environmental conditions were investigated. The effect of ionic strength in bulk solution is also discussed.

Meanwhile, the ability of this approach to destroy PFOA was also investigated. The results show that the FHY/MWCNT composite materials are a promising solution not only for aqueous environmental remediation but also for water purification and wastewater treatment.

Experimental

Electrosorption and batch experiments were performed.

The electrosorption experiments were performed using a three-electrode system similar to previous studies (e.g., Examples 1-4). The working electrode was formed according to the methods described in the previous studies (e.g., Examples 1-4). Different potentials (0.6, −0.6V) and electrolyte concentrations (0 M, 1 mM, 5 M) were used to evaluate the PFOA adsorption efficiency of the composite materials under various electrosorption conditions.

The purpose of the batch experiment was to compare the PFOA adsorption efficiency of the composite materials with and without electrochemical assistance. The initial concentration of PFOA in this experiment was the same as that used in the electrosorption experiments, 100 ug/L. The composite materials were first evenly dispersed in a solution that had a similar electrolyte concentration as that shown to have the highest adsorption capacity under electrosorption conditions with a 0.6 V applied potential. In the batch experiment, no potential was applied to the bulk solution and the solution was magnetically stirred at 350 rpm (revolutions per minute).

Effect of Potential

The adsorption performance of the composite was tested by applying two different polarization potentials, 0.6 V and −0.6 V, with an ionic strength of 0.5 M $Na_2SO_4$. This ionic strength is the same as the electrolyte concentration from previous electrochemical studies for these composites (Tran T et al. *J. Compos. Sci.* 2020, 5, 5). The results are shown in FIG. 12.

Figure 12:
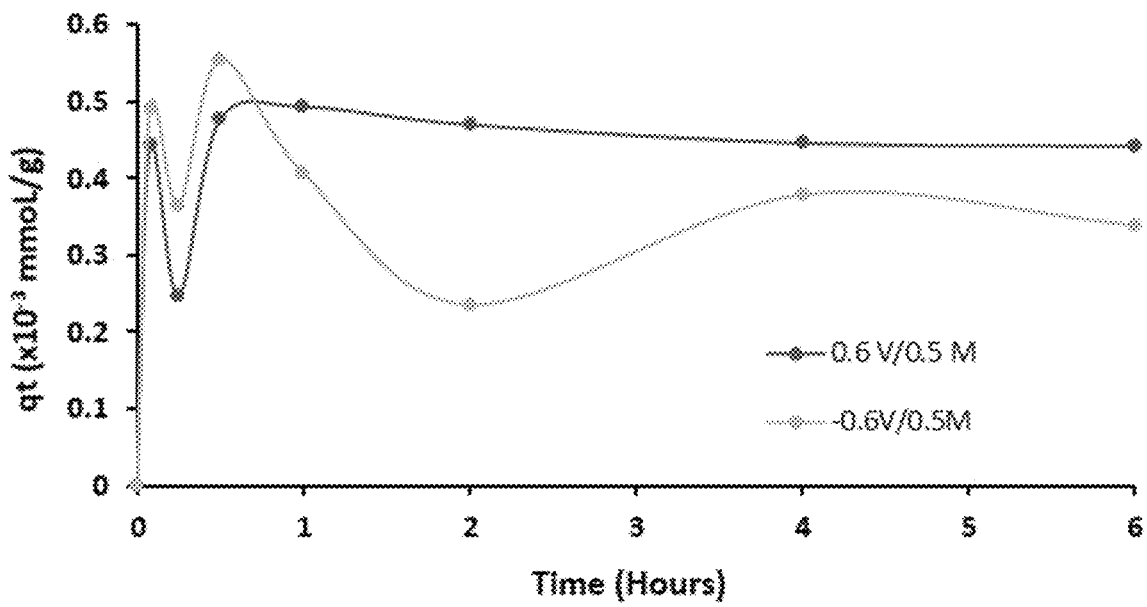
FIG. 12 shows the adsorption kinetics curve of PFOA at 0.6 V (dark gray) and −0.6 V (light gray). The concentration of electrolyte (Na$_2$SO$_4$) was 0.5 M.

From FIG. 12, fast initial transfer of aqueous PFOA from bulk solution to the surface of composite electrode occurred in the first 15 minutes at both potentials. After that, more PFOA transferred from solution to the electrode surface until the end of the experiment under 0.6 V potential. For −0.6 V potential, the reaction was more complex: more PFOA transferred onto the surface of the electrode after 1 hour of the experiment, then bounced back into the solution in the next hour, and then come back onto the surface of the electrode in the hour after that. In the end, both electrochemical assistance experiments reached equilibrium after 4 hours. As shown in FIG. 12, higher removal efficiency of PFOA was observed at 0.6 V after 4 hours. Additionally, from Table 1, the estimated initial adsorption rate, $v_0$, is 149.25 umol/h·g at 0.6 V and 15.63 umol/h·g at −0.6 V. The $v_0$ value at 0.6 V is 9.5 times higher than that at −0.6 V, indicating faster initial adsorption rate can be achieved under low positive potential.

During these experiments, the initial pH in the bulk solution with PFOA was measured to be 6.8. At this pH, PFOA will be fully deprotonated into anions due to its low pKa, and the FHY ($pH_{PZC}$=7.5-8.2) surface charge will be positive. Therefore, it is understandable that a higher removal efficiency of PFOA was observed at positive potential.

TABLE 1

Adsorption kinetics parameters of PFOA under different experimental conditions.

| Experimental Conditions | Pseudo-order parameter | | |
|---|---|---|---|
| | $v_0 \times 10^{-3}$ (mmol/h · g) | $q_e \times 10^{-3}$ (mmol/g) | $k_2$ (g/mmol · h) |
| 0.6 V/0.5 M | 149.25 | 0.45 | 749.70 |
| (−)0.6 V/0.5 M | 15.63 | 0.34 | 133.96 |

Pseudo-second order was applied to obtain these data.

Effect of Ionic Strength $Na_2SO_4$ is a common electrolyte for electrosorption experiments due to its environmental inertness. $Na_2SO_4$ also has a lower equivalent series resistance and pore size requirement than other electrolytes. Additionally, $Na_2SO_4$ was used in a previous study of the FHY/MWCNT composite materials. However, it has been reported that the $SO_4^{2-}$ ion can adsorb on carbon-based electrodes and interfere with the electrosorption process. Hence, in this study, the effect of ionic strength effect on the electrosorption process was investigated by conducting the same electrosorption experiment as above at different concentrations of $Na_2SO_4$ (0, 1 mM, and 0.5 M). Further, the result of the electrolyte concentration with the highest adsorption capacity was compared with the batch experiment at 350 rpm with same electrolyte concentration.

Figure 13:
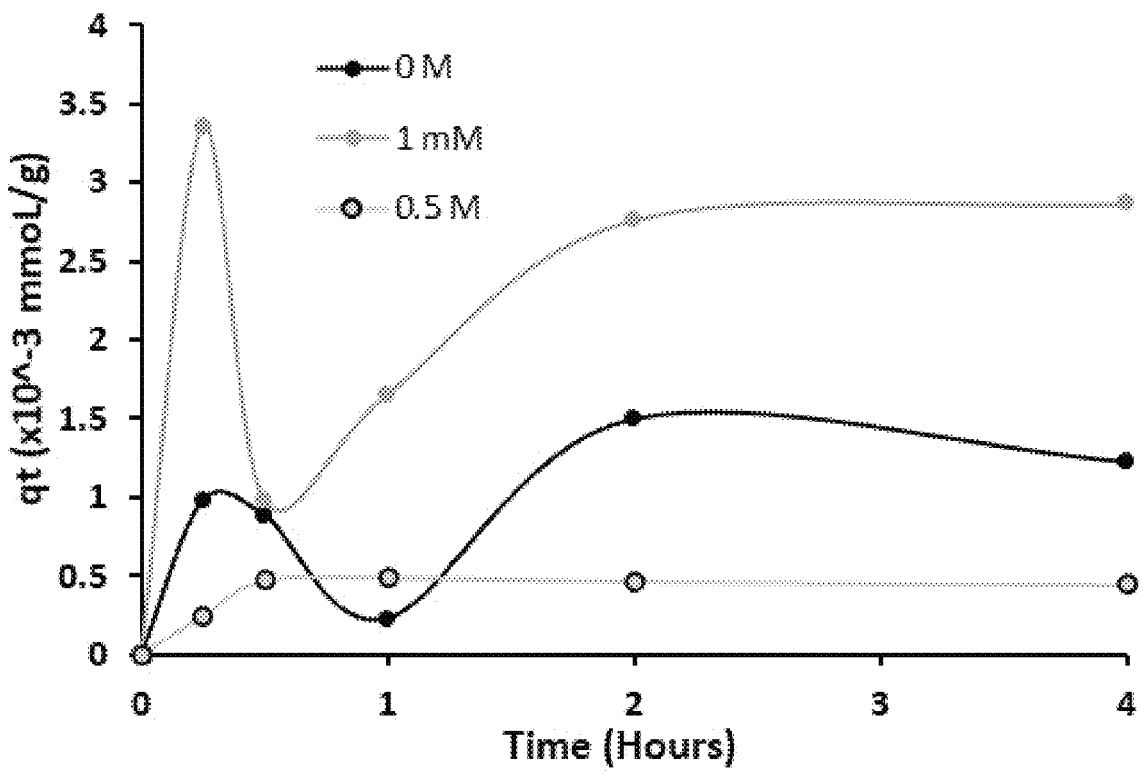
FIG. 13 shows the adsorption kinetics curve of PFOA at different electrolyte (Na$_2$SO$_4$) concentration 0 M, 1 mM, and 0.5 M. These experiments were conducted with same conditions at 0.6 V.

As shown in FIG. 13, after 4 hours, the observed PFOA electrosorption capacities were 0.45 umol/g, 1.22 umol/g, and 2.87 umol/g for 0.5 M, 0 M, and 1 mM of $Na_2SO_4$, respectively. Thus, the electrosorption capacity of the composite at 0.5 M (500 mM) was lower than that at 1 mM of $Na_2SO_4$. FIG. 13 also shows that the control sample without an electrolyte (0 M) showed a lower electrosorption capacity than results obtained in the presence of 1 mM of $Na_2SO_4$.

In solution the $Na_2SO_4$ will dissociate into ions, specifically $SO_4^{2-}$ and $Na^+$. Hence, increasing the concentration of $Na_2SO_4$ in solution will increase the amount of $SO_4^{2-}$ ions. In these experiments, PFOA will also exist as an anion (with negative charge) in solution. Accordingly, the two negatively charged species will constantly compete with each other for adsorption sites on the surface of the composite materials during electrosorption experiments.

The results in FIG. 13 highlight the importance of the electrolyte and its concentration in electrosorption experiments. While a certain concentration of the electrolyte improves the electrosorption by accelerating the transfer rate of aqueous contaminant ions under electrosorption (e.g., 1 mM vs 0 M), an electrolyte concentration that is too high leads to interference as $SO_4^{2-}$ ions compete with PFOA anions by occupying the adsorption sites on the FHY/MWCNT composites and lower the PFOA electrosorption capacity (e.g., 0.5 M vs. 1 mM).

According to Table 2, the estimated initial adsorption rate at 0.6 V under 1 mM $Na_2SO_4$ is 11.15 umol/h·g. This value is 6.7 times higher than the estimated value for the powder composite batch experiment at 350 rpm. This indicates that electrosorption could dramatically enhance the initial adsorption rate of PFOA on the FHY/MWCNT composite.

TABLE 2

Comparison of the adsorption kinetics parameters between batch and electrosorption experiment.

| Experimental Conditions | Pseudo-order parameter | |
|---|---|---|
| | $v_0 \times 10^{-3}$ (mmol/h · g) | $k_2$ (g/mmol · h) |
| 0.6 V/1 mM | 11.15 | 3.47 |
| Batch expt/1 M | 1.67 | 0.42 |

Pseudo-second order was applied to obtain these data.

Other advantages which are obvious, and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A composite material comprising: a carbon nanotube and a plurality of ferrihydrite particles, the carbon nanotube having an outer surface and the plurality of ferrihydrite particles being disposed on the outer surface of the carbon nanotube; wherein the composite material comprises the plurality of ferrihydrite particles and the carbon nanotube in a weight ratio of from 5:95 to 95:5; and wherein the carbon nanotube has an average length of from 5 μm to 15 μm.

2. The composite material of claim 1, wherein the carbon nanotube has an average outer diameter of from 1 nanometer (nm) to 100 nm.

3. The composite material of claim 1, wherein the carbon nanotube comprises a multi-walled carbon nanotube.

4. The composite material of claim 1, wherein the carbon nanotube has an average aspect ratio of from 20 to 1000.

5. The composite material of claim 1, wherein the carbon nanotube has an average outer diameter of from 30 nm to 50 nm and an average aspect ratio of from 80 to 500.

6. The composite material of claim 1, wherein the carbon nanotube comprises an acid-treated carbon nanotube.

7. The composite material of claim 1, wherein the plurality of ferrihydrite particles are each substantially spherical in shape.

8. The composite material of claim 1, wherein the plurality of ferrihydrite particles have an average particle size of from 1 nm to 20 nm.

9. The composite material of claim 1, wherein the weight ratio of the plurality of ferrihydrite particles to the carbon nanotube in the composite material is from 30:70 to 40:60.

10. The composite material of claim 1, wherein the plurality of ferrihydrite particles are disposed substantially evenly on the outer surface of the carbon nanotube.

11. The composite material of claim 1, wherein the plurality of ferrihydrite particles are bonded to the outer surface of the carbon nanotube.

12. The composite material of claim 1, wherein the carbon nanotube comprises a plurality of carboxylic groups on the outer surface, wherein each of the plurality of ferrihydrite particles has a surface and wherein each of the plurality of ferrihydrite particles comprises a plurality of hydroxyl groups on its surface, and wherein the plurality of ferrihydrite particles are bonded to the outer surface of the carbon nanotube via ionic bonds between the carboxyl groups and the hydroxyl groups.

13. The composite material of claim 1, wherein the composite material has a specific surface area of from 50 to 1000 meters squared per gram of the composite material ($m^2/g$), wherein the composite material has a specific capacitance of from 10 to 500 Farads per gram of the composite material (F/g) measured at a scan rate of 5 millivolts per second (mV/s), or a combination thereof.

14. A filter for separating a component from a fluid stream, the filter comprising the composite material of claim 1, wherein the fluid stream comprises liquid water or an aqueous solution.

15. The filter of claim 14, wherein the component separated from the fluid stream comprises a metal, an ion, a salt, a pesticide, a perfluorinated compound, a viral pathogen, or a combination thereof.

16. A method of use of the filter of claim 14, the method comprising using the filter in a separation to separate the component from the fluid stream, wherein the method comprises water purification, environmental remediation, solid phase extraction, or a combination thereof.

17. The method of claim 16, wherein the method comprises water desalination, wastewater treatment, heavy metal removal, water softening, or a combination thereof.

\* \* \* \* \*